United States Patent
Kanj et al.

(10) Patent No.: US 11,352,549 B2
(45) Date of Patent: Jun. 7, 2022

(54) COMPOSITIONS AND METHODS FOR THE USE AND APPLICATION OF CARBON NANODOTS FOR DEEP-RESERVOIR ENHANCED OIL RECOVERY

(71) Applicants: King Fahd University of Petroleum and Minerals, Dhahran (SA); Saudi Arabian Oil Company, Dhahran (SA)

(72) Inventors: Mazen Kanj, Dhahran (SA); Sivabalan Sakthivel, Dhahran (SA)

(73) Assignees: King Fahd University of Petroleum and Minerals, Dhahran (SA); Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/176,469

(22) Filed: Feb. 16, 2021

(65) Prior Publication Data

US 2021/0371726 A1 Dec. 2, 2021

Related U.S. Application Data

(60) Provisional application No. 63/029,965, filed on May 26, 2020, provisional application No. 63/029,968, filed on May 26, 2020.

(51) Int. Cl.
*E21B 43/17* (2006.01)
*C09K 8/584* (2006.01)
(Continued)

(52) U.S. Cl.
CPC .............. *C09K 8/584* (2013.01); *C01B 32/15* (2017.08); *C09K 8/58* (2013.01); *E21B 43/16* (2013.01);
(Continued)

(58) Field of Classification Search
CPC .......... E21B 43/17; E21B 43/13; C09K 8/584; C09K 2208/10
See application file for complete search history.

(56) References Cited

U.S. PATENT DOCUMENTS 8,946,132 B2 2/2015 Chang et al.
9,447,682 B2 * 9/2016 Kanj ....................... C01B 32/15
(Continued)

FOREIGN PATENT DOCUMENTS

CN 105789448 A 7/2016
WO 2018232076 A1 12/2018

OTHER PUBLICATIONS

Aslan et al., "Non-monotonicity of Contact Angle from NaCl and MgCl2 Concentrations in two Petroleum Fluids on Atomistically Smooth Surfaces", Energy & Fuels, ACS Paragon Plus Environment, DOI: 10.1021/acs.energyfuels.6b00175, Mar. 21, 2016.
(Continued)

*Primary Examiner* — Silvana C Runyan
(74) *Attorney, Agent, or Firm* — Dinsmore & Shohl, LLP

(57) ABSTRACT

A method for enhancing recovery of hydrocarbons from a hydrocarbon-bearing subterranean formation includes withdrawing hydrocarbons from a production well and injecting a treatment fluid that includes carbon nanodots dispersed in a brine solution from an injection well that is spaced apart from the production well. The carbon nanodots include carbon, oxygen, nitrogen, and hydrogen and are surface functionalized. A concentration of carbon nanodots in the treatment fluid is less than or equal to 500 parts per million by weight. Injection of the treatment fluid having the carbon nanodots is characterized by an injection duration, an injection pressure, an injection volume, or a combination thereof, that is sufficient to increase cumulative oil recovery of hydrocarbons from the first subterranean formation, the
(Continued)

second subterranean formation, or both by at least 10% compared to injecting the brine solution without the carbon nanodots.

20 Claims, 18 Drawing Sheets

(51) Int. Cl.
*C01B 32/15* (2017.01)
*C09K 8/58* (2006.01)
*E21B 43/16* (2006.01)
*B82Y 30/00* (2011.01)
*B82Y 40/00* (2011.01)

(52) U.S. Cl.
CPC .............. *E21B 43/17* (2013.01); *B82Y 30/00* (2013.01); *B82Y 40/00* (2013.01); *C01P 2004/32* (2013.01); *C01P 2004/64* (2013.01); *C01P 2006/14* (2013.01); *C09K 2208/10* (2013.01); *C09K 2208/28* (2013.01)

(56) References Cited

U.S. PATENT DOCUMENTS

| | | | |
|---|---|---|---|
| 9,453,159 B2 | 9/2016 | Kanj et al. | |
| 9,464,034 B2 | 10/2016 | Kanj et al. | |
| 9,469,599 B2 | 10/2016 | Kanj et al. | |
| 9,528,045 B2* | 12/2016 | Kanj | B82Y 20/00 |
| 9,580,639 B2 | 2/2017 | Chang et al. | |
| 9,715,036 B2 | 7/2017 | Murugesan et al. | |
| 9,725,640 B2 | 8/2017 | Tang et al. | |
| 10,047,283 B2 | 8/2018 | Kang et al. | |
| 10,053,974 B2 | 8/2018 | Murugesan et al. | |
| 10,119,072 B2 | 11/2018 | Kanj et al. | |
| 10,508,227 B2 | 12/2019 | Chang et al. | |
| 2014/0031265 A1* | 1/2014 | Chang | C09K 8/584 507/213 |
| 2016/0289539 A1* | 10/2016 | Jangda | C09K 8/584 |
| 2017/0022804 A1* | 1/2017 | Gupta | E21B 47/11 |
| 2018/0327652 A1* | 11/2018 | Kuznetsov | E21B 43/24 |
| 2019/0345377 A1* | 11/2019 | Haque | C04B 41/4584 |

OTHER PUBLICATIONS

Hussain, et al., "Effect of the number of ethylene oxide units on the properties of synthesized tailor-made cationic gemini surfactants for oilfield applications", Journal of Molecular Structure, vol. 1196, pp. 851-860, 2019.
Kanj et al., "Industry First Field Trial of Reservoir Nanoagents", Society of Petroleum Engineers, SPE 142592, 10 pages, 2011.
Kanj et al., "Oil Industry First Field Trial of Inter-Well Reservoir Nanoagent Tracers", Proc. of SPIE, vol. 9467, 94671D-1, 2015.
Li et al., "A Novel Nanofluid Based on Fluorescent Carbon Nanoparticles for Enhanced Oil Recovery", Industrial & Engineering Chemistry Research, vol. 56, pp. 12464-12470, 2017.
Wang et al., "Investigation of the Effect of Temperature and Pressure on Wettability Using Modified Pendant Drop Method", Society of Petroleum Engineers, SPE 30544, pp. 117-126, 1995.
Wasan et al., "Spreading of nanofluids on solids", Nature, vol. 423, pp. 156-159, 2003.
Fang et al., "Easy Synthesis and Imaging Applications of Cross-Linked Green Fluorescent Hollow Carbon Nanoparticles", ACS Nano, vol. 6, No. 1, pp. 400-409, 2012.
Jarrahian et al., "Wettability alteration of carbonate rocks by surfactants: A mechanistic study", Colloids and Surfaces A: Physicochem. Eng. Aspects, vol. 410, pp. 1-10, 2012.
Kryssmann et al., "Formation Mechanism of Carbogenic Nanoparticles with Dual Photoluminescence Emission", Journal of the American Chemical Society, vol. 134, pp. 747-750, 2012.
Prieve et al., "Diffusiophoresis of charged colloidal particles in the limit of very high salinity", pnas, vol. 116, No. 37, pp. 18257-18262, Sep. 10, 2019.
Sakthivel et al., "Experimental Evaluation of Carbon Dots Stabilized Foam for Enhanced Oil Recovery", Energy & Fuels, vol. 33, No. 10, pp. 9629-9643, 2019.

* cited by examiner

COMPOSITIONS AND METHODS FOR THE USE AND APPLICATION OF CARBON NANODOTS FOR DEEP-RESERVOIR ENHANCED OIL RECOVERY

CROSS-REFERENCE TO RELATED APPLICATIONS

This application claims the benefit of priority under 35 U.S.C. § 120 of U.S. Provisional Patent Application Ser. No. 63/029,968, filed May 26, 2020, and of U.S. Provisional Patent Application Ser. No. 63/029,965, filed May 26, 2020, the entire contents of both of which are incorporated by reference in the present disclosure.

TECHNICAL FIELD

The present disclosure generally relates to systems and methods for using carbon-based nanodots, and more specifically, systems and methods for using carbon-based nanodots to modify surface wettability of solid substrates and for enhanced oil recovery of hydrocarbons from subterranean formations using the carbon-based nanodots.

BACKGROUND

Changing the wetting state of materials is a growing field of research in many areas of engineering and science with enormous practical applications. Wettability of surfaces may be preferred to be hydrophilic or hydrophobic depending on the type of the application. Change of surface wettability of surfaces can be achieved using different techniques such as increasing the roughness of these surfaces to become more hydrophobic or coating these surfaces with low surface energy materials (such as wax to render them super-hydrophobic) to support resistance to rust/corrosion formation. Typically, surfactant-based wetting agents are used to modify wettability, so that most of the cleaning fluids used in subterranean resource well drilling are formulated with surfactants. However, these conventional cleaning fluids fail to alter the wettability in harsh environments, such as environments including high temperature, high pressure, and high salinity conditions.

In subterranean resource well drilling, primary oil recovery methods contribute to recovery of only about 15% of the crude oil in the reservoir. Secondary recovery methods, such as water flooding, can produce an additional 30% of the original oil in place (OOIP) in the reservoir. This means that more than 60% of the oil remains entrapped in the subterranean formation, which may require some form of improved or enhanced oil recovery (IOR or EOR) techniques to further increase recovery of hydrocarbons from the subterranean formation.

Chemical enhanced oil recovery (CEOR) is most useful and successful in small field pilot applications. The norm in conventional CEOR is to undertake field pilots with 5 or 7 wells that are tens of meters apart (about 50 meters to 100 meters of well-to-well spacing). The size of such a pilot well arrangement fades by comparison to the scale of operation and requirements in large prolific oilfields, such as oilfields in Saudi Arabia for example. The current practice in the large prolific oilfields of the world is to perform peripheral water injections targeting pressure maintenance and conducting a slow water drive mechanism to sustain the health and productivity of the field on the long run. Large prolific oilfields can be tens or even hundreds of kilometers in outer surface dimension. Injection wells are positioned outside the oilfield in the flanks of the reservoir and only production wells or observation wells are drilled inside the oilfield. Wells are drilled roughly at a one kilometer distance from each other.

The CEOR challenge is caused by the adsorption and diffusion of molecular surfactants and other chemicals in the porous media of the subterranean formation. Typical oilfield chemicals, such as surfactants and polymers, work well in breaking and mobilizing the oil in the near wellbore region but lose the bulk of their mass in the process. The loss of mass of these chemicals due to adsorption into the porous media of the formation make these conventional oilfield chemicals unable to reach the deeper regions of the reservoir. In addition, the common trend is to use the chemicals in large concentrations (nearing and exceeding 1% wt/v). This makes it highly uneconomical and impractical for field use and application. Conventional oilfield additive agents for enhanced oil chemical EOR, such as surfactants, polymers, or possibly other nanoparticles, are prone to adsorption, diffusion and are, therefore, used in much greater concentrations which limit its use to pilots with wells that are tens of meters apart (50-100 m). This is not practical for the arrangements of current wells of Saudi Arabia and other large prolific oilfields, in particular, where wells can be spaced at more than 1,000 meters apart on average and injection wells are only drilled in the flanks of the reservoirs.

SUMMARY

In the oil and gas industry, there is an ongoing need for inexpensive nanoagents (e.g., carbon-based nanoparticles) that are capable of modifying the surface wettability of surfaces of solid substrates at high temperature, high pressures, and high salinity conditions. Ongoing needs also exist for methods for enhanced oil recovery to improve recovery of hydrocarbons, such as crude oil, from hydrocarbon bearing subterranean formations, in particular, deep reservoir regions and regions having extreme reservoir conditions such as but not limited to high temperatures up to 150 degrees Celsius (° C.), high pressures (greater than 1,000 pounds per square inch (psi), and high salinity (up to 240,000 parts per million by weight Total Dissolved Solids).

Embodiments of the present disclose relate to systems and methods for using carbon-based nanodots (carbon nanodots) to alter surface wettability of solid substrates at high temperature, high pressure, and high salinity conditions. More specially, embodiments of the present disclosure present systems and methods for using carbon nanodots with the capability to alter wettability of solid substrates in very low concentrations of the carbon nanodots, for example, concentrations of less than 500 parts per million by weight (ppmw), such as but not limited to 10 ppmw to 100 ppmw. The present disclosure finds the carbon nanodots to be highly stable under harsh reservoir conditions, very easy and cheap to synthesize, and scalable for industrial production and use. These aspects of the carbon nanodots make them well-suited for oilfield applications. The systems and methods of the present disclosure may be used to alter wettability of carbonate rock, sandstone rocks, and other types of substrates, such as but not limited to porous metals, solid metals, polymers, or glass.

In the oilfield industry, understanding formation wettability is crucial for optimizing oil recovery. Wettability can be described as the comparative adhesion force of two different immiscible fluids on a solid surface. The present disclosure contemplates that the knowledge of the reservoir's wettability may be used to predict the production efficiency, also based on this the quantitative estimation of water, oil, gases that are present in the reservoir will also vary.

The present disclosure relates to organic carbon nanodots for wettability alteration experiments. The carbon nanodots are used in very low to trace amounts such as concentrations that are less than 500 ppmw, less than 100 ppmw, and even down to about 10 ppmw (0.001 wt/v %). The carbon nanodots may be inexpensive and may have an average particle size of less than 10 nanometers. The carbon nanodots may include carbon, oxygen, nitrogen, and hydrogen as constituent elements. The carbon nanodots may also be characterized by their high water-solubility, biocompatibility, non-toxicity, high chemical and thermal stability, mobility in the reservoir medium, colloidal stability in harsh reservoir environment, and scalability to mass production and commercial application. In embodiments, the carbon nanodots may be used as a tracer in oilfield applications.

Some embodiments of the present disclosure relate to systems and methods for the use and application of carbon nanodots for the active wettability alteration of surfaces of solid substrates. The carbon nanodots can be applied for wettability alteration studies on solid surfaces. The effect of the carbon nanodots on changing the contact angle (both statically and dynamically) for a drop of crude oil on a surface of a solid substrate is further disclosed in the present disclosure.

The present disclosure further relates to methods and systems of using the carbon nanodots in enhanced oil recovery to improve recovery of hydrocarbons such as crude oil from hydrocarbon bearing subterranean formations. The methods of enhanced oil recovery of the present disclosure may be conducted under extreme reservoir conditions of high temperature (up to 150° C.), high pressures (greater than 1,000 psi), high salinity (up to 240,000 ppmw TDS), or combinations of these.

Embodiments of the present disclosure include systems and methods for using and applying the carbon nanodots for enhanced oil recovery to improve hydrocarbon production from hydrocarbon bearing subterranean formations. More specifically, embodiments of the present disclosure relate to the methods and systems for the use and application of the carbon nanodots for deep-reservoir EOR with validation using coreflood and spontaneous imbibition tests. In some embodiments, the carbon nanodots' (CND) efficiency may be compared against conventional surfactant systems. The methods of enhancing recovery of hydrocarbons may include treating one or more subterranean formations with a treatment fluid comprising the carbon nanodots of the present disclosure. The carbon nanodots may change the wettability characteristics of the rock in the subterranean formations, such as reducing the oil wettability of the rock surfaces, which may operate to release or break hydrocarbon fluids (crude oil) from the pores of the rock so they can flow towards the production well. The carbon nanodots may also resist adsorption onto the surface of the rock, which may allow the carbon nanodots to travel farther into the subterranean formations to enhance oil recovery from the deep reservoir regions, such as regions of the subterranean formation more than 100 meters from the injection well.

According to a first aspect of the present disclosure, a method for enhancing recovery of hydrocarbons from a hydrocarbon-bearing subterranean formation may include withdrawing hydrocarbons from a production well extending into a first subterranean formation and injecting a treatment fluid comprising carbon nanodots dispersed in a brine solution from an injection well into a second subterranean formation. The first subterranean formation may be a hydrocarbon-bearing formation. The carbon nanodots may comprise carbon, oxygen, nitrogen, and hydrogen and may include one or more functional groups selected from amine groups, amide groups, carbonyl groups, carboxylate groups, hydroxylate groups, hydroxylamine groups, or combinations of these disposed at outer surfaces of the carbon nanodots. A concentration of the carbon nanodots in the treatment fluid may be less than or equal to 500 parts per million by weight based on the total weight of the treatment fluid. The injected treatment fluid may flow from the second subterranean formation into the first subterranean formation. The injection of the treatment fluid comprising the carbon nanodots may be characterized by an injection duration, an injection pressure, an injection volume, or a combination thereof, that may be sufficient to increase cumulative oil recovery of hydrocarbons from the first subterranean formation, the second subterranean formation, or both by at least 10% compared to injecting the brine solution without the carbon nanodots.

A second aspect of the present disclosure may include the first aspect, where connate fluids in the first subterranean formation, the second subterranean formation, or both may have a salinity of from 20,000 parts per million by weight to 240,000 parts per million by weight.

A third aspect of the present disclosure may include either one of the first or second aspects, where the injection duration, the injection pressure, the injection volume, or a combination of these may be sufficient to reduce the oil wettability of rock in the first subterranean formation, the second subterranean formation, or both, by at least about 10% to enhance recovery of hydrocarbons from the first subterranean formation, the second subterranean formation, or both.

A fourth aspect of the present disclosure may include any one of the first through third aspects, comprising injecting a fixed volume of the treatment fluid from the injection well into the second subterranean formation, and injecting a brine solution from the injection well into the second subterranean formation after the fixed volume of the treatment fluid, where injection of the brine solution may propel the treatment fluid further into the second subterranean formation, the first subterranean formation, or both.

A fifth aspect of the present disclosure may include the fourth aspect, where the fixed volume of the treatment fluid may be from 100 barrels to 500 barrels.

A sixth aspect of the present disclosure may include any one of the first through fifth aspects, comprising injecting the treatment fluid for a duration of from 0.5 hours to 48 hours.

A seventh aspect of the present disclosure may include any one of the first through sixth aspects, comprising injecting the treatment fluid continuously from the injection well into the second subterranean formation.

An eighth aspect of the present disclosure may include any one of the first through seventh aspects, where the treatment fluid may comprise a concentration of carbon nanodots of from 10 parts per million by weight to 50 parts per million by weight based on the total weight of the treatment fluid.

A ninth aspect of the present disclosure may include any one of the first through eighth aspects, comprising injecting a brine solution into the second subterranean formation in a first treatment stage, injecting the treatment fluid comprising the carbon nanodots into the second subterranean formation in a second treatment stage after the first treatment stage, and injecting a surfactant solution into the second subterranean formation in a third treatment stage after the second treatment stage.

A tenth aspect of the present disclosure may include any one of the first through eighth aspects, comprising injecting a brine solution into the second subterranean formation in a first treatment stage, injecting a surfactant solution into the second subterranean formation in a second treatment stage after the first treatment stage, and injecting the treatment fluid comprising the carbon nanodots into the second subterranean formation in a third treatment stage after the second treatment stage.

An eleventh aspect of the present disclosure may include any one of the first through tenth aspects, where the treatment fluid may further comprise at least one surfactant.

A twelfth aspect of the present disclosure may include the eleventh aspect, where the treatment fluid may comprise from 10 ppmw to 1,000 ppmw surfactant based on the total weight of the treatment fluid.

A thirteenth aspect of the present disclosure may include either one of the eleventh or twelfth aspects, where the surfactant may comprise a cationic gemini surfactant, an anionic alpha olefin sulphonate surfactant, or both.

A fourteenth aspect of the present disclosure may include any one of the eleventh through thirteenth aspects, where injecting the treatment fluid comprising the combination of the carbon nanodots and the at least one surfactant may increase the cumulative oil recovery of hydrocarbons from the first subterranean formation, the second subterranean formation, or both by greater than 50% compared to injecting the brine solution without the carbon nanodots.

A fifteenth aspect of the present disclosure is directed to methods for enhancing recovery of hydrocarbons from a hydrocarbon-bearing subterranean formation, where the method includes withdrawing hydrocarbons from a production well extending into a first subterranean formation and injecting a treatment fluid from an injection well into a second subterranean formation, the treatment fluid comprising charged reactive nanoparticles dispersed in a brine solution. The charged reactive nanoparticles may include carbon nanodots, secondary charged reactive nanoparticles, or both. The first subterranean formation is a hydrocarbon-bearing formation having dead pockets. The carbon nanodots may comprise carbon, oxygen, nitrogen, and hydrogen as constituent elements. A concentration of carbon nanodots in the treatment fluid may be less than or equal to 500 parts per million by weight based on the total weight of the treatment fluid. The treatment fluid may have a salinity less than a salinity of connate fluids in the dead pockets of the first subterranean formation. The injected treatment fluid may flow from the second subterranean formation into the first subterranean formation. The injection of the treatment fluid may be characterized by an injection duration, an injection pressure, an injection volume, or a combination thereof, that is sufficient to increase cumulative oil recovery of hydrocarbons from dead pockets in deep regions of the first subterranean formation, the second subterranean formation, or both compared to injecting fluids without the charged reactive nanoparticles, such as the carbon nanodots, secondary charged reactive nanoparticles, or both.

A sixteenth aspect of the present disclosure may include the fifteenth aspect, where the connate fluids in the dead pockets may have a salinity of from 150,000 parts per million by weight to 240,000 parts per million by weight Total Dissolved Solids.

A seventeenth aspect of the present disclosure may include either one of the fifteenth or sixteenth aspects, where the treatment fluid may comprise the carbon nanodots, and the carbon nanodots may comprise one or more functional groups selected from amine groups, amide groups, carbonyl groups, carboxylate groups, hydroxylate groups, hydroxylamine groups, or combinations of these disposed at outer surfaces of the carbon nanodots.

An eighteenth aspect of the present disclosure may include any one of the fifteenth through seventeenth aspects, where the treatment fluid may comprise the secondary charged reactive nanoparticles, where the secondary charged reactive nanoparticles may comprise encapsulated surfactants or surfactant precursors.

A nineteenth aspect of the present disclosure may include any one of the fifteenth through seventeenth aspects, where the treatment fluid may comprise the secondary charged reactive nanoparticles, and the secondary charged reactive nanoparticles may comprise salt surfactant nanoparticles.

A twentieth aspect of the present disclosure may include the nineteenth aspect, where the salt surfactant nanoparticles comprise at least one anionic surfactant metal ion salt and at least one polymer.

A twenty-first aspect of the present disclosure may include the twentieth aspect, where the at least one anionic surfactant metal ion salt may comprise an anionic surfactant selected from the group consisting of alkyl sulfonates, alkyl aryl sulfonates, alkyl aryl ether phosphates, alkyl ether phosphates, alkyl ether sulfates, alkyl sulfates, petroleum sulfonates, and combinations of these. The at least one anionic surfactant metal ion salt may further comprise at least one metal ion selected from the group consisting of aluminum, calcium, magnesium, cobalt, zinc, barium, copper nitrate, strontium, and combinations of these.

A twenty-second aspect of the present disclosure may include either one of the twentieth or twenty-first aspects, where the at least one polymer may be selected from the group consisting of hydrolyzed polyacrylamide, xanthan gum, polyvinyl pyrrolidone, hydrophobically modified hydrophilic polymers, polyvinyl acetate, polyvinyl alcohol, gelatins, and combinations of these.

A twenty-third aspect of the present disclosure may include any one of the fifteenth through twenty-second aspects, where the treatment fluid may comprise from 50 parts per million by weight to 50,000 parts per million by weight secondary charged reactive nanoparticles based on the total weight of the treatment fluid.

A twenty-fourth aspect of the present disclosure may include any one of the fifteenth through twenty-third aspects, comprising injecting a fixed volume of the treatment fluid from the injection well into the second subterranean formation and injecting a brine solution from the injection well into the second subterranean formation after the fixed volume of the treatment fluid. Injection of the brine solution may propel the treatment fluid further into the deep regions of the second subterranean formation, the first subterranean formation, or both.

A twenty-fifth aspect of the present disclosure may include the twenty-fourth aspect, further comprising, after injecting the fixed volume of the treatment fluid, maintaining the treatment fluid in the first subterranean formation, the second subterranean formation, or both for a shut-in period of from 1 hour to 1,000 hours.

A twenty-sixth aspect of the present disclosure may include either one of the twenty-fourth or twenty-fifth aspects, where the fixed volume of the treatment fluid may be from 100 barrels to 500 barrels.

A twenty-seventh aspect of the present disclosure may include any one of the fifteenth through twenty-sixth aspects, comprising injecting the treatment fluid for a duration of from 0.5 hours to 48 hours.

A twenty-eighth aspect of the present disclosure may include any one of the fifteenth through twenty-fifth aspects, where injecting the treatment fluid from the injection well into the second subterranean formation comprises injecting a slug of a first treatment fluid comprising salt surfactant particles and, after injecting the slug of the first treatment fluid, injecting a second treatment fluid continuously into the second subterranean formation, where the second treatment fluid comprises the carbon nanodots.

A twenty-ninth aspect of the present disclosure may include any one of the first through twenty-eighth aspects, where the first subterranean formation, the second subterranean formation, or both may comprise carbonate rock, sandstone rock, or both.

A thirtieth aspect of the present disclosure may include any one of the first through twenty-ninth aspects, where the second subterranean formation may be a hydrocarbon-bearing subterranean formation or non-hydrocarbon-bearing subterranean formation adjacent to a hydrocarbon-bearing subterranean formation.

A thirty-first aspect of the present disclosure may include any one of the first through thirtieth aspects, where the injection well may be spaced apart from the production well by a distance of greater than 100 meters.

A thirty-second aspect of the present disclosure may include any one of the first through thirty-first aspects, where the carbon nanodots, or the carbon nanodots, the secondary charged reactive nanoparticles, or both may penetrate into the second subterranean formation, the first subterranean formation, or both a distance greater than 10 meters from the injection well.

A thirty-third aspect of the present disclosure may include any one of the first through thirty-second aspects, where injecting the treatment fluid that includes the carbon nanodots from the injection well into the second subterranean formation may increase the hydrophilicity of rock in the second subterranean formation, the first subterranean formation, or both.

A thirty-fourth aspect of the present disclosure may include any one of the first through thirty-third aspects, where the first subterranean formation, the second subterranean formation, or both may comprise a formation temperature of from 50° C. to 150° C.

A thirty-fifth aspect of the present disclosure may include any one of the first through thirty-fourth aspects, where the first subterranean formation, the second subterranean formation, or both may comprise a formation pressure of greater than or equal to 1,000 pounds per square inch, such as from 1,000 pounds per square inch to 15,000 pounds per square inch.

A thirty-sixth aspect of the present disclosure may include any one of the first through thirty-fifth aspects, where injection of the treatment fluid may be characterized by the injection pressure that may be greater than or equal to a formation pressure in the second subterranean formation and less than a pressure sufficient to cause fracture of the second subterranean formation.

A thirty-seventh aspect of the present disclosure may include any one of the first through thirty-sixth aspects, where injection of the treatment fluid may be characterized by the injection volume of the treatment fluid that may be greater than or equal to at least one times the total pore volume of the first subterranean formation.

A thirty-eighth aspect of the present disclosure includes a treatment fluid for treating a hydrocarbon-bearing subterranean formation. The treatment fluid may include carbon nanodots comprising carbon, oxygen, nitrogen, and hydrogen as constituent elements and a brine solution, where the carbon nanodots may be dispersed in the brine solution.

A thirty-ninth aspect of the present disclosure may include the thirty-eighth aspect, comprising from 10 parts per million by weight to 500 parts per million by weight carbon nanodots based on the total weight of the treatment fluid.

A fortieth aspect of the present disclosure may include either one of the thirty-eighth or thirty-ninth aspects, further comprising from 50 parts per million by weight to 50,000 parts per million by weight secondary charged reactive nanoparticles based on the total weight of the treatment fluid.

A forty-first aspect of the present disclosure may include the thirty-ninth aspect, where the secondary charged reactive nanoparticles may comprise an encapsulated surfactant.

A forty-second aspect of the present disclosure may include the thirty-ninth aspect, where the secondary charged reactive nanoparticles may comprise salt surfactant nanoparticles.

A forty-third aspect of the present disclosure may include the forty-second aspect, where the salt surfactant nanoparticles may comprise at least one anionic surfactant metal ion salt and at least one polymer.

A forty-fourth aspect of the present disclosure may include the forty-third aspect, where the at least one anionic surfactant metal ion salt may comprise an anionic surfactant selected from the group consisting of alkyl sulfonates, alkyl aryl sulfonates, alkyl aryl ether phosphates, alkyl ether phosphates, alkyl ether sulfates, alkyl sulfates, petroleum sulfonates, and combinations of these. The anionic surfactant metal ion salt may further comprise at least one metal ion selected from the group consisting of aluminum, calcium, magnesium, cobalt, zinc, barium, copper nitrate, strontium, and combinations of these.

A forty-fifth aspect of the present disclosure may include either one of the forty-third or forty-fourth aspects, where the at least one polymer is selected from the group consisting of hydrolyzed polyacrylamide, xanthan gum, polyvinyl pyrrolidone, hydrophobically modified hydrophilic polymers, polyvinyl acetate, polyvinyl alcohol, gelatins, and combinations of these.

A forty-sixth aspect of the present disclosure may include any one of the first through forty-fifth aspects, where the brine solution may comprise a salinity of greater than 30,000 total dissolved solids (TDS).

A forty-seventh aspect of the present disclosure may include any one of the first through forty-sixth aspects, where the brine solution may have a salinity of from 30,000 parts per million by weight Total Dissolved Solids to 100,000 parts per million by weight Total Dissolved Solids based on the total weight of the brine solution.

A forty-eighth aspect of the present disclosure may include any one of the first through forty-seventh aspects, where the brine solution may comprise seawater.

A forty-ninth aspect of the present disclosure may include any one of the first through forty-eighth aspects, where the concentration of the carbon nanodots in the treatment fluid may be from 10 parts per million by weight to 200 parts per million by weight based on the total weight of the treatment fluid.

A fiftieth aspect of the present disclosure may include any one of the first through forty-ninth aspects, where the carbon nanodots may comprise a size of less than 10 nanometers (nm).

A fifty-first aspect of the present disclosure may include any one of the first through fiftieth aspects, where the carbon nanodots may be spherical.

A fifty-second aspect of the present disclosure may include any one of the first through fifty-first aspects, where the carbon nanodots may comprise an oxygen content of greater than 20 mole percent.

A fifty-third aspect of the present disclosure may include any one of the first through fifty-second aspects, where at least 50% of the functional groups at the surface of the carbon nanodots may comprise amide groups, carboxylate groups, hydroxyl groups, or combinations of these.

A fifty-fourth aspect of the present disclosure may include any one of the first through fifty-third aspects, where the functional groups disposed at the outer surfaces of the carbon nanodots may be chemically bonded to a matrix of the carbon nanodots.

A fifty-fifth aspect of the present disclosure may include any one of the first through fifty-fourth aspects, where the functional groups disposed at the outer surfaces of the carbon nanodots may be covalently bonded to the matrix of the carbon nanodots.

A fifty-sixth aspect of the present disclosure may include any one of the first through fifty-fifth aspects, where the functional groups disposed at the outer surfaces of the carbon nanodots are chemically bonded to a compound deposited onto the surface of the carbon nanodots.

A fifty-seventh aspect of the present disclosure may include any one of the first through fifth-sixth aspects, where the carbon nanodots do not include phosphorous.

A fifty-eighth aspect of the present disclosure may include any one of the first through fifty-seventh aspects, where the carbon nanodots may be hydrophilic.

A fifty-ninth aspect of the present disclosure may include any one of the first through fifty-eighth aspects, where the carbon nanodots may have a zeta potential of greater than −10 millivolts in a solution comprising the carbon nanodots and deionized water or greater than or equal to +10 millivolts in seawater.

A sixtieth aspect of the present disclosure may include any one of the first through fifty-fifty-ninth aspects, where the carbon nanodots may be produced by the process that may include heating an aqueous mixture of citric acid and an amine compound at a temperature of from 50° C. to 100° C. to remove the majority of the water and produce a viscous solution, heating the viscous solution at a temperature of greater than or equal to 200° C. for greater than or equal to 2 hours to produce the carbon nanodots, and collecting the carbon nanodots. The carbon nanodots may have an average particle diameter of less than 10 nm and may comprise the one or more functional groups selected from amine groups, amide groups, carbonyl groups, carboxylate groups, hydroxylate groups, hydroxylamine groups, or combinations of these disposed at the outer surfaces of the carbon nanodots.

A sixty-first aspect of the present disclosure may include the sixtieth aspect, further comprising washing and purifying the carbon nanodots.

A sixty-second aspect of the present disclosure may include either one of the sixtieth or sixty-first aspects, where the amine compound may comprise one or more alcohol amines, polyetheramines, or combinations of these.

A sixty-third aspect of the present disclosure may include any one of the sixtieth through sixty-second aspects, where the amine compound may comprise one or more alcohol amines selected from methanolamine, ethanolamine, propanolamine, or combinations of these.

A sixty-fourth aspect of the present disclosure may include any one of the first through sixty-third aspects, further comprising preparing the carbon nanodots and combining the carbon nanodots with the brine solution to produce the treatment fluid.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE FIGURES

The following detailed description of specific embodiments of the present disclosure can be best understood when read in conjunction with the following drawings, where like structure is indicated with like reference numerals and in which.

DETAILED DESCRIPTION

Embodiments of the present disclosure relate to systems and methods for the use and application of carbon-based nanodots (CND) to alter surface wettability of solid substrates at high temperature, high pressures, and high salinity conditions. The carbon-based nanodots will be referred to throughout the present disclosure using the term "carbon nanodots." More specifically, the present disclosure relates to systems and methods for the use and application of carbon nanodots with the capability to alter wettability of solid substrates in very low concentrations of the carbon nanodots, such as, for example, concentrations from 10 parts per million by weight (ppmw) to 500 ppmw, or 10 ppmw to 100 ppmw. In embodiments, a method for modifying a surface wettability of a surface of a solid substrate may include contacting the surface of the solid substrate with a brine solution comprising the carbon nanodots. The carbon nanodots may include carbon, oxygen, nitrogen, and hydrogen as its constituent elements. The carbon nanodots may include one or more functional groups selected from amine groups, amide groups, carbonyl groups, carboxylate groups, hydroxylate groups, hydroxylamine groups, or combinations of these disposed at outer surfaces of the carbon nanodots. A concentration of carbon nanodots in the brine solution may be less than or equal to 500 ppmw based on the total weight of the brine solution. The brine solution may have a salinity of greater than 30,000 total dissolved solids (TDS). Contacting the solid substrate with the brine solution comprising the carbon nanodots may be characterized by a contact duration, a contact volume, or both, that is sufficient to reduce the oil wettability of the surface of the solid substrate by at least 15%, as defined by a contact angle of a crude oil droplet contacted with the surface of the solid substrate.

Figure 1:
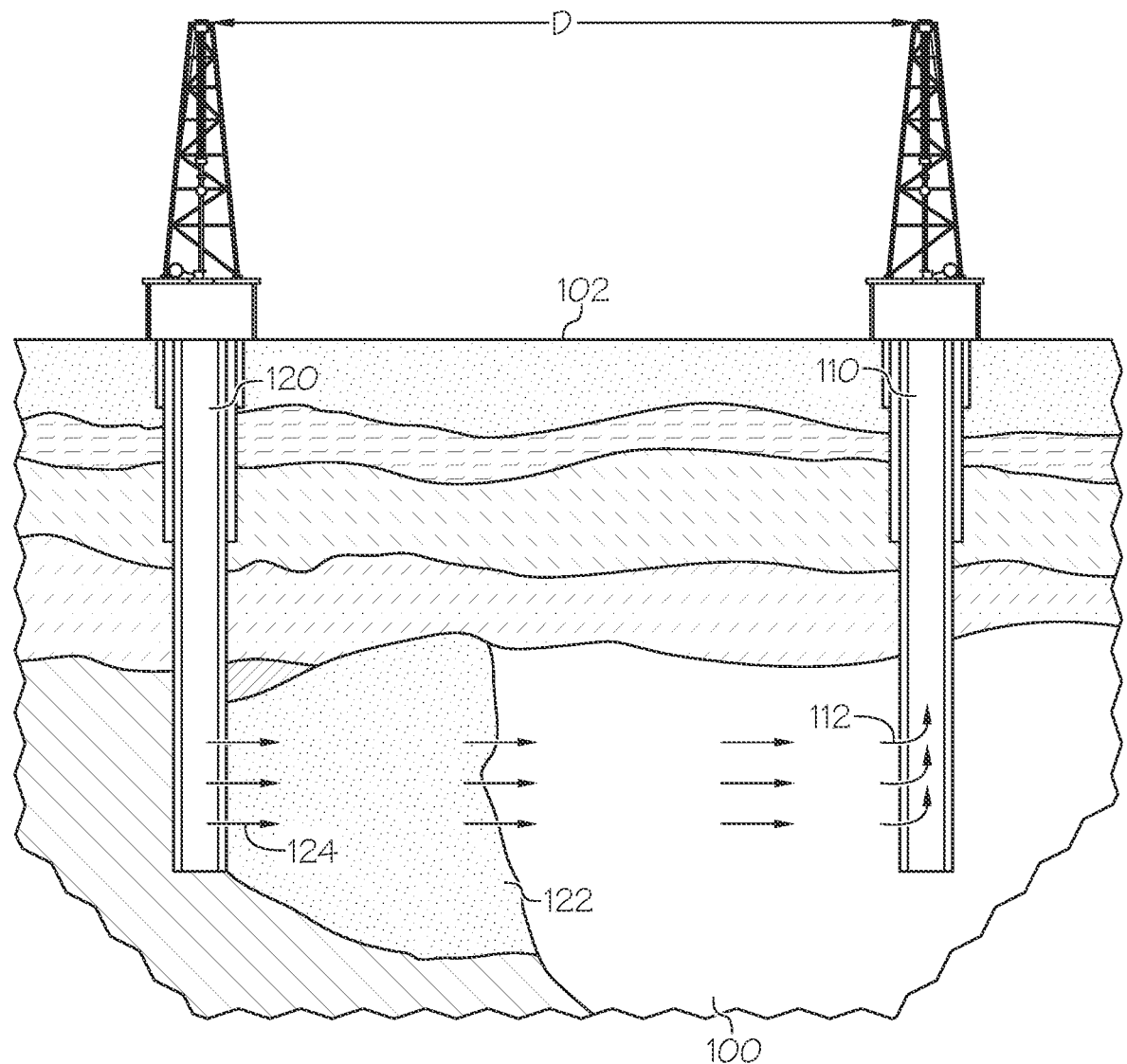
FIG. 1 schematically depicts enhanced oil recovery in a hydrocarbon-bearing subterranean formation, according to one or more embodiments shown and described in the present disclosure.

Further embodiments of the present disclosure relate to systems and methods for the use and application of the carbon nanodots for enhanced oil recovery (EOR) from hydrocarbon-bearing subterranean formations under extreme reservoir conditions of high temperature (up to or exceeding 150° C.), high pressure (greater than or equal to 1,000 psi), and high salinity, (up to TDS of 240,000 ppmw). The systems and methods may include the use and application of the carbon nanodots for oil recovery in very low concentrations (10 ppmw-500 ppmw or from 10 ppmw-100 ppmw) of the carbon nanodots in the treatment fluid and for potential benefit to deep-reservoir EOR. The carbon nanodots may be highly stable under harsh reservoir conditions and scalable for industrial production which makes it well suited for oilfield applications. Referring to FIG. 1, in embodiments, a method for enhanced oil recovery of hydrocarbons from a hydrocarbon-bearing subterranean formation is schematically depicted. The method for enhanced oil recovery may include withdrawing hydrocarbons 112 from a production well 110 extending into a first subterranean formation 100 and injecting the treatment fluid 124 comprising carbon nanodots dispersed in a brine solution from an injection well 120 into a second subterranean formation 122 adjacent to the first subterranean formation 100. The first subterranean formation 100 is a hydrocarbon-bearing subterranean formation. The carbon nanodots include carbon, oxygen, nitrogen, and hydrogen as constituent elements and may include one or more functional groups selected from amine groups, amide groups, carbonyl groups, carboxylate groups, hydroxylate groups, hydroxylamine groups, or combinations of these disposed at outer surfaces of the carbon nanodots. A concentration of the carbon nanodots in the treatment fluid 124 may be less than or equal to 500 ppmw based on the total weight of the treatment fluid 124. The injected treatment fluid 124 may flow from the second subterranean formation 122 into the first subterranean formation 100. Injection of the treatment fluid 124 comprising the carbon nanodots may be characterized by an injection duration, an injection pressure, an injection volume, or a combination of these, that is sufficient to increase cumulative oil recovery of hydrocarbons from the first subterranean formation 100, the second subterranean formation 122, or both by at least 10% compared to injecting the brine solution without the carbon nanodots.

The method for enhanced oil recovery using treatment fluids comprising the carbon nanodots of the present disclosure may increase the cumulative oil recovery compared to treating the hydrocarbon bearing subterranean formation with brine solutions or injection fluids including conventional oilfield additive agents. The carbon nanodots in the treatment fluids of the present disclosure may be suitable for enhanced oil recovery (EOR) under extreme reservoir conditions of high temperature, high pressure, and high salinity. The carbon nanodots of the present disclosure may also resist adsorption into the rock of the subterranean formations, which may enable the carbon nanodots and treatment fluids containing the carbon nanodots to penetrate deeper into the subterranean formations compared to surfactants, polymers and other conventional oilfield additive agents. Other benefits of the methods of the present disclosure may also be apparent from practicing the subject matter.

As used throughout the present disclosure, the term "contact angle" refers to an angle between a surface of a solid substrate and a line tangent to an outer surface of a crude oil droplet disposed on the surface of the solid substrate at the point where the outer surface of the oil droplet contacts the surface of the solid substrate. As used throughout the present disclosure, the contact angle defined above has a maximum theoretical value of 180 degrees when the surface is completely lyophilic and hydrophobic (completely oil wettable) and a minimum theoretical valve of zero when the surface of the solid substrate is completely hydrophilic and lyophobic (completely water wettable and not oil wettable). It is noted that literature in the art may report contact angle as the angle through the droplet, which would be equal to 180 degrees minus the contact angle as defined in the present specification.

As used throughout the present disclosure, the term "crude oil" refers to liquid hydrocarbons extracted from a hydrocarbon bearing subterranean formation. The term crude oil may include oil extracted from hydrocarbon bearing subterranean formations and subjected desalting processes. However, crude oil is not intended to include effluents resulting from separation of the crude oil into various hydrocarbon fractions or effluents produced by processes for upgrading the crude oil through one or more chemical reactions, such as cracking, hydrocracking, reforming, or other upgrading reaction.

As used throughout the present disclosure, the term "hydrocarbon-bearing subterranean formation" refers to a below-ground geologic region containing hydrocarbons, such as crude oil, hydrocarbon gases, or both, which may be extracted from the geologic region. The terms "subterranean formation" or just "formation" may refer to a subterranean geologic region that contains hydrocarbons or a subterranean geologic region proximate to a hydrocarbon-bearing formation, such as a subterranean geologic region to be treated for purposes of enhanced oil recovery.

As used throughout the present disclosure, the term "original oil in place" or "OOIP" may refer to the total volume of hydrocarbons contained in a subterranean reservoir or rock sample (such as a core sample) prior to production of hydrocarbons from the subterranean formation or rock sample.

As used in the present disclosure, the term "uphole" refers to a direction in a wellbore that is towards the surface. For example, a first component that is uphole relative to a second component is positioned closer to the surface of the wellbore relative to the second component.

As used in the present disclosure, the term "downhole" refers to a direction further into the formation and away from the surface. For example, a first component that is downhole relative to a second component is positioned farther away from the surface of the wellbore relative to the second component.

As previously discussed, a method for modifying the surface wettability of a surface of a solid substrate includes contacting the surface of the solid substrate with a brine solution comprising the carbon nanodots of the present disclosure. Contacting the surface of the solid substrate with the brine solution comprising the carbon nanodots may be characterized by a contact duration, a contact volume, or both, that is sufficient to reduce the oil wettability of the surface of the solid substrate by at least 15%, as defined by a contact angle of an oil droplet contacted with the surface of the solid substrate.

The solid substrate may be carbonate rock, sandstone rock, porous metals, solid metals, glass, polymeric materials, or combinations of these. In embodiments, the solid substrate may be carbonate rock or sandstone rock, such as carbonate rock or sandstone rock of a subterranean formation. In embodiments, the solid substrate may be at least partially or fully saturated with one or more fluids, such as crude oil, an aqueous solution, other fluid, or combinations of these. The aqueous solution saturating the solid substrate may be a brine solution, such as seawater, formation water, produced water, or other brine solution comprising water and at least one salt. In embodiments, the solid substrate may be carbonate rock or sandstone rock that is at least partially or fully saturated with crude oil or an aqueous solution.

The carbon nanodots of the present disclosure are carbon-based nanoparticles that are surface functionalized to provide specific properties to the carbon-based nanoparticles. The carbon nanodots may comprise the elements carbon, oxygen, nitrogen, and hydrogen as their constituent elements. The carbon nanodots may have a nanocrystalline structure that makes the carbon nanodots inherently fluorescent and highly detectable in trace amounts (down to single-digit part per billion levels). The carbon nanodots are characterized by their high water-solubility, biocompatibility, non-toxicity, high chemical and thermal stability, mobility in the reservoir medium, colloidal stability in harsh reservoir environment, "one-pot" synthesis method, and scalability to mass production and commercial field applications. In embodiments, the carbon nanodots may consist of or consist essentially of the elements carbon, oxygen, nitrogen, and hydrogen. The carbon, oxygen, nitrogen, and hydrogen may be bonded together during synthesis of the carbon nanodots to form a nanocrystalline matrix structure (matrix) comprising the carbon, oxygen, nitrogen, and hydrogen as constituent elements. The carbon nanodots may have an oxygen content of greater than 20 mole percent (mol %), greater than or equal to 25 mol %, or even greater than or equal to 28 mol %. In embodiments, the carbon nanodots do not include phosphorous as an intended constituent element. In embodiments, the carbon nanodots comprise less than 0.1 mole percent (mol %), less than 0.01 mol %, or even less than 0.001 mol % phosphorous atoms based on the total weight of the carbon nanodots.

As previously discussed, the carbon nanodots may be surface functionalized. As used herein, surface functionalized refers to the introduction of functional groups to the surface of the carbon nanodots that allows the carbon nanodots to remain dispersed and suspended, and without having an affinity to stick or bind to the surface of solid substrates, such as carbonate rock or sandstone rock in subterranean formations. The carbon nanodots may include one or more functional groups disposed at outer surfaces of the carbon nanodots. The functional groups disposed at the outer surfaces of the carbon nanodots may include one or more amine groups, amide groups, carbonyl groups, carboxylate groups, hydroxylate groups, hydroxylamine groups, or combinations of these. The functional groups disposed at the outer surfaces of the carbon nanodots may be selected from the group consisting of amine groups, amide groups, carbonyl groups, carboxylate groups, hydroxylate groups, hydroxylamine groups, or combinations of these. In embodiments, the functional groups disposed at the outer surfaces of the carbon nanodots may include amide groups, carboxylate groups, hydroxyl groups, or combinations of these. In embodiments, at least 50%, at least 60%, at least 65%, or at least 70% of the functional groups disposed at the outer surfaces of the carbon nanodots may comprise amide groups, carboxylate groups, hydroxyl groups, or combinations of these. In embodiments, the functional groups may include primary amines, primary amino alcohols, polyetheramines, or combinations of these. One such exemplary amino alcohol is ethanolamine. In certain embodiments, methanolamine and propanolamine can also be used. In certain embodiments, secondary amines or alcohols can be used. In other embodiments, the functional groups can be selected based upon their ability to modify the surface wettability of surfaces contacted with a solution of the carbon nanodots. In embodiments, the functional groups may be present in an amount of between about 50% and 90% by weight, alternatively between about 60% and 80% by weight, alternatively between about 70% and 80% by weight, alternatively between about 65% and 75% by weight.

The functional groups disposed at the outer surfaces of the carbon nanodots may be chemically bonded to a matrix of the carbon nanodots, such as through covalent bonds, ionic bonding, hydrogen bonding, other types of chemical bond, or combinations of these. In embodiments, the functional groups disposed at the outer surfaces of the carbon nanodots may be covalently bonded to the matrix of the carbon nanodots. In embodiments, the functional groups disposed at the outer surfaces of the carbon nanodots are chemically bonded to a compound deposited onto the outer surfaces of the carbon nanodots, such as a compound coated or otherwise deposited onto the outer surfaces of the carbon nanodots. The carbon nanodots may be the condensation reaction product of citric acid and an alcohol amine, such as but not limited to methanolamine, ethanolamine, propanolamine, or combinations of these. In embodiments, the carbon nanodots may be the condensation reaction product of citric acid and one or more polyetheramines.

Figure 2:
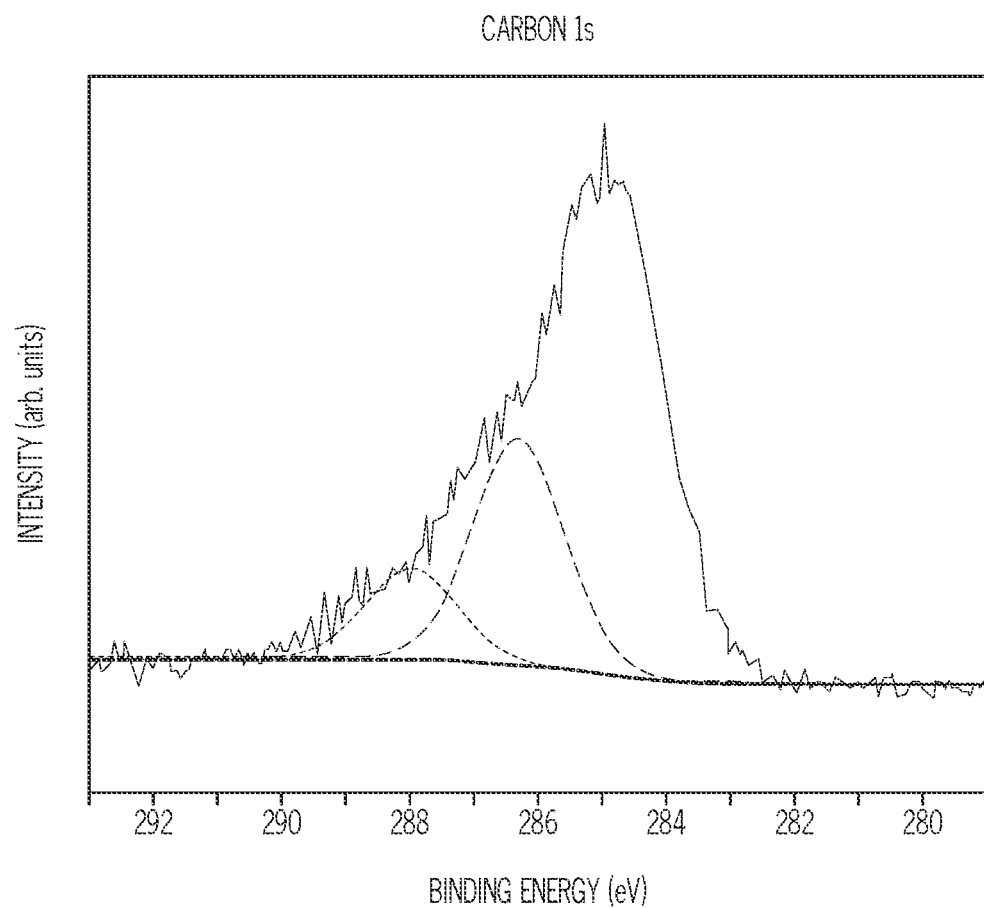
FIG. 2 graphically depicts an X-Ray Photoelectron Spectroscopy (XPS) of the carbon nanodots of the present disclosure, according to one or more embodiments shown and described in the present disclosure.

Referring now to FIG. 2, an XPS spectra of the synthesized carbon nanodots of the present disclosure is graphically depicted. The XPS spectra show the carbon nanodots having 61.7% of C—C bonding and 28.1% C—O—C bonding. This implies that the synthesized carbon nanodots may be highly hydrophilic. The functional groups disposed at the surfaces of the carbon nanodots may be selected to provide different properties to the carbon nanodots, such as functional groups that make the carbon nanodots amphiphilic or hydrophobic for example.

Figure 3:
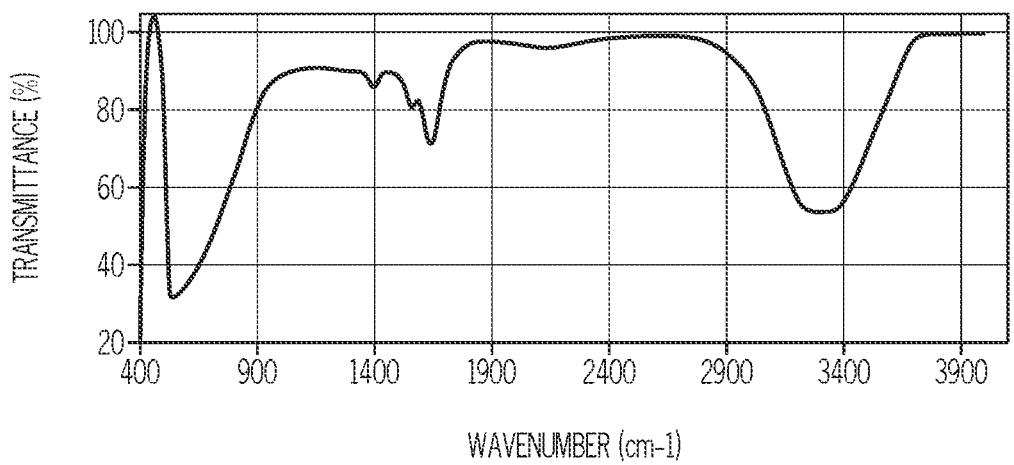
FIG. 3 graphically depicts a Fourier-transform infrared spectroscopy (FTIR) spectra of the carbon nanodots of the present disclosure, one or more embodiments shown and described in the present disclosure.

As previously discussed, the carbon nanodots may be the condensation reaction product of citric acid and an alcohol amine, such as ethanolamine. Referring to FIG. 3, the FTIR spectra of an embodiment of the carbon nanodots comprising the condensation reaction product of citric acid and ethanolamine is graphically depicted. The carbon nanodots analyzed in FIG. 3 exhibited absorption of carbonyl functional groups (wavenumber of about 1650), carboxyl-amide functional groups (wavenumber of about 1600), and hydroxylamine functional groups (wavenumber in the range 3250-3300), and accordingly a presence of —CO (carbonyl), —COO/—CONH$_2$ (carboxyl-amide), and —OH/—NH (hydroxylamine) groups in its structure. The carbonyl shift of the citric acid precursor is an indication that the citric acid is transformed into the carbon nanodots with no remains of the starting materials in the product. In addition, the FTIR spectra of FIG. 3 shows no absorption corresponding to C—H. This implies that the citric acid and ethanolamine precursors are fully carbonized. Thus, the carbon nanodots of the present disclosure may be fully carbonized as evidenced by the absence of a peak corresponding to C—H in a Fourier-transformed infrared (FTIR) spectra of the carbon nanodots. In embodiments, the carbon nanodots may have less than 0.1 wt. %, less than 0.01 wt. %, or even less than 0.001 wt. % unreacted starting precursors based on the total weight of the carbon nanodots.

The carbon nanodots of the present disclosure may have a zeta potential of greater than or equal to −10 millivolts in a solution consisting of the carbon nanodots and deionized water. The zeta potential may be determined through zeta potential measurements carried out using a Malvern Zetasizer (Malvern Instruments, Nanoseries). In seawater, the carbon nanodots of the present disclosure may have a zeta potential of greater than or equal to +10 millivolts, greater than or equal to +20 millivolts, greater than or equal to +30 millivolts, or +38 millivolts. The zeta potential of the carbon nanodots of the present disclosure indicates that the carbon nanodots have excellent stability with good electrostatic repulsion, particularly in high salinity solutions (salinity greater than 30,000 ppmw). The stability of the carbon nanodots means that the carbon nanodots may not have a tendency to agglomerate in saline solutions of different saline contents.

The carbon nanodots may have any shape. In embodiments, the carbon nanodots may be generally spherical in shape. The carbon nanodots may have an average particle diameter of from 1 nanometer (nm) to 100 nm. In embodiments, the carbon nanodots may have an average particle diameter of less than or equal to 10 nm, less than or equal to 8 nm, or even less than or equal to 5 nm. The carbon nanodots may have an average particle diameter greater than or equal to 1 nm, greater than or equal to 2 nm, or even greater than or equal to 3 nm. In embodiments, the carbon nanodots may have an average particle size of from 1 nm to 10 nm, from 2 nm to 8 nm, or from 3 nm to 5 nm. The carbon nanodots have been found to have consistent average particle diameter in a range of solutions of differing salinity, such as seawater and formation water. Thus, the carbon nanodots are stable and do not have a tendency to agglomerate when exposed to high-salinity solutions, such as solutions and treatment fluids having salinity greater than 30,000 ppmw.

The carbon nanodots may be stable at temperatures of from 25° C. to 150° C., and even greater than 150° C. As used in the present disclosure in reference to the carbon nanodots, the term "stable" may refer to the carbon nanodots not changing substantially in composition or form. For example, when stable, the composition of the carbon nanodots remains constant and the carbon nanodots do not show a strong tendency to agglomerate into larger particles. While some agglomeration may occur, the change in average particle size of the stable carbon nanodots is minimal. In embodiments, the carbon nanodots may be stable at temperatures of up to 250° C., up to 200° C., or up to 150° C. In embodiments, the carbon nanodots may be stable at temperatures of from 25° C. to 250° C., from 25° C. to 200° C., from 25° C. to 150° C., from 50° C. to 250° C., from 50° C. to 200° C., from 50° C. to 150° C., from 100° C. to 250° C., from 100° C. to 200° C., or from 100° C. to 150° C.

The carbon nanodots may be stable in a brine solution that includes the following compounds at the following concentrations: NaCl (128.9 g/L), $CaCl_2.2H_2O$ (109.16 g/L), $MgCl_2.6H_2O$ (35.66 g/L), $BaCl_2$ (0.02 g/L), $Na_2SO_4$ (0.16 g/L) and $NaHCO_3$ (0.48 g/L), totaling a concentration of about 120,000 ppm of total dissolved solids. The carbon nanodots have been found to be stable in water, alternatively in brine solutions having a total dissolved solids concentration of between 100 ppm and 25,000 ppm, alternatively in brine solutions having a total dissolved solids concentration of between 25,000 ppm and 50,000 ppm, alternatively in brine solutions having a total dissolved solids concentration of between 50,000 ppm and 100,000 ppm, alternatively in brine solutions having a total dissolved solids concentration of greater than 100,000 ppm. Stability has also been demonstrated in connate water having a concentration of 220,000 ppm TDS.

The carbon nanodots can be synthesized in a simple, one-pot reaction. Carbon nanodots may be produced hydrothermally, followed by surface functionalization. Accordingly, the process is very amenable for scale-up to the kilogram level in a non-industrial research lab environment. The synthesis is also very economical, with a current cost of less than about $10.00/kg. In embodiments, the carbon nanodots may be produced by a method that includes heating an aqueous mixture of citric acid and an amine compound at a temperature of from 50° C. to 100° C. to remove the majority of the water and produce a viscous solution, heating the viscous solution at a temperature of greater than or equal to 200° C. for greater than or equal to 2 hours to produce the carbon nanodots, and collecting the carbon nanodots. The carbon nanodots made according to this method may have an average particle diameter of less than 10 nm. The carbon nanodots may include one or more amine groups, amide groups, carbonyl groups, hydroxylamine groups, or combinations of these disposed at the outer surfaces of the carbon nanodots. The amine compound comprises one or more amines, alcohol amines, polyetheramines, or combinations of these. In embodiments, the amine compound comprises one or more alcohol amines selected from methanolamine, ethanolamine, propanolamine, or combinations of these. In embodiments, the amine compound may include JEFFAMINE® polyetheramines from Huntsman. The methods of making the carbon nanodots may further include washing and purifying the carbon nanodots.

As previously discussed, in the method of modifying the surface wettability of a surface of a solid substrate, the surface of the solid substrate is contacted with the brine solution comprising the carbon nanodots. The brine solution may have a salinity of greater than 30,000 ppmw total dissolved solids (TDS), greater than or equal to 50,000 ppmw TDS, greater than or equal to 75,000 ppmw TDS, or even greater than or equal to 100,000 ppmw TDS based on the total weight of the brine solution. The brine solution may have a salinity of less than or equal to 240,000 ppmw TDS, less than or equal to 220,000 ppmw TDS, less than or equal to 200,000 ppmw TDS, less than or equal to 150,000 ppmw TDS, or even less than or equal to 120,000 ppmw TDS based on the total weight of the brine solution. In embodiments, the brine solution may have a salinity of from 30,000 ppmw TDS to 240,000 ppmw TDS, from 30,000 ppmw TDS to 220,000 ppmw TDS, from 30,000 ppmw TDS to 200,000 ppmw TDS, from 50,000 ppmw TDS to 240,000 ppmw TDS, from 50,000 ppmw TDS to 220,000 ppmw TDS, from 50,000 ppmw TDS to 200,000 ppmw TDS, from 75,000 ppmw TDS to 240,000 ppmw TDS, from 75,000 ppmw TDS to 220,000 ppmw TDS, from 75,000 ppmw TDS to 200,000 ppmw TDS, from 75,000 ppmw TDS to 150,000 ppmw TDS, from 75,000 ppmw TDS to 120,000 ppmw TDS, from 100,000 ppmw TDS to 240,000 ppmw TDS, from 100,000 ppmw TDS to 220,000 ppmw TDS, or from 100,000 ppmw TDS to 200,000 ppmw TDS based on the total weight of the brine solution. The brine solution may include water and one or more salts. The salts are not particularly limited and may include, but are not limited to, alkali metal salts, alkaline earth metal salts, other metal salts, halides, sulphates, carbonates, hydroxides, and other ionic species. The brine solution may include seawater, connate water, formation water, produced water, brine solutions from crude desalting operations, synthesized brine solutions, or other aqueous composition having the requisite salinity. Synthesized brine solutions may refer to brine solutions prepared by purposely adding one or more ionic constituents (salts) to low-salinity water, such as but not limited to municipal water, deionized water, distilled water, well water, or other low-salinity water source.

The concentration of carbon nanodots in the brine solution may be sufficient to change the surface wettability of the surface of the solid substrate when the brine solution is contacted with the surface of the solid substrate. The concentration of carbon nanodots in the brine solution may be less than or equal to 500 ppmw, less than or equal to 300 ppmw, less than or equal to 200 ppmw, less than or equal to 100 ppmw, or even less than or equal to 50 ppmw based on the total weight of the brine solution. The concentration of carbon nanodots in the brine solution may be greater than or equal to 10 ppmw, greater than or equal to 20 ppmw, or greater than or equal to 50 ppmw based on the total weight of the brine solution. The brine solution may include from 10 ppmw to 500 ppmw, from 10 ppmw to 300 ppmw, from 10 ppmw to 200 ppmw, from 10 ppmw to 100 ppmw, from 10 ppmw to 50 ppmw, from 20 ppmw to 500 ppmw, from 20 ppmw to 300 ppmw, from 20 ppmw to 200 ppmw, from 20 ppmw to 100 ppmw, or from 20 ppmw to 50 ppmw carbon nanodots based on the total weight of the brine solution.

The surface of the solid substrate may be contacted with the brine solution comprising the carbon nanodots at ambient temperatures or temperatures greater than ambient temperature. The surface of the solid substrate may be contacted with the brine solution comprising the carbon nanodots at temperatures greater than or equal to 25° C., greater than or equal to 50° C., greater than or equal to 100° C., greater than or equal to 150° C., or even greater than or equal to 200° C. The surface of the solid substrate may be contacted with the brine solution comprising the carbon nanodots at a temperature of from 25° C. to 250° C., from 50° C. to 200° C., from 100° C. to 250° C., or even from 100° C. to 200° C. The surface of the solid substrate may be contacted with the brine solution comprising the carbon nanodots at a salinity of from 30,000 ppmw to 240,000 ppmw, from 30,000 ppmw to 220,000 ppmw, from 30,000 ppmw to 200,000 ppmw, from 50,000 ppmw to 240,000 ppmw, from 50,000 ppmw to 220,000 ppmw, from 50,000 ppmw to 200,000 ppmw, from 75,000 ppmw to 240,000 ppmw, from 75,000 ppmw to 220,000 ppmw, from 75,000 ppmw to 200,000 ppmw, from 75,000 ppmw to 150,000 ppmw, from 75,000 ppmw to 120,000 ppmw, from 100,000 ppmw to 240,000 ppmw, from 100,000 ppmw to 220,000 ppmw, or from 100,000 ppmw to 200,000 ppmw.

Contacting the solid substrate with the brine solution comprising the carbon nanodots according to the methods disclosed herein may be characterized by a contact duration, a contact volume, or both, that is sufficient to reduce the oil wettability of the surface of the solid substrate. The surface of the solid substrate may be contacted with the brine solution comprising the carbon nanodots for a contact duration sufficient to modify the surface wettability of the surface of the solid substrate. The contact duration may be greater than or equal to 30 minutes, or greater than or equal to 60 minutes. The contact duration may be from 30 minutes to 24 hours, from 30 minutes to 12 hours, from 30 minutes to 6 hours, from 30 minutes to 3 hours, from 30 minutes to 1 hour, from 1 hour to 24 hours, from 1 hour to 12 hours, from 1 hour to 6 hours, or from 1 hour to 3 hours. The method of claim 1, where the contact duration is greater than or equal to 30 minutes. The surface of the solid substrate may be contacted with a contact volume of the brine solution that is sufficient to contact the carbon nanodots with the surface of the solid substrate. In embodiments, the solid substrate may be a porous solid, such as a sandstone rock, carbonate rock, or porous metal, and the contact volume of the brine solution comprising the carbon nanodots may be greater than or equal to at least one times the total pore volume of the solid substrate, or at least two times the total pore volume of the solid substrate, where the total pore volume is determined using known methods.

Contacting the surface of the solid substrate with the brine solution comprising the carbon nanodots may increase the hydrophilicity of the surface of the solid substrate. Conversely, contacting the surface of the solid substrate with the brine solution comprising the carbon nanodots may decrease the lyophilicity of the surface of the solid substrate. Increasing the hydrophilicity of the surface of the solid substrate may increase the water wettability and decrease oil wettability of the surface. Thus, contacting the surface of the solid substrate with the brine solutions comprising the carbon nanodots may increase the water wettability of the surface of the solid substrate, which may be demonstrated by a reduction in a contact angle of an oil droplet contacted with the surface of the solid substrate. Contacting the solid substrate with the brine solution comprising the carbon nanodots according to the methods disclosed herein for the contact duration, the contact volume, or both, may reduce the oil wettability of the surface of the solid substrate by greater than or equal to 15%, greater than or equal to 20%, greater than or equal to 30%, or even greater than or equal to 40%, as demonstrated by a contact angle of an crude oil droplet contacted with the surface of the solid substrate.

Contacting the surface of the solid substrate with the brine solution comprising the carbon nanodots may reduce the contact angle of a crude oil droplet contacted with the surface of the solid substrate. Contacting the surface of the solid substrate with the brine solution comprising the carbon nanodots may reduce the contact angle of a crude oil droplet contacted with the surface of the solid substrate by greater than or equal to 15%, greater than or equal to 20%, greater than or equal to 30%, or even greater than or equal to 40%, as determined using the methods described.

The methods of modifying surface wettability of the surface of the solid substrate of the present disclosure may further include preparing the brine solution comprising the carbon nanodots. Preparing the brine solution may include providing a brine solution having any of the features previously discussed for the brine solution and combining carbon nanodots with the brine solution. Preparing the brine solution comprising the carbon nanodots may include mixing the brine solution and the carbon nanodots for a period of time sufficient to disperse and/or dissolve the carbon nanodots in the brine solution. The method of modifying surface wettability of the surface of the solid substrate may include synthesizing the carbon nanodots. Synthesizing the carbon nanodots may be accomplished according to any of the methods of synthesizing the carbon nanodots described in the present disclosure.

The surface wettability modification properties of the carbon nanodots may provide benefits for enhanced oil recovery (EOR) processes for recovering hydrocarbons from hydrocarbon bearing subterranean formations. Conventional oilfield additive agents for chemical EOR (CEOR), such surfactants, polymers, or even other types of nanoparticles, are prone to adsorption and diffusion into the rock of the subterranean formations. Therefore, these conventional oilfield additive agents are used in much greater concentrations, which limit their use to pilots with wells that are tens of meters apart, such as from 50 meters to 100 meters apart. CEOR using conventional oilfield additive agents is most useful and successful in these small field pilot applications. The norm in conventional CEOR is to undertake field pilots with 5 or 7 wells with each of the wells spaced tens of meters apart (about 50-100 m of well to well spacing).

Such pilot well arrangements for conventional CEOR fade by comparison to the scale of operation and requirements of large prolific oilfields, such as those in Saudi Arabia for example. This is not practical for the arrangements of current wells of Saudi Arabia, in particular, where wells are spaced at more than 1,000 meters apart on average and injector wells are only drilled at the edges of the reservoirs. The current practice in the large prolific oilfields of the world is to perform peripheral water injections at the edges of the reservoir to maintain reservoir pressure and provide a slow water drive mechanism to sustain the health and productivity of the oilfield on the long run.

Large prolific oilfields can be as large as nearly 280 kilometers by 30 kilometers. Injectors are positioned outside the field in the flanks of the reservoir and only production wells or observation wells are drilled inside the oilfield. Production wells are drilled roughly at a one kilometer distance from each other. The CEOR challenge in large prolific oilfields is caused by the adsorption and diffusion of molecular surfactants and other chemicals in the porous media of the subterranean formations. Oilfield chemicals, such as surfactants and polymers, work well in breaking and mobilizing the oil in the near wellbore region but can lose the bulk of its mass in the process. The loss of mass of polymers and surfactants may result in these conventional oilfield additive agents being unable to reach the deeper regions of the reservoir. The loss of mass can be compensated for by using large concentrations (nearing and exceeding 1% weight per volume) of the conventional oilfield additive agents. This makes CEOR highly uneconomical and impractical for field use and application for large prolific oilfields.

The present disclosure includes a method for enhancing recovery of hydrocarbons from a hydrocarbon-bearing subterranean formation. Referring now to FIG. 1, a schematic diagram of an EOR or CEOR installation for enhancing oil recovery from a hydrocarbon-bearing subterranean formation 100 is depicted. One or a plurality of production wells 110 may be installed between the surface 102 and a first subterranean formation, which may be the hydrocarbon-bearing subterranean formation 100. Additionally, an injection well 120 may be installed between the surface 102 and a second subterranean formation 122 that may be adjacent to or next to the hydrocarbon-bearing subterranean formation 100. The production well 110 may be operable to transport hydrocarbons 112 from the hydrocarbon-bearing subterranean formation 100 (first subterranean formation) to the surface 102. The injection well 120 may be operable to inject a treatment fluid 124 into the second subterranean formation 122 to conduct the EOR or CEOR process.

The methods of the present disclosure for enhancing recovery of the hydrocarbons from a hydrocarbon-bearing subterranean formation 100 may include withdrawing hydrocarbons 112 from the production well 110 extending into the first subterranean formation 100 and injecting the treatment fluid 124 comprising carbon nanodots dispersed in a brine solution from the injection well 120 into the second subterranean formation 122. The first subterranean formation 100 is a hydrocarbon-bearing subterranean formation. The injected treatment fluid 124 may flow from the second subterranean formation 122 into the first subterranean formation 100. The injection of the treatment fluid 124 comprising the carbon nanodots is characterized by an injection duration, an injection pressure, an injection volume, or a combination of these, that is sufficient to increase cumulative oil recovery of the hydrocarbons 112 from the first subterranean formation 100, the second subterranean formation 122, or both by at least 10% compared to injecting the brine solution without the carbon nanodots.

The treatment fluid 124 flowing into the second subterranean formation 122 may exert pressure on the hydrocarbon fluids 112 in the first subterranean formation 100 to provide motive force for driving the hydrocarbons 112 to the production well 110. Additionally, the carbon nanodots of the treatment fluid 124 may change the wettability characteristics of the rock in the first subterranean formation 100, the second subterranean formation 122, or both, such as reducing the oil wettability of the rock surfaces, which may operate to release or break hydrocarbon fluids (crude oil) from the pores of the rock in the first subterranean formation 100, the second subterranean formation 122, or both. The carbon nanodots in the treatment fluid 124 may also resist adsorption onto the surface of the rock, which may allow the carbon nanodots to travel farther into the second subterranean formation 122 and even farther into the first subterranean formation 100 to enhance oil recovery from the deep reservoir regions, such as regions of the subterranean formation more than 100 meters from the injection well 120.

As previously discussed, the treatment fluid in the EOR method of the present disclosure may include a brine solution and carbon nanodots dispersed or dissolved in the brine solution. The carbon nanodots may have any of the features, compositions, or properties previously discussed in the present disclosure for the carbon nanodots. In particular, the carbon nanodots may be spherical and may have an average particle diameter of less than or equal to 10 nm, such as from 2 nm to 8 nm, or from 3 nm to 5 nm. The carbon nanodots may comprise, consist of, or consist essentially of carbon, oxygen, nitrogen, and hydrogen as constituent elements. In embodiments, the carbon nanodots may include an oxygen content of greater than 20 mole percent, greater than or equal to 25 mole percent, or even greater than or equal to 28 mole percent. As previously discussed, the carbon nanodots may include one or more functional groups selected from amine groups, amide groups, carbonyl groups, carboxylate groups, hydroxylate groups, hydroxylamine groups, or combinations of these disposed at outer surfaces of the carbon nanodots. In embodiments, at least 50% of the functional groups at the surface of the carbon nanodots comprise amide groups, carboxylate groups, hydroxyl groups, or combinations of these. The carbon nanodots may not include phosphorous as a constituent element. The carbon nanodots may be hydrophilic. In embodiments, the carbon nanodots may have a zeta potential of greater than negative 10 millivolts in a solution comprising the carbon nanodots and deionized water. The carbon nanodots may have any of the other features discussed in the present disclosure for the carbon nanodots.

The concentration of carbon nanodots in the treatment fluid may be sufficient to increase the cumulative oil recovery from the hydrocarbon bearing subterranean formation compared to injecting a brine solution without the carbon nanodots. In embodiments, the concentration of carbon nanodots in the treatment fluid may be sufficient to increase the cumulative oil recovery from the hydrocarbon bearing subterranean formation by at least 10% compared to injecting the brine solution without the carbon nanodots. The concentration of carbon nanodots in the treatment fluid may be less than or equal to 500 ppmw, less than or equal to 300 ppmw, less than or equal to 200 ppmw, less than or equal to 100 ppmw, or even less than or equal to 50 ppmw based on the total weight of the treatment fluid. The concentration of carbon nanodots in the treatment fluid may be greater than or equal to 10 ppmw, greater than or equal to 20 ppmw, or greater than or equal to 50 ppmw based on the total weight of the treatment fluid. The treatment fluid may include from 10 ppmw to 500 ppmw, from 10 ppmw to 300 ppmw, from 10 ppmw to 200 ppmw, from 10 ppmw to 100 ppmw, from 10 ppmw to 50 ppmw, from 20 ppmw to 500 ppmw, from 20 ppmw to 300 ppmw, from 20 ppmw to 200 ppmw, from 20 ppmw to 100 ppmw, or from 20 ppmw to 50 ppmw carbon nanodots based on the total weight of the treatment fluid.

The balance of the treatment fluid may be the brine solution. The brine solution may have a salinity of greater than 30,000 ppmw total dissolved solids (TDS), greater than or equal to 40,000 ppmw TDS, greater than or equal to 50,000 ppmw TDS, or even greater than or equal to 100,000 ppmw TDS. The brine solution may have a salinity of less than or equal to 240,000 ppmw TDS, less than or equal to 220,000 ppmw TDS, or even less than or equal to 200,000 ppmw TDS. In embodiments, the brine solution may have a salinity of from 30,000 ppmw TDS to 240,000 ppmw TDS, from 30,000 ppmw TDS to 220,000 ppmw TDS, from 30,000 ppmw TDS to 200,000 ppmw TDS, from 40,000 ppmw TDS to 240,000 ppmw TDS, from 40,000 ppmw TDS to 220,000 ppmw TDS, from 40,000 ppmw TDS to 200,000 ppmw TDS, from 50,000 ppmw TDS to 240,000 ppmw TDS, from 50,000 ppmw TDS to 220,000 ppmw TDS, from 50,000 ppmw TDS to 200,000 ppmw TDS, from 100,000 ppmw TDS to 240,000 ppmw TDS, from 100,000 ppmw TDS to 220,000 ppmw TDS, or from 100,000 ppmw TDS to 200,000 ppmw TDS. The brine solution may include water and one or more salts. The salts are not particularly limited and may include, but are not limited to, alkali metal salts, alkaline earth metal salts, other metal salts, halides, sulphates, carbonates, hydroxides, etc. The brine solution may include seawater, connate water, formation water, produced water, brine solutions from crude desalting operations, synthesized brine solutions, or other water containing the requisite salinity. Synthesized brine solutions refer to brine solutions prepared by purposely adding one or more salt constituents to low-salinity water, such as but not limited to municipal water, deionized water, distilled water, well water, or other low-salinity water source.

The treatment fluid may be prepared by adding the carbon nanodots to the brine solution and mixing the treatment fluid for a period of time under agitation sufficient to disperse the carbon nanodots in the brine solution.

Referring again to FIG. 1, the first subterranean formation 100 is a hydrocarbon bearing subterranean formation. The second subterranean formation 122 may be adjacent to the first subterranean formation 100. In embodiments, the second subterranean formation 122 may abut against the first subterranean formation 100 so that the second subterranean formation 122 contacts and is in fluid communication with the first subterranean formation 100. The second subterranean formation 122 may be a hydrocarbon bearing formation, a non-hydrocarbon bearing subterranean formation, or a combination of these. In embodiments, the first subterranean formation 100, the second subterranean formation 122 or both may comprise carbonate rock, sandstone rock, or a combination of both of these. The injection well 120 may be spaced apart from the production well 100 by a distance D. The distance D between the injection well 120 and the production well 100 may be greater than or equal to 100 meters, greater than or equal to 200 meters, greater than or equal to 500 meters, or even greater than or equal to 1,000 meters.

The first subterranean formation 100, the second subterranean formation 122, or both may have a formation temperature of from 50° C. to 250° C., from 50° C. to 200° C., from 50° C. to 150° C., or from 100° C. to 150° C. The first subterranean formation 100, the second subterranean formation 122, or both may have a formation pressure of greater than or equal to 15 psi (103 kilopascals (kPA), greater than or equal to 1,000 psi (6,895 kPa), greater than or equal to 2,000 psi (13,790 kPa), greater than or equal to 4,000 psi (27,579 kPa), greater than or equal to 5,000 psi (34,474 kPa), or even greater than or equal to 6,000 psi (41,370 kPa). The first subterranean formation 100, the second subterranean formation 122, or both may have a formation pressure of from 15 psi (103 kilopascals (kPa)) to 15,000 psi (103,421 kPa), such as from 1,000 psi to 10,000 psi (68,948 kPa), or from 1,000 psi (6,895 kPa) to 6,000 psi (41,370 kPa). The formation fluids (hydrocarbon fluids, connate water, or both) in the first subterranean formation 100, the second subterranean formation 122, may have a salinity of from 20,000 ppmw to 240,000 ppmw, such as from 30,000 ppmw to 240,000 ppmw, from 30,000 ppmw to 220,000 ppmw, from 30,000 ppmw to 200,000 ppmw, from 50,000 ppmw to 240,000 ppmw, from 50,000 ppmw to 220,000 ppmw, from 50,000 ppmw to 200,000 ppmw, from 75,000 ppmw to 240,000 ppmw, from 75,000 ppmw to 220,000 ppmw, from 75,000 ppmw to 200,000 ppmw, from 75,000 ppmw to 150,000 ppmw, from 75,000 ppmw to 120,000 ppmw, from 100,000 ppmw to 240,000 ppmw, from 100,000 ppmw to 220,000 ppmw, or from 100,000 ppmw to 200,000 ppmw. The treatment fluid 124 may be injected into the second subterranean formation 122 at the formation temperature, the formation pressure, and the salinity of the second subterranean formation.

Injection of the treatment fluid into the second subterranean formation may be characterized by an injection duration, an injection pressure, an injection volume, or combinations of these. The injection duration, the injection pressure, the injection volume, or combinations of these may be sufficient to reduce the oil wettability of rock in the first subterranean formation, the second subterranean formation, or both, by at least about 10% to enhance recovery of hydrocarbons from the first subterranean formation, the second subterranean formation, or both. Injection of the treatment fluid comprising the carbon nanodots may be characterized by the injection duration sufficient to increase the cumulative oil recovery from the first subterranean formation by at least 10% compared to injection of a brine solution without the carbon nanodots. The injection duration may be greater than or equal to 0.5 hours, such as greater than or equal to 1 hour, greater than or equal to 2 hours, greater than or equal to 4 hours, greater than or equal to 8 hours, greater than or equal to 12 hours, or even greater than or equal to 24 hours. The injection duration may be from 0.5 hours to 48 hours, from 0.5 hours to 24 hours, from 1 hour to 48 hours, from 1 hour to 24 hours, from 2 hours to 48 hours, from 2 hours to 24 hours, from 4 hours to 48 hours, from 4 hours to 24 hours, from 8 hours to 48 hours, from 8 hours to 24 hours, from 12 hours to 48 hours, from 12 hours to 24 hours, or from 24 hours to 48 hours. In embodiments, the injection duration may be greater than 48 hours.

Injection of the treatment fluid comprising the carbon nanodots may be characterized by the injection pressure, which may be sufficient to increase the cumulative oil recovery from the first subterranean formation by at least 10% compared to injection of a brine solution without the carbon nanodots. Injection of the treatment fluid comprising the carbon nanodots can be characterized by the injection pressure that is greater than or equal to a formation pressure in the second subterranean formation and less than a pressure sufficient to cause fracture of the second subterranean formation. Injection of the treatment fluid comprising the carbon nanodots can be characterized by the injection pressure that is greater than or equal to 1,000 psi (6,895 kPa) or greater than or equal to 6,000 psi (41,370 kPa). Injection of the treatment fluid comprising the carbon nanodots can be characterized by the injection pressure that is from 1,000 psi to 15,000 psi (103,421 kPa), or from 1,000 psi (6,895 kPa) to 10,000 pounds per square inch (68,948 kPa).

Injection of the treatment fluid comprising the carbon nanodots may be characterized by the injection volume of the treatment fluid, which may be sufficient to increase the cumulative oil recovery from the first subterranean formation by at least 10% compared to injection of a brine solution without the carbon nanodots. Injection of the treatment fluid comprising the carbon nanodots may be characterized by the injection volume of the treatment fluid of greater than or equal to at least one times the total pore volume of the first subterranean formation to which the enhanced oil recovery process is targeted. In embodiments, the treatment fluid comprising the carbon nanodots may be injected as a slug of concentrated treatment fluids followed by continued injection of brine or seawater following injection of the slug. The slug comprising the treatment fluid may have a volume of from 100 barrels to 500 barrels (15.9 cubic meters to 79.5 cubic meters). The term "barrel" as used here refers to a volume equal to 42 U.S. Gallons or 0.159 cubic meter. In embodiments, the treatment fluid in the slug may have a concentration of carbon nanodots of greater than or equal to 50 ppmw, or greater than or equal to 100 ppmw based on the total weight of the treatment fluid. The treatment fluid in the slug may have a concentration of carbon nanodots of from 50 ppmw to 500 ppmw, from 50 ppmw to 300 ppmw, from 50 ppmw to 200 ppmw, from 50 ppmw to 100 ppmw, from 100 ppmw to 500 ppmw, from 100 ppmw to 300 ppmw, from 100 ppmw to 200 ppmw based on the total weight of the treatment fluid. When injecting as a slug, the treatment fluid may have a greater concentration of nanodots due to dilution of the treatment fluid by subsequent injection of seawater following injection of the slug. In embodiments, the treatment fluid comprising the carbon nanodots may be continuously injected over a period of time, such as for the injection duration, which may be greater than the time required for injection of a slug. When injected continuously, the treatment fluid comprising the carbon nanodots may have a more diluted concentration of carbon nanodots, such as a concentration of carbon nanodots of from 10 ppmw to 50 ppmw based on the total weight of the treatment fluids. The volume of the treatment fluid may be sufficient to cover several pore volumes of the subterranean formation near the injection well and lesser pore volumes as the treatment fluid progresses away from the injection well.

In embodiments, the injection duration, injection pressure, injection volume, or combinations of these may be sufficient to cause the carbon nanodots in the treatment fluid to penetrate into the formation to a distance from the injection well of greater than 10 meters, greater than or equal to 50 meters, greater than or equal to 100 meters, greater than or equal to 200 meters, or even greater than or equal to 500 meters.

Injecting the treatment fluid comprising the carbon nanodots dispersed in the brine solution from the injection well into the first subterranean formation may increase the hydrophilicity of rock in the first subterranean formation, the second subterranean formation or both. The treatment fluid comprising the carbon nanodots may decrease the oil wettability of the rock of the first subterranean formation, the second subterranean formation or both. Injection of the treatment fluid comprising the carbon nanodots of the present disclosure may increase the cumulative oil recovery from the first subterranean formation by greater than or equal to 10%, greater than or equal to 20%, or even greater than or equal to 30% compared to injection of a brine solution without the carbon nanodots.

In embodiments, the methods of enhancing recovery of hydrocarbons from a hydrocarbon-bearing subterranean formation may include injecting a brine solution into the second subterranean formation in a first treatment stage, injecting the treatment fluid comprising the carbon nanodots into the second subterranean formation in a second treatment stage after the first treatment stage, and injecting a surfactant solution in a third treatment stage after the second treatment stage. Alternatively, in embodiments, the methods of enhancing recovery of hydrocarbons from a hydrocarbon-bearing subterranean formation may include injecting a brine solution into the second subterranean formation in a first treatment stage, injecting a surfactant solution into the second subterranean formation in the second treatment stage after the first treatment stage, and injecting the treatment fluid comprising the carbon nanodots into the second subterranean formation in the third treatment stage after the second treatment stage. The brine solution of the first treatment stage may be seawater.

The methods of enhancing recovery of hydrocarbons from a hydrocarbon-bearing subterranean formation may further include preparing the treatment fluid comprising the carbon nanodots. Preparing the treatment fluid may include providing a brine solution having any of the features previously discussed for the brine solution and combining carbon nanodots with the brine solution to produce the treatment fluid. Preparing the treatment fluid comprising the carbon nanodots may further include mixing the brine solution and the carbon nanodots for a period of time sufficient to disperse and/or dissolve the carbon nanodots in the brine solution to produce the treatment fluid comprising the carbon nanodots. The methods of enhancing recovery of hydrocarbons from a hydrocarbon-bearing subterranean formation may include synthesizing the carbon nanodots. Synthesizing the carbon nanodots may be accomplished according to any of the methods of synthesizing the carbon nanodots described in the present disclosure.

In embodiments, the treatment fluid comprising the carbon nanodots may further include at least one surfactant. The at least one surfactant may include but is not limited to a cationic gemini surfactant, an anionic alpha olefin sulphonate surfactant, other surfactant, or combinations of surfactants. A suitable cationic gemini surfactant is described in Comparative Example 3 of the present disclosure. The treatment fluid may include from 10 ppmw to 1,000 ppmw surfactant, or from 20 ppmw to 500 ppmw surfactant based on the total weight of the treatment fluid. The combination of the carbon nanodots and at least one surfactant in the treatment fluid for enhanced oil recovery provides a synergistic effect that unexpectedly results in the greater increase in the cumulative oil recovery from the hydrocarbon bearing subterranean formation compared to treatment fluids that include only the surfactant or only the carbon nanodots. Injecting the treatment that includes the combination of both the carbon nanodots and the at least one surfactant may increase the cumulative oil recovery of hydrocarbons from the first subterranean formation, the second subterranean formation, or both by greater than 50%, greater than 70%, or even greater than 100% compared to injecting a treatment fluid comprising a brine solution without the carbon nanodots or the surfactant. Injecting the treatment fluid comprising the combination of the carbon nanodots and the at least one surfactant may increase the cumulative oil recovery of hydrocarbons from the first subterranean formation, the second subterranean formation, or both by greater than 30%, greater than 40%, or even greater than 45% compared to injecting the treatment fluid comprising the carbon nanodots and no surfactant.

As previously discussed, the carbon nanodots may provide benefits for enhanced oil recovery (EOR) processes for recovering hydrocarbons from hydrocarbon bearing subterranean formations. In particular, the carbon nanodots may improve recovery of hydrocarbons from dead pockets of the hydrocarbon bearing subterranean formation, especially dead pockets in the deep reservoir regions that can be greater than 100 meters from the injection well. The methods of the present disclosure for treating dead pockets of a hydrocarbon bearing subterranean formation may include injecting a treatment fluid from an injection well into the subterranean formation, where the treatment fluid comprises charged reactive nanoparticles in a brine solution. The charged reactive nanoparticles may include the carbon nanodots of the present disclosure, secondary charged reactive nanoparticles, or both. In embodiments, the treatment fluid may include the carbon nanodots of the present disclosure in combination with secondary charged reactive nanoparticles.

Figure 4:
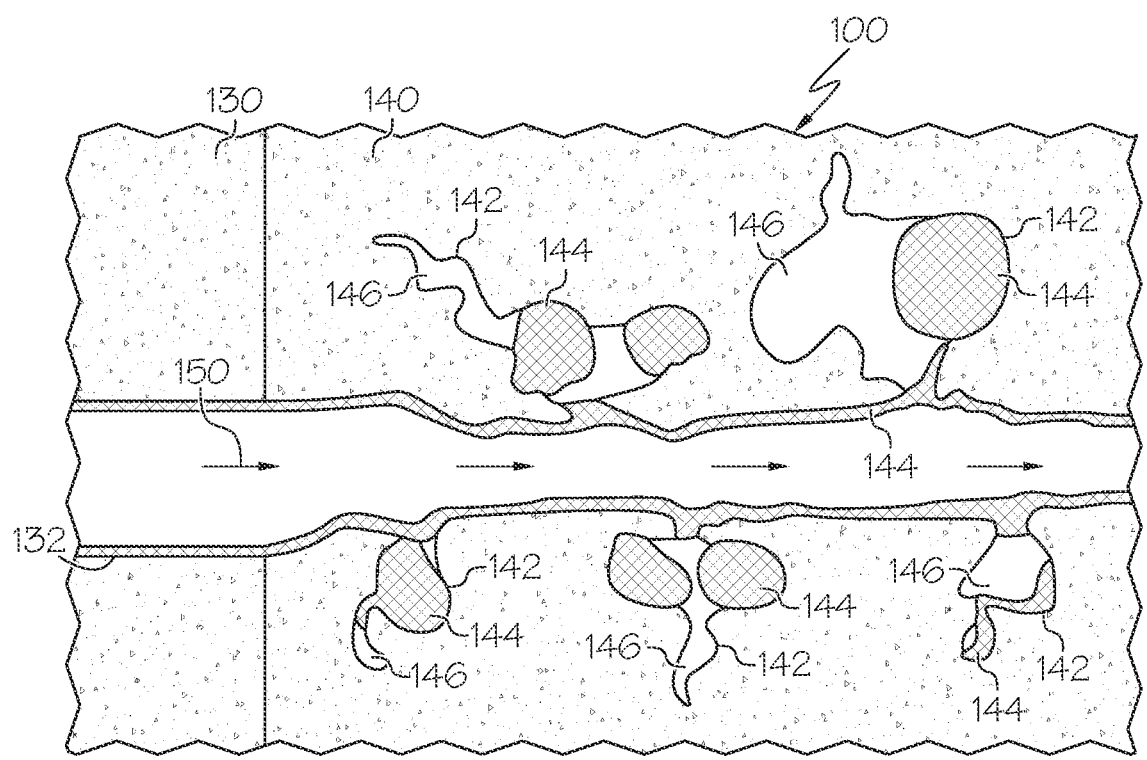
FIG. 4 schematically depicts a portion of a hydrocarbon bearing subterranean formation comprising dead pockets, according to one or more embodiments shown and described in the present disclosure.

Referring now to FIG. 4, a portion of the hydrocarbon bearing subterranean formation 100 during an EOR treatment is schematically depicted. The hydrocarbon bearing subterranean formation 100 can include a near wellbore region 130 and a deep region 140, where the near wellbore region 130 is closer in proximity to the injection well compared to the deep region 140. The deep region 140 may be at least 10 meters, at least 50 meters, or at least 100 meters from the injection well, production well, or both. FIG. 4 schematically depicts a pore 132 through the hydrocarbon bearing subterranean formation 100, where the pore 132 is in fluid communication with one or more dead pockets 142 in the deep region 140. The dead pockets 142 may include hydrocarbons 144, connate water 146, or combinations of both. Hydrocarbons 144 may also be present in deposits along the surfaces of the pore 132. In FIG. 4, the hydrocarbon bearing subterranean formation 100 is being treated with seawater 150 by itself. The injected seawater 150 may create a motive force that drives hydrocarbons in the pore 132 towards the production well. However, the seawater 150 by itself may not perform well at cleaning the surfaces of the pores 132 or penetrating into dead pockets 142.

Figure 5:
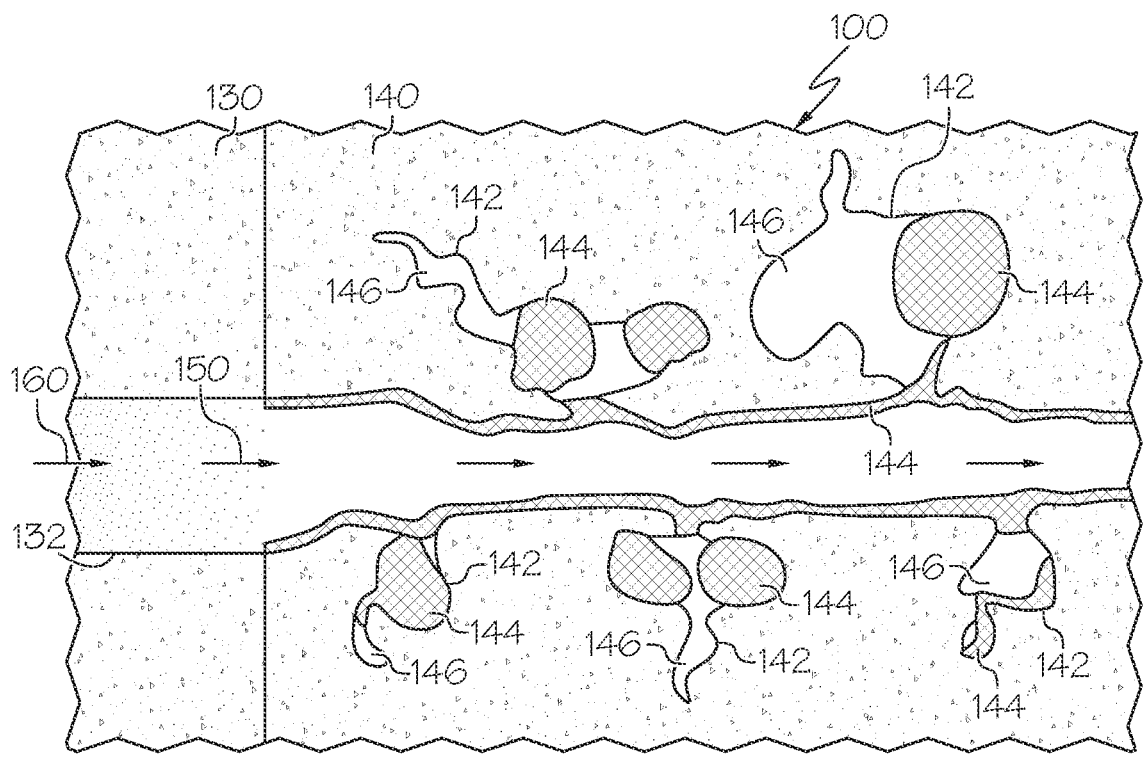
FIG. 5 schematically depicts the portion of the hydrocarbon bearing subterranean formation of FIG. 4 being treated with seawater and a molecular surfactant, according to one or more embodiments shown and described in the present disclosure.

Referring to FIG. 5, during conventional treatment methods, conventional treatment fluids 160 comprising conventional oilfield additive agents 162 for chemical EOR (CEOR), such as molecular surfactants, polymers, or even other types of nanoparticles, are often injected into the hydrocarbon bearing subterranean formation 100 to release the hydrocarbons 144 from pores 132 and dead pockets 142. However, these conventional oilfield additives 162, such as molecular surfactants, polymers, and other types of nanoparticles, are prone to adsorption and diffusion into the rock of the hydrocarbon bearing subterranean formations 100. As the conventional treatment fluids 160 are pushed farther and farther into the hydrocarbon bearing subterranean formation 100, the concentration of the conventional oilfield additives 162 decreases due to the adsorption and diffusion into the rock. This is schematically depicted in FIG. 5 by the absence of the conventional oilfield additives 162 in the deep regions 140 of the hydrocarbon bearing subterranean formation 100. Thus, these conventional oilfield additives 162 are not able to effectively treat dead pockets 144 in the hydrocarbon bearing subterranean formation 100 to solubilize hydrocarbons past a certain distance from the injection well, such as distances greater than 10 meters, greater than 50 meters, or greater than or equal to 100 meters.

As an example, molecular surfactants are capable of cleaning hydrocarbon deposits from the region of the hydrocarbon bearing subterranean formation 100 near the injection site relatively well but may lose the bulk of its mass in the process and may be unable to reach the deeper regions 140 of the hydrocarbon bearing subterranean formation 100. The adsorption problem worsens when anionic surfactants encounter carbonate rock, which acts as a Lewis acid. The extent of surfactant adsorption depends on the type of rock, pore surface area, water salinity and the type of surfactant. In general, roughly one milligram of surfactant adsorbs into one gram of rock. In addition to adsorption, some surfactants precipitate from the saline water with cations from the rock. In either case, some surfactants are lost before they have a chance to solubilize oil. The concentration of the conventional oilfield additives 162 may be increased to compensate for loss of chemicals due to adsorption or diffusion. However, as previously discussed, increasing the concentration of these conventional oilfield chemicals 162 greatly increases the cost of the EOR treatments, making it cost prohibitive.

Reactive nanoagents, such as nanoparticles comprising surfactants or other active oilfield additives, can be used to slow the release of surfactants or other oilfield additives to reduce the effects of adsorption and diffusion into the rock of the hydrocarbon bearing subterranean formation. Examples can include salt surfactant particles, surfactant nanoparticles, or encapsulated surfactants particles. These reactive nanoagents comprising surfactants (e.g. salt surfactants, surfactant nanoparticles, or encapsulated surfactants) are inspired from the pharmaceutical industry for slow and sustained release salt-drugs. These reactive nanoagents are charged colloids having an average particle size of 100 nm or less and have limited solubility in water. They are less diffusive and less adsorptive compared to molecular surfactants and are capable of reaching deeper regions of the hydrocarbon bearing subterranean formation, such as regions greater than 10 meters, greater than 50 meters, or even greater than or equal to 100 meters.

Figure 6:
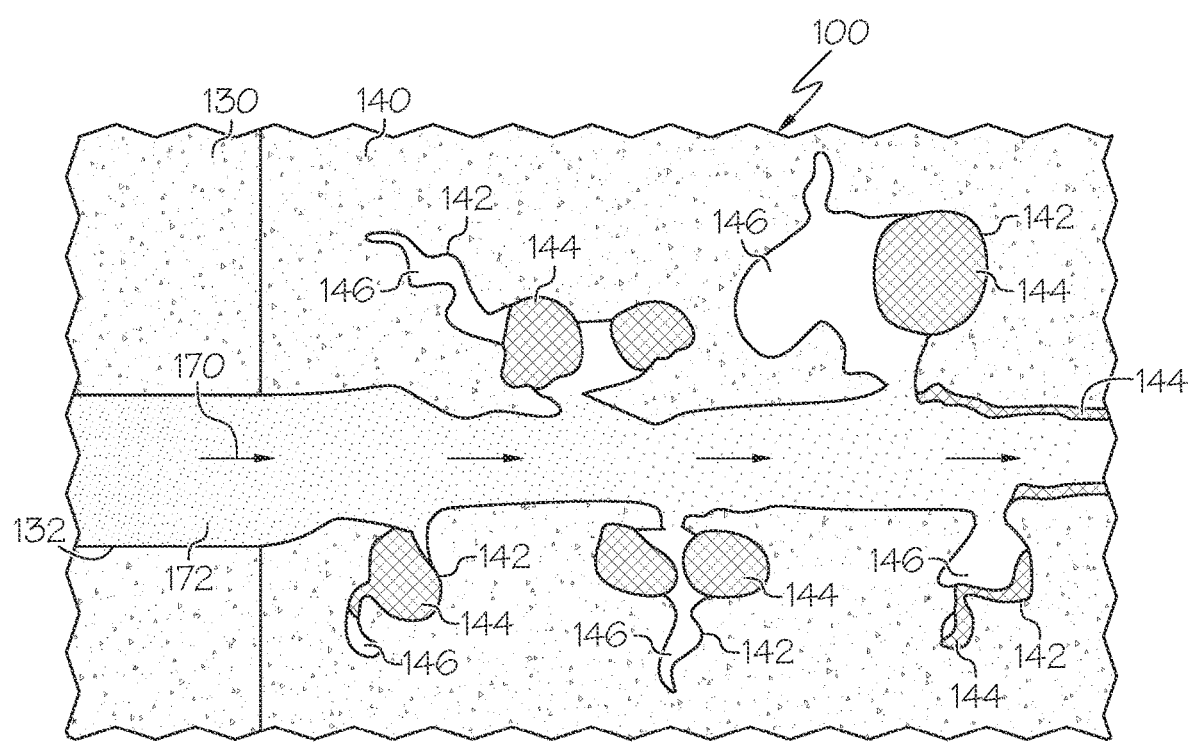
FIG. 6 schematically depicts the portion of the hydrocarbon bearing subterranean formation of FIG. 4 being treated with a treatment fluid comprising reactive nanoparticles, according to one or more embodiments shown and described in the present disclosure.

Referring now to FIG. 6, treatment of the hydrocarbon bearing subterranean formation 100 with a treatment fluid 170 comprising reactive nanoagents 172 is schematically depicted. As shown in FIG. 6, the reactive nanoagents 172 in the treatment fluid 170 may propagate through the near wellbore region 130 and penetrate into the deep regions 140, where the reactive nanoagents 170 may aid in releasing hydrocarbons 144 from the surfaces of the pores 132 to enhance oil recovery. However, these reactive nanoagents 172 can be blind to the dead pockets 142 and may not adequately penetrate into dead pockets 142 in the hydrocarbon bearing subterranean formation 100, leaving much of the hydrocarbons 144 remaining in the dead pockets 142.

As previously discussed, hydrocarbon bearing subterranean formations 100 generally include connate water 146, which can have a high salinity, such as salinity of greater than or equal to 150,000 ppmw TDS or even greater than or equal to 200,000 ppmw TDS. In embodiments, connate water 146 and other connate fluids may have salinity of from 150,000 ppmw TDS to 240,000 ppmw TDS. The dead pockets 142 in the hydrocarbon bearing subterranean formation 100 are generally regions containing connate water 146 or other connate fluids having high salinity of greater than 150 ppmw TDS. Treatment fluids 170 for injecting into hydrocarbon bearing subterranean formations 100 during EOR are typically made up using seawater, which can have a salinity of from 30,000 ppmw TDS to less than 150,000 ppmw TDS, such as from 30,000 ppmw TDS to 100,000 ppmw TDS. Thus, a salinity gradient between the greater salinity connate water 142 existing in the dead pockets 142 in the hydrocarbon bearing subterranean formation 100 and the lesser salinity of the treatment fluids 170 may exist.

Figure 7:
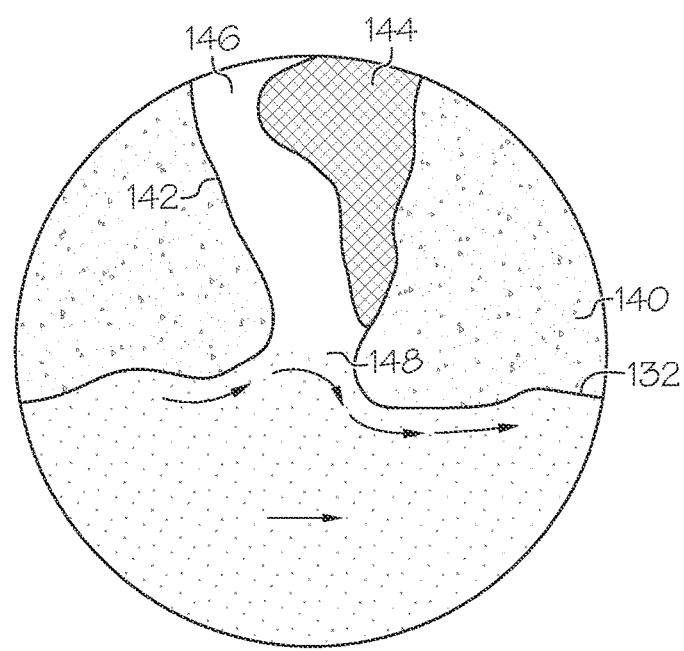
FIG. 7 schematically depicts a salinity gradient between a treatment fluid and connate water in one of the dead pockets of the portion of the hydrocarbon bearing subterranean formation of FIG. 6, according to one or more embodiments shown and described in the present disclosure.

This salinity gradient between the fluids (connate water 146, hydrocarbons, or both) in the dead pockets 142 and the treatment fluids 170 may prevent migration of the treatment fluids 170, in particular the reactive nanoagents 172 in the treatment fluids 170, into the dead pockets 142. Referring now to FIG. 7, a close up schematic representation of the opening 148 fluidly connecting a dead pocket 142 to the pore 132 is depicted. The treatment fluid 170 comprising the reactive nanoagents 172 may reach the opening 148 of the dead pocket 142. However, the greater salinity of the connate water 146 in the dead pocket 142 may prevent the reactive nanoagents 172 from migrating through the opening 148 and into the dead pocket 142. The reactive nanoagents 172 may, therefore, be unable to access the hydrocarbons in the dead pockets 142 to solubilize the hydrocarbons. Thus, treating the hydrocarbon bearing subterranean formation 100 with reactive nanoagents 172, such as surfactant-containing nanoparticles, may still be ineffective in recovering hydrocarbons 144 from dead pockets 142 in the deeper regions 140 of the hydrocarbon bearing subterranean formation 100.

The methods of the present disclosure overcome these deficiencies by treating the hydrocarbon bearing subterranean formation with a treatment fluid comprising charged reactive nanoparticles to conduct deep-reservoir EOR. The charged reactive nanoparticles may have a charge, surface functional groups, or both that allow the charged reactive nanoparticles to migrate across the salinity gradient and into the dead pockets. The charged reactive nanoparticles may possess surfactancy properties such as the ability to lower interfacial surface tension of oil and alter wettability of rock surfaces. These surfactancy properties may enable the charged reactive nanoparticles to break-up and mobilize oil in the dead pockets to facilitate recovery of the oil from the dead pockets. The charged reactive nanoparticles may include the carbon nanodots of the present disclosure, secondary charged reactive nanoparticles (e.g., salt surfactant nanoparticles), or combinations of these. The methods of the present disclosure for treating dead pockets of a hydrocarbon bearing subterranean formation rely on using the properly charged and functional charged reactive nanoparticles, such as the carbon nanodots of the present disclosure, and placing (i.e. target delivering) these in the high salinity regions of the hydrocarbon bearing subterranean formation using a mechanism known as diffusiophoresis. Not intending to be bound by any particular theory, it is believed that the charge and surface functionality of the charged reactive nanoparticles in the treatment fluid may facilitate penetration of the charged reactive nanoparticles through the salinity gradient and into the dead pockets in the deep regions, where the charged reactive nanoparticles can mobilize hydrocarbon deposits in the dead pockets.

Diffusiophoresis occurs at the interface of a salinity gradient. High salinity regions of a hydrocarbon bearing subterranean formation are commonly the regions with unrecovered hydrocarbons. Diffusiophoresis refers to the spontaneous motion of colloidal particles in response to a concentration gradient, such as the salinity gradient between connate water and treatment fluids in hydrocarbon bearing subterranean formations during an EOR treatment. Diffusiophoresis involves a combination of electric field and osmotic pressure phenomena. The electric field contribution may include coupled flow phenomena that has proved very efficient in transporting heterogeneous fluids and charged contaminants in soils and rocks under hydraulic, chemical, electrical, and thermal gradient drives. Phenomena of interest are related to either current flow or electric gradient. Such phenomena include sedimentation potential (or diffusion potential) and electrophoresis. Sedimentation or diffusion potential refers to separation of charged species leading to an electric potential. In the connate water, the separation of the salt ions in the solution of the connate water gives rise to an electric field. Electrophoresis refers to an applied electric field that induces movement of charged species in a solution. The electric field generated by separation of the salt ions in the connate water can attract or repel charged nanoparticles, such as carbon nanodots, in aqueous solution. Thus, depending on the charge of the charged nanoparticles, the electric field can drive the charged nanoparticles towards or away from the region of greater salinity.

The contribution to diffusiophoresis from osmotic pressure (chemiphoresis) may be caused by the osmotic pressure difference between outside and inside the counter-ion cloud for a colloid particle. For a particle sitting at the interface of a salinity gradient, that osmotic pressure is greater at the higher concentration side (e.g., greater salinity side). The greater osmotic pressure on the greater salinity side of the salinity gradient can cause a pumping or flow of the fluid along the curved surface of the nanoparticle contributing to the locomotion or migration of the nanoparticle in the opposite direction to flow. The nanoparticle may move towards the higher concentration (greater salinity) regardless of the sign of the zeta potential. This is known as Chemiphoresis. Charge plays a role in the electrophoresis contribution but has no impact on the chemiphoresis contribution.

Figure 8:
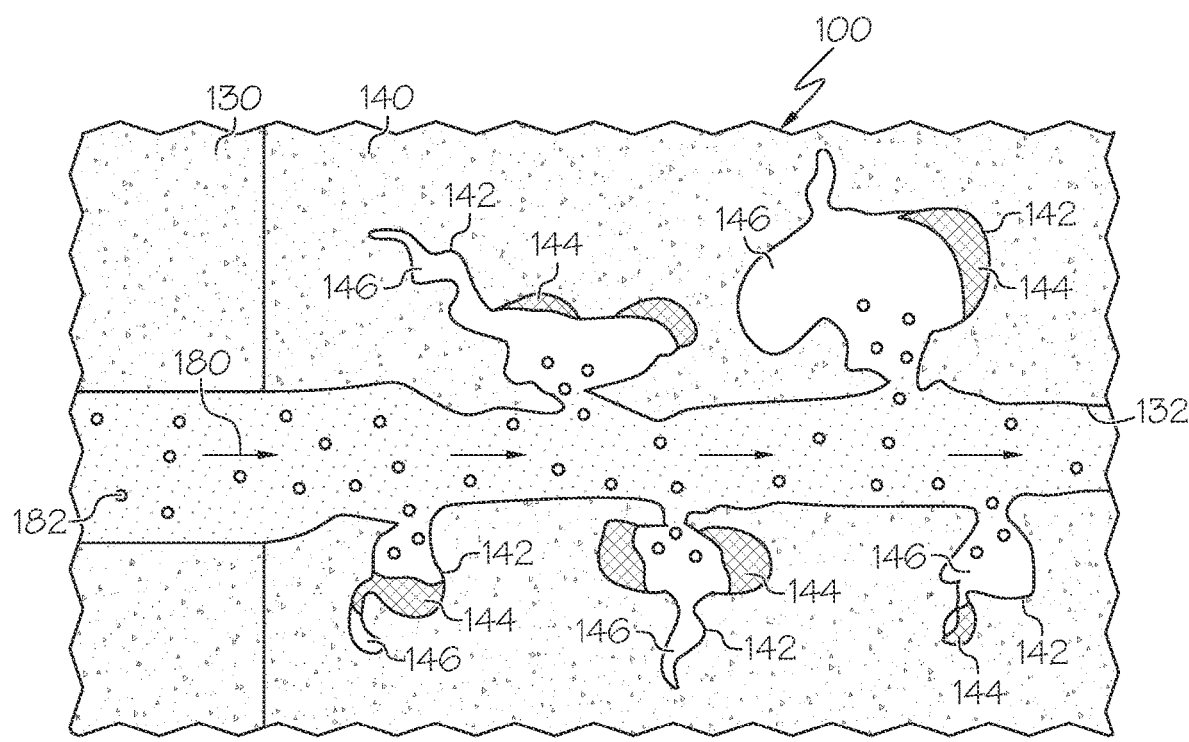
FIG. 8 schematically depicts the portion of the hydrocarbon bearing subterranean formation of FIG. 4 being treated with a treatment fluid comprising charged reactive nanoparticles, according to one or more embodiments shown and described in the present disclosure.

Not intending to be bound by any particular theory, it is believed that the charged reactive nanoparticles, such as the carbon nanodots of the present disclosure, are able to migrate, through the effects of diffusiophoresis, across the salinity gradient to penetrate into the greater salinity dead pockets, thereby allowing for recovery of hydrocarbons from the dead pockets in the hydrocarbon bearing subterranean formation. Referring to FIG. 8, in the methods of the present disclosure, the hydrocarbon bearing subterranean formation 100 may be treated with a treatment fluid 180 that includes the charged reactive nanoparticles 182, where the charged reactive nanoparticles 182 can include the carbon nanodots of the present disclosure, secondary charged reactive nanoparticles, or both. In embodiments, the charged reactive nanoparticles 182 include carbon nanodots or a combination of carbon nanodots and secondary charged reactive nanoparticles. The charged reactive nanoparticles 182, such as the carbon nanodots 184, the secondary charged reactive nanoparticles, or both may propagate through pores 132 of the hydrocarbon bearing subterranean formation 100 and into the deep regions 140.

Figure 9A:
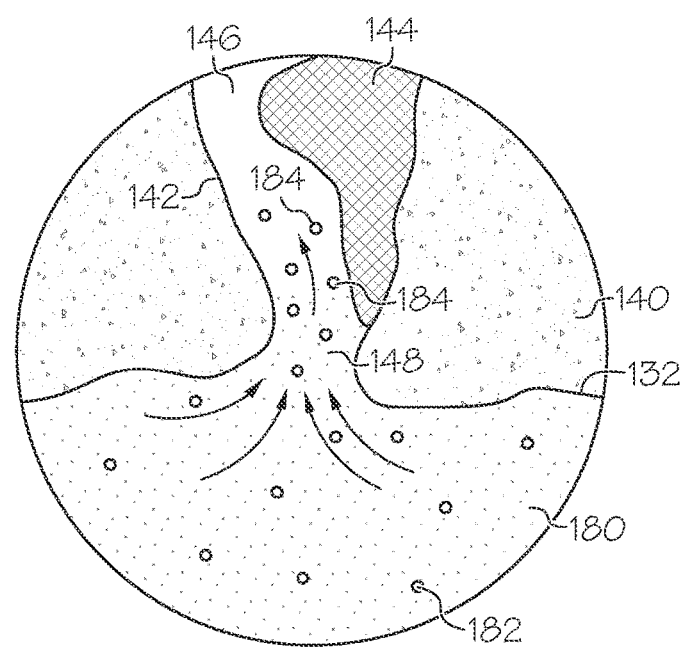
FIG. 9A schematically depicts a migration of the treatment fluid comprising the charged reactive nanoparticles across the salinity gradient and into a dead pocket of the portion of the hydrocarbon bearing subterranean formation of FIG. 8, according to one or more embodiments shown and described in the present disclosure.
Figure 9B:
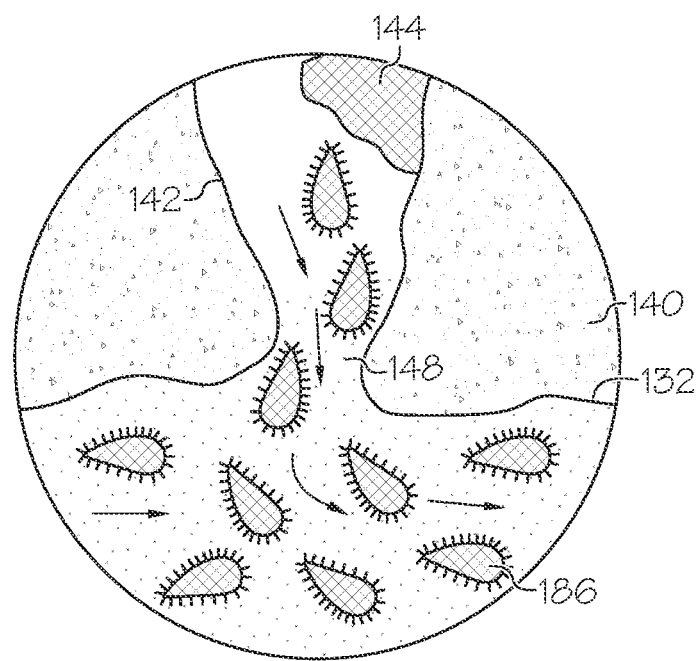
FIG. 9B schematically depicts flow of oil droplet micelles out of the dead pocket facilitated by the treatment fluid of FIG. 8, according to one or more embodiments shown and described in the present disclosure.

Referring now to FIG. 9A, treatment of the dead pockets 142 with the treatment fluid 180 comprising carbon nanodots 184 as the charged reactive nanoparticles 182 is schematically depicted. Through diffusiophoresis, the carbon nanodots 184, which have an appropriate charge as described herein (zeta potential), can migrate against the salinity gradient at the openings 148 of the dead pockets 142. Referring now to FIG. 9B, once the carbon nanodots 184 cross the salinity gradient and propagate into the dead pocket 142, the carbon nanodots 184 may interact with the hydrocarbons 144 in the dead pockets 142 to mobilize the hydrocarbons 144, such as by solubilizing droplets 186 of the hydrocarbons 144 in the aqueous treatment fluid 182. The oil droplets 186 may be solubilized by the carbon nanodots 184 or by surfactants or other reactive agents released from secondary charged reactive nanoparticles, if present. Mobilizing hydrocarbons may refer to the process of breaking the surface tension of the hydrocarbon deposits and solubilizing the hydrocarbon droplets in the treatment fluids. The solubilized oil droplets 186 may flow out of the dead pockets 142 and be transported towards the production well by the continued flow of treatment fluids 180 or waterflood fluids through the pores 132.

As previously discussed, the treatment fluids 180 for treating the deep regions 140 of the hydrocarbon bearing subterranean formation 100 to recover hydrocarbons 144 from dead pockets 142 may include the charged reactive nanoparticles 182. The charged reactive nanoparticles 182 may be the carbon nanodots of the present disclosure, secondary charged reactive nanoparticles, or combinations of these. The secondary charged reactive nanoparticles may include salt surfactant nanoparticles or nanoparticles comprising other reactive agents. The carbon nanodots may have any of the compositions, features, or characteristics previous described in the present disclosure for the carbon nanodots. In particular, the carbon nanodots may be spherical and may have an average particle diameter of less than or equal to 10 nm, such as from 2 nm to 8 nm, or from 3 nm to 5 nm. The carbon nanodots may comprise, consist of, or consist essentially of carbon, oxygen, nitrogen, and hydrogen as constituent elements. In embodiments, the carbon nanodots may include an oxygen content of greater than 20 mole percent, greater than or equal to 25 mole percent, or even greater than or equal to 28 mole percent. As previously discussed, the carbon nanodots may include one or more functional groups selected from amine groups, amide groups, carbonyl groups, carboxylate groups, hydroxylate groups, hydroxylamine groups, or combinations of these disposed at outer surfaces of the carbon nanodots. In embodiments, at least 50% of the functional groups at the surface of the carbon nanodots comprise amide groups, carboxylate groups, hydroxyl groups, or combinations of these. The carbon nanodots may not include phosphorous as a constituent element. The carbon nanodots may be hydrophilic. In embodiments, the carbon nanodots may have a zeta potential of greater than negative 10 millivolts in a solution comprising the carbon nanodots and deionized water. The carbon nanodots of the present disclosure may have a zeta potential of greater than or equal to +10 millivolts, greater than or equal to +20 millivolts, or even greater than or equal to +30 millivolts in seawater having a salinity of from 50,000 ppmw TDW to 60,000 ppmw TDS. The carbon nanodots may have any of the other features discussed in the present disclosure for the carbon nanodots.

The concentration of carbon nanodots in the treatment fluid may be sufficient to enable the carbon nanodots to reach the deep regions of the hydrocarbon bearing subterranean formation and penetrate into the dead pockets. In embodiments, the concentration of carbon nanodots in the treatment fluid may be sufficient to increase the cumulative oil recovery from the hydrocarbon bearing subterranean formation by at least 10% compared to injecting the brine solution comprising other treatment chemicals, such as molecular surfactants, without the carbon nanodots. The concentration of carbon nanodots in the treatment fluid may be less than or equal to 500 ppmw, less than or equal to 300 ppmw, less than or equal to 200 ppmw, less than or equal to 100 ppmw, or even less than or equal to 50 ppmw based on the total weight of the treatment fluid. The concentration of carbon nanodots in the treatment fluid may be greater than or equal to 10 ppmw, greater than or equal to 20 ppmw, or greater than or equal to 50 ppmw based on the total weight of the treatment fluid. The treatment fluid may include from 10 ppmw to 500 ppmw, from 10 ppmw to 300 ppmw, from 10 ppmw to 200 ppmw, from 10 ppmw to 100 ppmw, from 10 ppmw to 50 ppmw, from 20 ppmw to 500 ppmw, from 20 ppmw to 300 ppmw, from 20 ppmw to 200 ppmw, from 20 ppmw to 100 ppmw, or from 20 ppmw to 50 ppmw carbon nanodots based on the total weight of the treatment fluid. In embodiments, the charged reactive nanoparticles may consist of or consist essentially of the carbon nanodots. In embodiments, the charged reactive nanoparticles may include carbon nanodots in combination with one or more other secondary charged reactive nanoparticles.

In embodiments, the treatment fluid 180 may include secondary charged reactive nanoparticles in addition to the carbon nanodots. The secondary charged reactive nanoparticles may be nanoparticles comprising one or more active agents, such as surfactants, polymers, other compounds, or combinations of these, that are capable of solubilizing hydrocarbons, such as crude oil, from the pores of the hydrocarbon bearing subterranean formation. The secondary charged reactive nanoparticles may be operable to provide controlled release of the one or more active agents over a period of time from 1 hour to 1000 hours. The controlled release of the active agents from the secondary charged reactive nanoparticles may reduce the effects of adsorption and diffusion of the active agents into the rock of the hydrocarbon bearing subterranean formation. This may allow the active agents to be delivered to deep regions of the hydrocarbon bearing subterranean formation. The secondary charged reactive nanoparticles may include nanoparticles made from the active agent and, optionally or more other constituents, or may include nanoparticles comprising the active agent contained within an encapsulating material. In embodiments, the secondary charged reactive nanoparticles may be salt surfactant nanoparticles or nanoparticles comprising an encapsulated surfactant.

The secondary charged reactive nanoparticles may have an average particle size sufficient to propagate into deep regions of the hydrocarbon bearing subterranean formation while providing release of the active agents once disposed in the deep regions. The secondary charged reactive nanoparticles are discrete entities of solid matter in a dispersed state with a diameter at or less than about 50 micrometers (50 µm). Secondary charged reactive nanoparticles having an average particle diameter greater than 50 micrometers may get trapped in pores and may not be able to propagate through the hydrocarbon bearing subterranean formation to reach the deep regions. The secondary charged reactive nanoparticles may have an average particle size of from 50 nm to 450 nm, such as from 50 nm to 200 nm.

In embodiments, the secondary charged reactive nanoparticles may be salt surfactant nanoparticles. Examples of suitable salt surfactant particles and methods of making the salt surfactant particles are disclosed in U.S. Pat. No. 10,508,227, entitled "Controlled Release of Surfactants for Enhanced Oil Recovery," issued on Dec. 17, 2019, the entire contents of which are incorporated by reference in the present disclosure to the extent that the contents do not conflict with or contradict the present disclosure. Salt surfactant nanoparticles may include a sparingly soluble surfactant-metal salt particle that includes at least one anionic surfactant metal ion salt and at least one polymer.

The anionic surfactant metal ion salts may include one or more anionic surfactants and one or more metal ions, which combined form the anionic surfactant metal ion salt. The anionic surfactants may include but are not limited to alkyl sulfonates, alkyl aryl sulfonates (including dodecyl benzene sulfonate), alkyl aryl ether phosphates, alkyl ether phosphates, alkyl ether sulfates, alkyl sulfates, petroleum sulfonates, or combinations of these. Alkyl sulfonates are primary and secondary paraffin sulfonates (PS and SAS) and alpha-olefin sulfonates (AOS). Alkyl aryl sulfonates include alkyl benzene sulfonates such as dodecyl benzene sulfonate, which is a linear alkyl benzene (LAB) sulfonate surfactant. The alkyl sulfonates and the alkyl aryl sulfonates do not include any other heteroatoms except for the sulfonate functional group.

A petroleum sulfonate may refer to a sodium sulfonate that is prepared by treating a petroleum fraction, such as a heavy naphtha, lube oil, white oil, or a vacuum distillation cut containing C30-C40 polynuclear aromatic compounds, with sulfur trioxide ($SO_3$). The resulting petroleum sulfonate is a mixture that can comprise sulfonated benzenoid (both alkyl aryl and aryl), cycloaliphatic and paraffinic (alkyl) hydrocarbons in various ratios to one another depending on the nature of the source petroleum fraction. Another benefit is that the produced petroleum sulfonate is both water and hydrocarbon soluble. An example of a commercially-available product that contains petroleum sulfonate is PETRONATE® EOR-2095 sodium sulfonate from Chemtura. In embodiments, the anionic surfactant metal ion salt may include a petroleum sulfonate that comprises sulfonated benzenoid; cycloaliphatic, paraffinic hydrocarbons; and combinations of these. In embodiments, the anionic surfactant metal ion salt may include an anionic surfactant selected from the group consisting of an alkyl sulfonate, an alkyl aryl sulfonate, and combinations of these. In embodiments, the alkyl aryl sulfonate may be dodecyl benzene sulfonate. In embodiments, the anionic surfactant metal ion salt may be formed from an anionic surfactant comprising a sulfonate surfactant that is a mixture of a petroleum sulfonate and dodecyl benzene sulfonate.

The metal ions of the anionic surfactant metal ion salt may include, but are not limited to aluminum, calcium, magnesium, cobalt, zinc, barium, copper nitrate, strontium, or combinations of these. During synthesis of the salt surfactant particles, the metal ions for the anionic surfactant metal ion salt may be provided by one or more metal ion precursors, such as but not limited to aluminum nitrate nonahydrate, calcium chloride dihydrate, magnesium chloride hexahydrate, cobalt chloride hexahydrate, zinc chloride, barium chloride dihydrate, copper nitrate, strontium chloride hexahydrate, copper nitrate hemi(pentahydrate), or combinations of these.

As previously discussed, the salt surfactant nanoparticles may include one or more polymers in combination with the anionic surfactant metal ion salt. The polymers may provide cohesion within each of the salt surfactant nanoparticles and may operate to control the release of the anionic surfactant metal ion salt from the salt surfactant nanoparticles. Polymers suitable for inclusion in the salt surfactant nanoparticles may include but are not limited to partially hydrolyzed polyacrylamide, xanthan gum, polyvinyl pyrrolidone, hydrophobically modified hydrophilic polymers, polyvinyl acetate, polyvinyl alcohol, gelatins, or combinations of these. In embodiments, the polymer may be partially hydrolyzed polyacrylamide, xanthan gum, polyvinyl pyrrolidone, or a combination of these. In embodiments, the polymer may include one or more hydrophobically modified hydrophilic polymers. The hydrophobically modified hydrophilic polymers may include polymers made from monomers of dimethylaminoethyl methacrylate and cetyldimethylammoniumethyl methacrylate halide. An example of a commercially-available product that contains a hydrophobically modified hydrophilic polymer is HPT-1™ from Halliburton Energy Services. Although not intending to be bound by any particular theory, it is believed that the hydrophobically modified hydrophilic polymer present in HPT-1™ may be a polymer formed from the monomers of dimethylaminoethyl methacrylate and cetyldimethylammoniumethyl methacrylate halide. In embodiments, the salt surfactant nanoparticles may comprise, consist of, or consist essentially of the metal ion salt of an alkyl aryl sulfonate, the metal ion salt of a petroleum sulfonate, and a hydrophobically modified hydrophilic polymer. In embodiments, the salt surfactant nanoparticles may have an average particle size diameter in a range of from about 50 nm to about 450 nm. The salt surfactant nanoparticles of the present disclosure may be synthesized according to the methods disclosed in U.S. Pat. No. 10,508,227, which was previously cited. In particular, the salt surfactant nanoparticles may be synthesized by combining from 0.1 wt. % to 2.0 wt. % of the polymer with from 0.05 wt. % to 5 wt. % metal ion salt in an aqueous solution at a temperature between about 0° C. and 120° C. The salt surfactant nanoparticles may have a weight ratio of polymer to metal ion salt of from 0.02 to 40.

Although described herein as being salt surfactant nanoparticles, it is understood that the secondary charged reactive nanoparticles may be any other type of reactive nanoparticles, such as nanoparticles comprising encapsulated surfactants or nanoparticles comprising reactive agents other than surfactants.

The treatment fluid may include an amount of the secondary charged reactive nanoparticles sufficient to enable the secondary charged reactive nanoparticles to penetrate into the deep regions of the hydrocarbon bearing subterranean formation. The treatment fluid may include from 0.005 weight percent (50 ppmw) to 5.0 weight percent (50,000 ppmw) of the secondary reactive particles, based on the total weight of the treatment fluid. When injected as a slug of treatment fluid comprising just the secondary charged reactive nanoparticles, the treatment fluid may include from 0.05 wt. % to 5 wt. % secondary charged reactive nanoparticles based on the total weight of the treatment fluid. When the treatment fluid is injected continuously over a period of time, the concentration may be reduced so that the treatment fluid comprises from 0.005 wt. % to 1 wt. %, or from 0.005 wt. % to 0.1 wt. % secondary charged reactive nanoparticles based on the total weight of the treatment fluid.

The balance of the treatment fluid may be a brine solution. The brine solution may have a salinity of greater than 30,000 ppmw total dissolved solids (TDS), greater than or equal to 40,000 ppmw TDS, or even greater than or equal to 50,000 ppmw TDS based on the total weight of the brine solution. The brine solution may have a salinity of less than or equal to 150,000 ppmw TDS, less than or equal to 100,000 ppmw TDS, or even less than or equal to 75,000 ppmw TDS based on the total weight of the brine solution. In embodiments, the brine solution may have a salinity of from 30,000 ppmw TDS to 150,000 ppmw TDS, from 30,000 ppmw TDS to 100,000 ppmw TDS, from 30,000 ppmw TDS to 75,000 ppmw TDS, from 40,000 ppmw TDS to 150,000 ppmw TDS, from 40,000 ppmw TDS to 100,000 ppmw TDS, from 40,000 ppmw TDS to 75,000 ppmw TDS, from 50,000 ppmw TDS to 150,000 ppmw TDS, from 50,000 ppmw TDS to 100,000 ppmw TDS, from 50,000 ppmw TDS to 75,000 ppmw TDS, from 75,000 ppmw TDS to 150,000 ppmw TDS, or from 75,000 ppmw TDS to 100,000 ppmw TDS based on the total weigh to of the brine solution. The brine solution may include water and one or more salts. The salts are not particularly limited and may include, but are not limited to, alkali metal salts, alkaline earth metal salts, other metal salts, halides, sulphates, carbonates, hydroxides, etc. The brine solution may include seawater, produced water, brine solutions from crude desalting operations, synthesized brine solutions, or other salty water solution. Synthesized brine solutions refer to brine solutions prepared by purposely adding one or more salt constituents to low-salinity water, such as but not limited to municipal water, deionized water, distilled water, well water, or other low-salinity water source. In embodiments, the brine solution may be seawater having a salinity of from 50,000 ppmw TDS to 70,000 ppmw TDS, or from 55,000 ppmw TDS to 60,000 ppmw TDS. The treatment fluids may optionally include other additives commonly added to EOR treatment fluids.

The treatment fluids may be prepared by adding the charged reactive nanoparticles, such as the carbon nanodots, the secondary charged reactive nanoparticles, or both, to the brine solution and mixing the treatment fluid for a period of time under agitation sufficient to disperse the charged reactive nanoparticles in the brine solution. In embodiments, the treatment fluids may comprise, consist of, or consist essentially of the carbon nanodots in the brine solution. In embodiments, the treatment fluids may comprise secondary charged reactive nanoparticles, such as but not limited to salt surfactant nanoparticles. In embodiments, the treatment fluids may comprise, consist of, or consist essentially of the carbon nanodots and the secondary charged reactive nanoparticles in the brine solution.

The treatment fluids comprising the charged reactive nanoparticles, such as the carbon nanodots, the secondary charged reactive nanoparticles, or both may be used in enhanced oil recovery treatments to recover additional hydrocarbons from dead pockets in deep regions of the hydrocarbon bearing subterranean formation. Referring again to FIG. 8, a method for enhanced oil recovery from deep regions 142 of a hydrocarbon bearing subterranean formation 100 may include withdrawing hydrocarbons 144 from a production well (not shown) extending into the hydrocarbon bearing subterranean formation 100 and injecting the treatment fluid 180 comprising the charged reactive nanoparticles 182 dispersed in a brine solution from an injection well (not shown) into the hydrocarbon bearing subterranean formation 100. The charged reactive nanoparticles 182 may include the carbon nanodots 184, the secondary reactive nanoparticles, or both. The injection of the treatment fluid 180 may be characterized by an injection duration, an injection pressure, an injection volume, or a combination of these, that is sufficient to increase cumulative oil recovery of the hydrocarbons 144 from the hydrocarbon bearing subterranean formation 100 by at least 10% compared to injecting a brine solution by itself.

In embodiments, the hydrocarbons may be withdrawn from the production well that extends into a first subterranean formation, which may be the hydrocarbon bearing subterranean formation 100, and the treatment fluid 180 may be injected through the injection well that may extend into a second subterranean formation adjacent to the first subterranean formation. The second subterranean formation may be a hydrocarbon bearing formation or a non-hydrocarbon bearing subterranean formation. The treatment fluid 180 may flow from the second subterranean formation to the first subterranean formation. In embodiments, the injection well may extend into the first subterranean formation but may be spaced apart from the production well. The injection well may be spaced apart from the production well by a distance of greater than or equal to 100 meters, greater than or equal to 200 meters, greater than or equal to 500 meters, or even greater than or equal to 1,000 meters.

The hydrocarbon bearing subterranean formation 100 may include rock that is porous and has a wide pore size distribution. In embodiments, the rock of the hydrocarbon bearing subterranean formation 100 may have pores that can be as small as 1 micron and as large as 20 micron. The rock of the hydrocarbon bearing subterranean formation 100 may have a permeability greater than or equal to 5 millidarcies (mD), greater than or equal to 50 mD, or even greater than or equal to 500 mD. In embodiments, the rock may be low permeability rock having a permeability of from 5 mD to 50 mD. In embodiments, the rock may have a medium permeability of from 50 mD to 500 mD. In embodiments, the rock may have high permeability, such as greater than or equal to 500 mD. The hydrocarbon bearing subterranean formation 100 may comprise carbonate rock, sandstone rock, or a combination of both of these.

The hydrocarbon bearing subterranean formation 100 may have a formation temperature of from 50° C. to 250° C., from 50° C. to 200° C., from 50° C. to 150° C., or from 100° C. to 150° C. The hydrocarbon bearing subterranean formation 100 may have a formation pressure of greater than or equal to 15 psi (103 kilopascals (kPA), greater than or equal to 1,000 psi (6,895 kPa), greater than or equal to 2,000 psi (13,790 kPa), greater than or equal to 4,000 psi (27,579 kPa), greater than or equal to 5,000 psi (34,474 kPa), or even greater than or equal to 6,000 psi (41,370 kPa). The first subterranean formation 100, the second subterranean formation 122, or both may have a formation pressure of from 15 psi (103 kilopascals (kPa)) to 15,000 psi (103,421 kPa), such as from 1,000 psi to 10,000 psi (68,948 kPa), or from 1,000 psi (6,895 kPa) to 6,000 psi (41,370 kPa). The formation fluids (hydrocarbon fluids, connate water, or both) in the hydrocarbon bearing subterranean formation may have a salinity of from 150,000 ppmw to 240,000 ppmw. The treatment fluid 180 may be injected into the hydrocarbon bearing subterranean formation 100 at the formation temperature, the formation pressure, and the salinity of the hydrocarbon bearing subterranean formation 100.

Injection of the treatment fluid 180 into the hydrocarbon bearing subterranean formation may be characterized by an injection duration, an injection pressure, an injection volume, or combinations of these that may be sufficient to recover additional hydrocarbons from dead pockets of at least a portion of deep regions of the hydrocarbon bearing subterranean formation. Injection of the treatment fluid may enhance recovery of hydrocarbons from deep regions of the hydrocarbon bearing subterranean formation by at least 10% compared to injection of the brine solution by itself. The injection duration may be greater than or equal to 0.5 hours, such as greater than or equal to 1 hour, greater than or equal to 2 hours, greater than or equal to 4 hours, greater than or equal to 8 hours, greater than or equal to 12 hours, or even greater than or equal to 24 hours. The injection duration may be from 0.5 hours to 48 hours, from 0.5 hours to 24 hours, from 1 hour to 48 hours, from 1 hour to 24 hours, from 2 hours to 48 hours, from 2 hours to 24 hours, from 4 hours to 48 hours, from 4 hours to 24 hours, from 8 hours to 48 hours, from 8 hours to 24 hours, from 12 hours to 48 hours, from 12 hours to 24 hours, or from 24 hours to 48 hours. In embodiments, the injection duration may be greater than 48 hours. The injection pressure may be greater than or equal to a formation pressure in the hydrocarbon bearing subterranean formation, such as the first subterranean formation or the second subterranean formation, and less than a pressure sufficient to cause fracture of the hydrocarbon bearing subterranean formation. The injection pressure may be greater than or equal to 1,000 psi (6,895 kPa) or greater than or equal to 6,000 psi (41,370 kPa). In embodiments, the injection pressure may be from 1,000 psi to 15,000 psi (103,421 kPa), from 1,000 psi (6,895 kPa) to 10,000 pounds per square inch (68,948 kPa), or from 1,000 psi to 6,000 kPa (41,370 kPa).

In embodiments, the injection volume of the treatment fluid may be of greater than or equal to at least one times the total pore volume of the deep region of the hydrocarbon bearing subterranean formation to which the enhanced oil recovery process is targeted. In embodiments, the treatment fluid comprising the charged reactive nanoparticles may be injected as a slug of concentrated treatment fluids followed by continued injection of brine or seawater following injection of the slug. The slug comprising the treatment fluid may have a volume of from 100 barrels to 500 barrels (15.9 cubic meters to 79.5 cubic meters). In embodiments, the treatment fluid in the slug may have a concentration of carbon nanodots of greater than or equal to 50 ppmw, greater than or equal to 100 ppmw, or from 50 ppmw to 500 ppmw based on the total weight of the treatment fluid. When injecting as a slug, the treatment fluid may have a greater concentration of charged reactive nanoparticles due to dilution of the treatment fluid by subsequent injection of seawater following injection of the slug.

In embodiments, after injection of the treatment fluid, the treatment fluid comprising the charged reactive nanoparticles may be maintained in the hydrocarbon bearing subterranean formation for a shut-in period having a duration sufficient to allow the charged reactive nanoparticles to penetrate into the dead pockets in the deep region. The duration of the shut in period may be from 1 hour to 1,000 hours. After the shut in period, the slug of the treatment fluid comprising the charged reactive nanoparticles may be followed by water flooding. In embodiments, injection of the slug of treatment fluid comprising the charged reactive nanoparticles may be immediately followed by a first water injection stage operable to push the treatment fluid into the deep regions of the hydrocarbon bearing subterranean formation. Once the treatment fluid is positioned in the deep regions targeted for treatment, the first stage water treatment may be ceased and the treatment fluid may be maintained in the deep region of the hydrocarbon bearing subterranean formation for the shut-in period. A second water injection stage may follow the shut-in period to convey hydrocarbons recovered from the dead pockets to the production well.

In embodiments, the treatment fluid may comprise, consist of, or consist essentially of the carbon nanodots in the brine solution, and the treatment fluid may be continuously injected over a period of time, such as for the injection duration, which may be greater than the time required for injection of a slug. When injected continuously, the treatment fluid comprising the carbon nanodots may have a more diluted concentration of carbon nanodots, such as a concentration of carbon nanodots of from 10 ppmw to 50 ppmw based on the total weight of the treatment fluids. The volume of the treatment fluid may be sufficient to cover several pore volumes of the subterranean formation near the injection well and lesser pore volumes as the treatment fluid progresses away from the injection well. In embodiments, the treatment fluid may comprise, consist of, or consist essentially of the secondary charged reactive nanoparticles, such as salt surfactant nanoparticles, in the brine solution, and the treatment fluid may be continuously injected over a period of time, such as for the injection duration, which may be greater than the time required for injection of a slug. When injected continuously, the treatment fluid comprising the secondary charged reactive nanoparticles may have a more diluted concentration of the secondary charged reactive nanoparticles, such as a concentration of secondary charged reactive nanoparticles of from 50 ppmw to 100 ppmw based on the total weight of the treatment fluids. The secondary charged reactive nanoparticles may be salt surfactant nanoparticles.

In embodiments, the methods for enhanced oil recovery from deep regions 142 of the hydrocarbon bearing subterranean formation 100 may include injecting a slug of a first treatment fluid into the hydrocarbon bearing subterranean formation 100 followed by continuous injection of a second treatment fluid into the hydrocarbon bearing subterranean formation 100. The first treatment fluid may comprise, consist of, or consist essentially of the salt surfactant nanoparticles dispersed in a brine solution. The first treatment fluid may include from 0.05 wt. % to 5 wt. % salt surfactant nanoparticles based on the total weight of the first treatment fluid. The second treatment fluid may comprise, consist of, or consist essentially of the carbon nanodots in the brine solution. The second treatment fluid may include from 10 ppmw to 500 ppmw, such as from 10 ppmw to 100 ppmw, or from 10 ppmw to 50 ppmw carbon nanodots based on the total weight of the second treatment fluid.

In embodiments, the methods of the present disclosure may include recovering at least a portion of the treatment fluid at the production well. At least a portion of the carbon nanodots may be recovered from fluids produced at the production well and reused in subsequent EOR treatments.

EXAMPLES

The various embodiments of the carbon nanodots and methods employing the carbon nanodots of the present disclosure will be further clarified by the following examples. The examples are illustrative in nature, and should not be understood to limit the subject matter of the present disclosure.

Example 1: Synthesis of Carbon Nanodots

In Example 1, the carbon nanodots of the present disclosure are synthesized. Hydrophilic carbon nanodots, for example, 3-8 nm in size are synthesized using citric acid and ethanolamine as a precursor. An initial mixture comprising citric acid and ethanolamine in a molar ratio of citric acid to ethanolamine of 1:3 was prepared. The initial mixture was prepared by dissolving the citric acid (citric acid monohydrate 99.5%) and the ethanolamine (99%) separately in fixed amounts of deionized water and then mixed together using a magnetic stirrer. The initial mixture was then heated to about 70° C. on a hot plate under constant stirring to evaporate the majority of the water from the initial mixture to produce a reaction mixture. When the reaction mixture became syrupy, the magnetic bar was removed and the reaction mixture was placed in a furnace and heated to 180° C. at a heating rate of 10 degrees Celsius per minute (° C./min). The reaction mixture was subjected to pyrolytic decomposition at 180° C. for 2 hours with no solvent present. The resulting black particulate product was allowed to cool to room temperature and purified using dialysis. The products are highly soluble/dispersible in water.

Example 2: Effects of Carbon Nanodots on Surface Wettability

In Example 2, the effects of the carbon nanodots of Example 1 were studied as a function of temperature, pressure, brine salinity, and particles concentration. Two Indiana limestone rock samples, in the shape of discs with the dimensions 2.521 centimeters (cm) in diameter and 0.356 cm in height were used as the substrates providing the surface. One sample was saturated with a brine solution comprising seawater (57,000 ppm Total Dissolved Solids (TDS)) and the other sample was saturated with "ARAB-D" crude oil. The petrophysical properties of the two core samples are provided in the following Table 1.

TABLE 1

Properties of Rock Samples for Example 2

| Rock Type | Thickness (cm) | Diameter (cm) | Pore Volume (mL) | Porosity (%) | Permeability (milliDarcies (mD)) | |
|---|---|---|---|---|---|---|
| | | | | | Gas (He) | Brine (sea water) |
| Indiana Limestone (carbonate) - brine saturated | 0.356 | 2.521 | 0.343 | 19.11 | 256.28 | 221.0 |
| Indiana Limestone (carbonate) - crude oil saturated | 0.351 | 2.521 | 0.334 | 19.09 | 256.28 | 221.0 |

The pore volume, porosity, and permeability of the core samples in Table 1 were determined using an Automated Helium Porosimeter and Permeameter (APP-608). Each core sample was placed inside the coreholder sleeves and a confining pressure of 500 psi was applied. Porosity was determined first, followed by permeability. The measurement of porosity was based on Boyle's Law which states that product of pressure and volume of an ideal gas at any constant temperature will always be constant. This principle is utilized to determine an unknown volume (pore volume) by expanding a gas (Helium) of known pressure and temperature condition into a void space of known volume. The physical dimensions of the core sample are used as input which provides the bulk volume and the ratio of the determined pore volume and bulk volume provides the porosity.

The gas or air permeability of the core sample was determined by the pulse decay method. This measurement works on the principle of transient analysis of pressure pulse decay in which gas permeability is determined as a function of gas (ideally helium) pressure decay. This equipment consists of a reference cell of known volume that charges the core sample with gas. A downstream valve vents the gas pressure, and pressure change as a function of time is recorded which is analyzed by the software to give a gas permeability of the core sample.

Liquid/brine permeability of a core sample was calculated by establishing a steady state flow of brine across the sample and recording the upstream and downstream pressures. In these Examples, each core sample was loaded in a core flooding apparatus and a confining pressure of 4500 psi was applied. The back pressure was held at about 3200 psi and brine was injected and the response monitored at different rates (e.g. 0.5 cc/min, 1 cc/min, and 2 cc/min). The steady state condition was monitored by ensuring that the inflow and outflow rates are identical. The difference of upstream and downstream pressures (delta P), the flow rate, and dimensions of the core samples were used to calculate the brine permeability using Darcy's law.

To evaluate the effects of the carbon nanodots on the wettability of the surface, both standard (i.e. static) and dynamic contact angle measurements were made at 298.15 degrees Kelvin (K) and atmospheric pressure for an oil droplet of the face of each of the rock samples. The static contact angle measurements demonstrated the effects of the carbon nanodots on wetting the surface and the dynamic contact angle measurements demonstrated the effect of the carbon nanodots on wettability change (dynamic) of an oil droplet on the face of a rock sample. Higher pressure and temperature experiments yielded similar results.

Static Contact Angle Measurements

Figure 10:
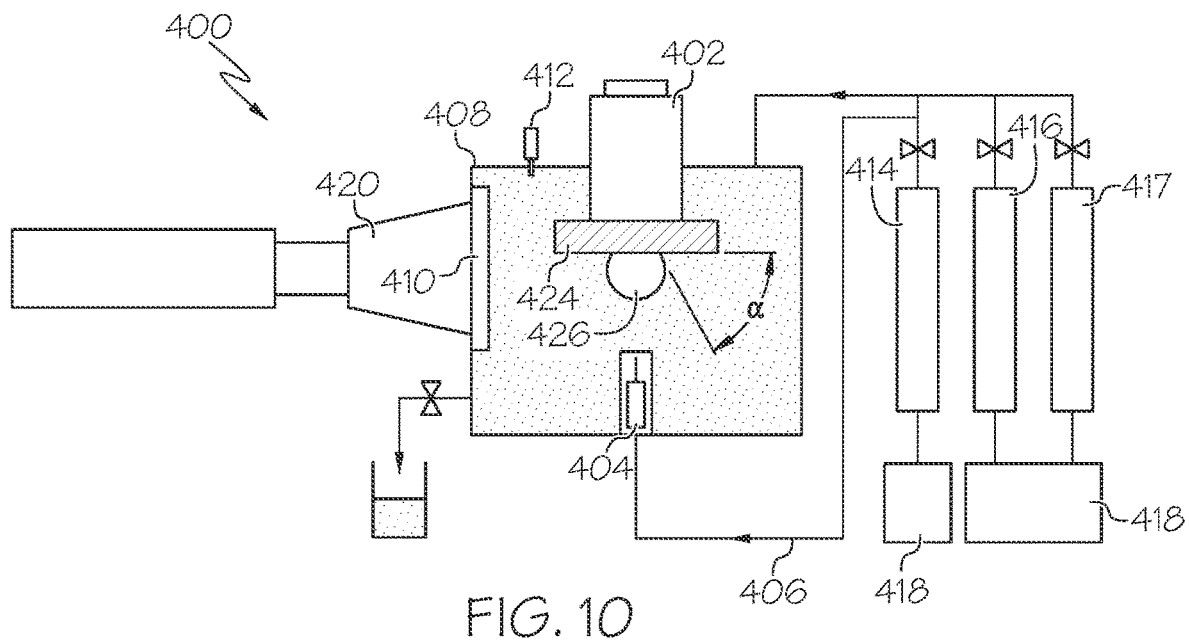
FIG. 10 schematically depicts an experimental setup for measuring contact angle of a crude oil droplet on a surface of a substrate submerged in a solution containing carbon nanodots, according to one or more embodiments shown and described in the present disclosure.

Now referring to FIG. 10, an experimental set-up 400, Interfacial Tension Meter (IFT-700, Vinci Tech), used for the measurement of contact angles in Example 2 is schematically depicted. The contact angle measurements are made using the invert sessile drop method. The experimental set-up 400 included a sample holder 402, syringe 404 loaded with crude oil 406, fluid cell 408 with a sapphire glass window 410, a thermostat 412 for temperature control, an oil accumulator 414 for oil storage, a brine accumulator 416 for brine storage, pumps 418 for pressure control and a high-resolution digital camera 420 for image capture and analysis. First, the fluid cell 408 was filled with the brine solution 422. The rock sample 424 (either water or oil saturated) was then mounted on the sample holder 402 on top of the fluid cell 408 and immersed in the brine solution. The brine solution 422 comprised seawater (57,000 ppm TDS). The system was left to equilibrate for 30-60 minutes. After equilibration of the rock sample 424 in the brine solution 422, an oil droplet 426 was released from the syringe 404 at the bottom of the fluid cell 408 into the brine solution 422. The oil droplet 426 was then allowed to stabilize for 15-30 minutes on the surface of the rock sample 424 before the contact angle θ (theta) was measured. The contact angle was measured by capturing a digital image of the oil droplet 426 using the high-resolution digital camera 420, and calculating the contact angle (theta) using a computing device and image analysis software. The contact angle (theta) is defined as the angle between the surface of the rock sample 424 and a line tangent to the outer surface of the oil droplet 426 at the point where the oil droplet 426 contacts the surface of the rock sample 424.

Figure 11A:
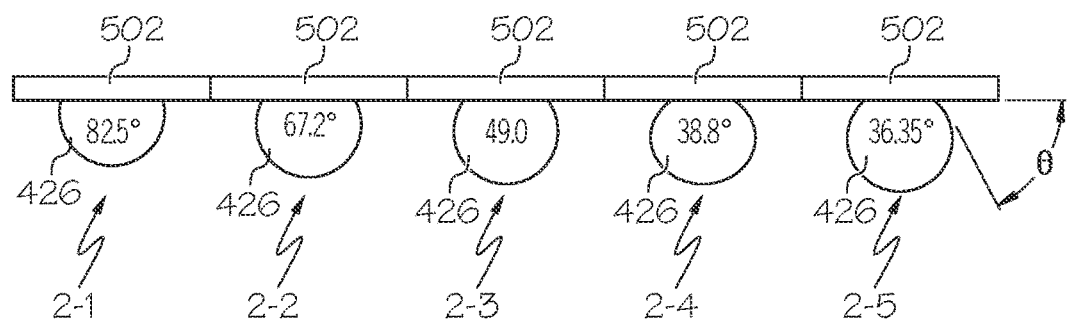
FIG. 11A schematically depicts static contact angle measurements of crude oil droplets on a surface of a brine-saturated rock sample at different concentrations of carbon nanodots in a solution in which the rock sample is submerged, according to one or more embodiments shown and described in the present disclosure.
Figure 11B:
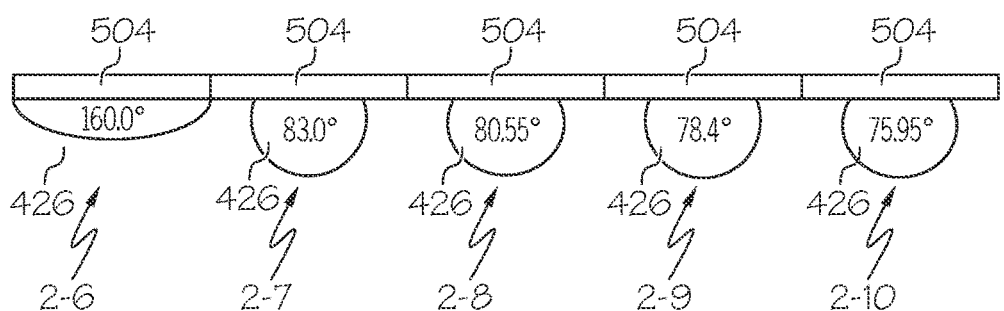
FIG. 11B schematically depicts static contact angle measurements of crude oil droplets on a surface of a crude oil saturated rock sample at different concentrations of carbon nanodots in a solution in which the rock sample is submerged, according to one or more embodiments shown and described in the present disclosure.

Referring now to FIGS. 11A and 11B, diagrams of the oil droplets 426 on the surface of the rock sample at different concentrations of carbon nanodots in the brine solution 422 are schematically depicted for both the brine saturated rock sample 502 (FIG. 11A) and the crude oil saturated rock sample 504 (FIG. 11B) of Example 2 at 298.15 K and 14.7 pounds per square inch. The results of the contact angle (theta) for the oil droplet 426 as a function of the concentration of carbon nanodots in the brine solution 422 are provided in the following Table 2. The concentration of nanodots is given in weight percent (wt. %) and in parts per million by weight (ppmw).

TABLE 2

Static Contact Angle Measurements for Example 2

| Sample # | Sample Type | Saturate Type | Carbon Nanodot Concentration wt. % | Carbon Nanodot Concentration ppmw | Contact Angle (degrees) | Change* (%) |
|---|---|---|---|---|---|---|
| 2-1 | Comparative | Seawater | 0 | 0 | 82.5 | — |
| 2-2 | Example | Seawater | 0.001 | 10 | 67.2 | −18.6 |
| 2-3 | Example | Seawater | 0.005 | 50 | 49.0 | −40.6 |
| 2-4 | Example | Seawater | 0.020 | 200 | 38.8 | −53.0 |
| 2-5 | Example | Seawater | 0.050 | 500 | 36.6 | −55.6 |
| 2-6 | Comparative | Crude Oil | 0 | 0 | 160.0 | — |
| 2-7 | Example | Crude Oil | 0.001 | 10 | 83.0 | −48.1 |
| 2-8 | Example | Crude Oil | 0.005 | 50 | 80.6 | −49.6 |
| 2-9 | Example | Crude Oil | 0.020 | 200 | 78.4 | −51.0 |
| 2-10 | Example | Crude Oil | 0.050 | 500 | 76.0 | −52.5 |

Referring again to FIG. 11A, the brine saturated rock sample 502 of sample 2-1, which was a comparative example, exhibited neutral wet properties in seawater with no carbon nanodots. Neutral wet properties correspond to static contact angles around 90 degrees. When the contact angle is greater than 90 degrees, the rock sample is considered to exhibit more oil wet properties, and when the contact angle is less than 90 degrees, the rock sample is considered to exhibit more water wet properties. The presence of the carbon nanodots in samples 2-2 through 2-5 caused the wettability to shift strongly to water wet. As shown in FIG. 11A and the data in Table 2, the shift to water wettability was shown to increase with increasing concentration of carbon nanodots in the brine solution. As shown in Table 2, adding the carbon nanodots to the brine solution in concentrations of from 10 ppmw to 500 ppmw can reduce the static contact angle by from 18.6% to 55.6%, which indicates an increase in water wettability and a decrease in oil wettability.

Referring again to FIG. 11B, the crude oil saturated rock sample 504 of sample 2-6, which was also a comparative example, exhibited oil-wet properties in seawater with no carbon nanodots, as shown by the static contact angle of 160 degrees. The presence of the carbon nanodots in samples 2-7 through 2-10 caused the wettability to shift to neutral wet or even slightly water wet, as indicated by the decrease in the contact angle from 160 degrees for comparative example 2-6 to 83 degrees for example 2-7 and even down to 76 degrees for example 2-10. As shown in FIG. 11B and the data in Table 2, the shift from oil wettability to neutral and water wettability was shown to increase with increasing concentration of carbon nanodots in the brine solution. As shown in Table 2 above, adding the carbon nanodots to the brine solution in concentrations of from 10 ppmw to 500 ppmw can reduce the static contact angle by from 48% to 52.5%, which indicates the surface of the crude oil saturated rock sample 504 becoming more hydrophilic with increasing carbon nanodot concentration. In particular, even the addition of 10 ppmw carbon nanodots to the brine solution reduced the contact angle by 48%, indicating a shift in the surface from oil wettability to neutral or even slightly water wet.

Dynamic Contact Angle Measurements

A dynamic wettability study was performed on a crude oil saturated rock sample 504 using the experimental set-up previously described in Example 2. The dynamic contact angle study was performed at a temperature of 298.15 K and 14.7 psi (101.35 kilopascals or atmospheric pressure). Initially, the crude oil saturated rock sample 504 was immersed in the brine solution (seawater (57,000 ppm TDS)) with no carbon nanodots, and the oil droplet 426 was released to rest on the face of the rock (identical to the static setup). The system was allowed to equilibrate for 24 hours before measuring the contact angle. Afterwards, a new brine solution having an increased concentration of the carbon nanodots was introduced to substitute the fluid in the fluid cell and the contact angle was measured after a 24 hour period for each new concentration of carbon nanodots. The contact angles are shown graphically in FIG. 12 and provided numerically in Table 3.

TABLE 3

Dynamic Contact Angle as a Function of Concentration of Carbon Nanodots

| Sample # | Sample Type | Saturate Type | Carbon Nanodot Concentration wt. % | Carbon Nanodot Concentration ppmw | Contact Angle (degrees) | Change* (%) |
|---|---|---|---|---|---|---|
| 2-11 | Comparative | Crude oil | 0 | 0 | 160.0 | — |
| 2-12 | Example | Crude oil | 0.005 | 50 | 147.3 | −7.9 |
| 2-13 | Example | Crude oil | 0.0075 | 75 | 141.5 | −11.6 |
| 2-14 | Example | Crude oil | 0.010 | 100 | 137.5 | −14.1 |
| 2-15 | Example | Crude oil | 0.030 | 300 | 125.4 | −21.6 |

Figure 12:
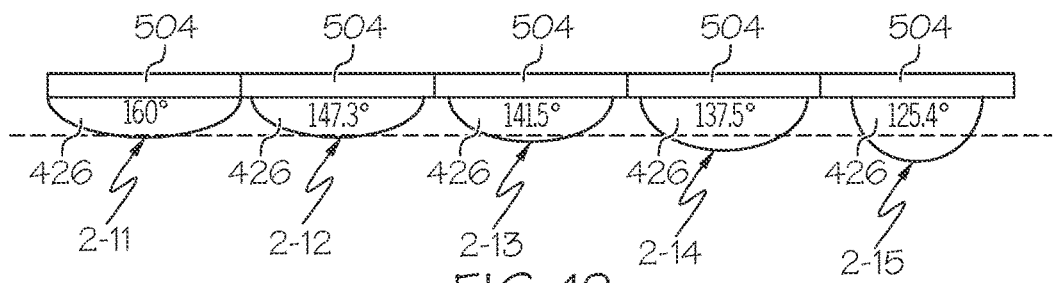
FIG. 12 schematically depicts dynamic contact angle measurements of crude oil droplets on a surface of a crude oil saturated rock sample at different concentrations of carbon nanodots in a solution in which the rock sample is submerged, according to one or more embodiments shown and described in the present disclosure.

Referring to FIG. 12, an example diagram of the results of the effect of the different concentrations of the CND on the dynamic contact angle measurement of the crude oil rock sample rock (oil saturated)-seawater system is provided. As shown in FIG. 12 and in Table 3, increasing the concentration of carbon nanodots in the brine solution reduces the degree to which the surface of the crude oil saturated rock sample 504 is oil wet. In other words, the greater concentration of carbon nanodots in the brine solution, the lesser oil-wet the surface of the crude oil saturated rock sample 504 becomes. This effect is emphasized clearly with an increase in the wedging effect on the oil droplet 426 as a function of the nanodots concentration, as shown in FIG. 12.

Figure 13:
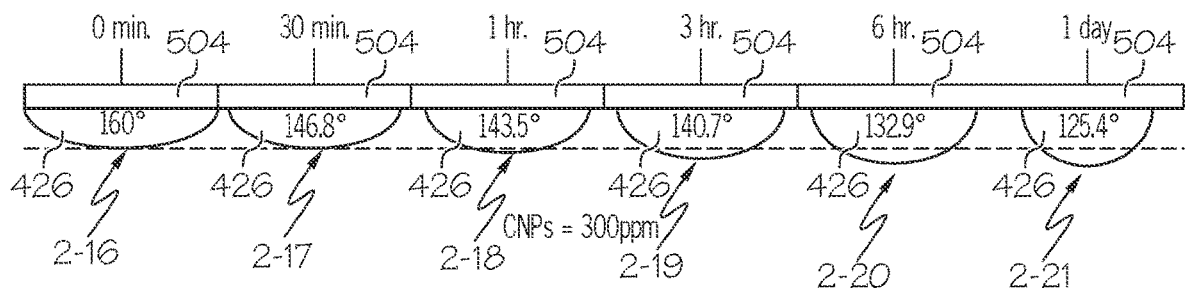
FIG. 13 schematically depicts dynamic contact angle measurements of crude oil droplets on a surface of a crude oil saturated rock sample at different durations of time after contact with the surface for a fixed concentration of carbon nanodots, according to one or more embodiments shown and described in the present disclosure.

In a second dynamic contact angle study, a crude oil saturated rock sample 504 was immersed in a brine solution comprising no carbon nanodots. The oil droplet 426 was released to contact the surface of the crude oil saturated rock sample 504, and the system was allowed to equilibrate for 24 hours. The initial contact angle of the oil droplet in the brine solution was measured (time equal to 0 (zero)). Afterwards, a brine solution comprising 300 ppmw carbon nanodots was introduced to the fluid cell to replace the initial brine solution, and the contact angle was measured at time equal to 0.5 hours, 1 hour, 3 hours, 6 hours, and 24 hours. The dynamic contact angle measurements at each time is provided graphically in FIG. 13 and numerically in Table 4. As shown in FIG. 13 and Table 4, the contact angle decreased with increasing time exposure to the brine solution comprising 300 ppmw carbon nanodots, which indicates that the wettability of the surface of the crude oil saturated rock sample 504 decreased in oil wettability as the exposure time to the brine solution with the carbon nanodots increases.

core samples used in the coreflood experiments were Indiana limestone (carbonate rock) cores, the properties of which are provided in Table 5. The core samples were initially saturated with formation water (220,000 ppm in TDS) under vacuum. The saturated core samples were then de-saturated (using either the porous plate or centrifuge methods) to measure the irreducible water saturation. The core samples were then re-saturated with Arab-D crude oil and aged for 2 weeks at 100° C.

Figure 14:
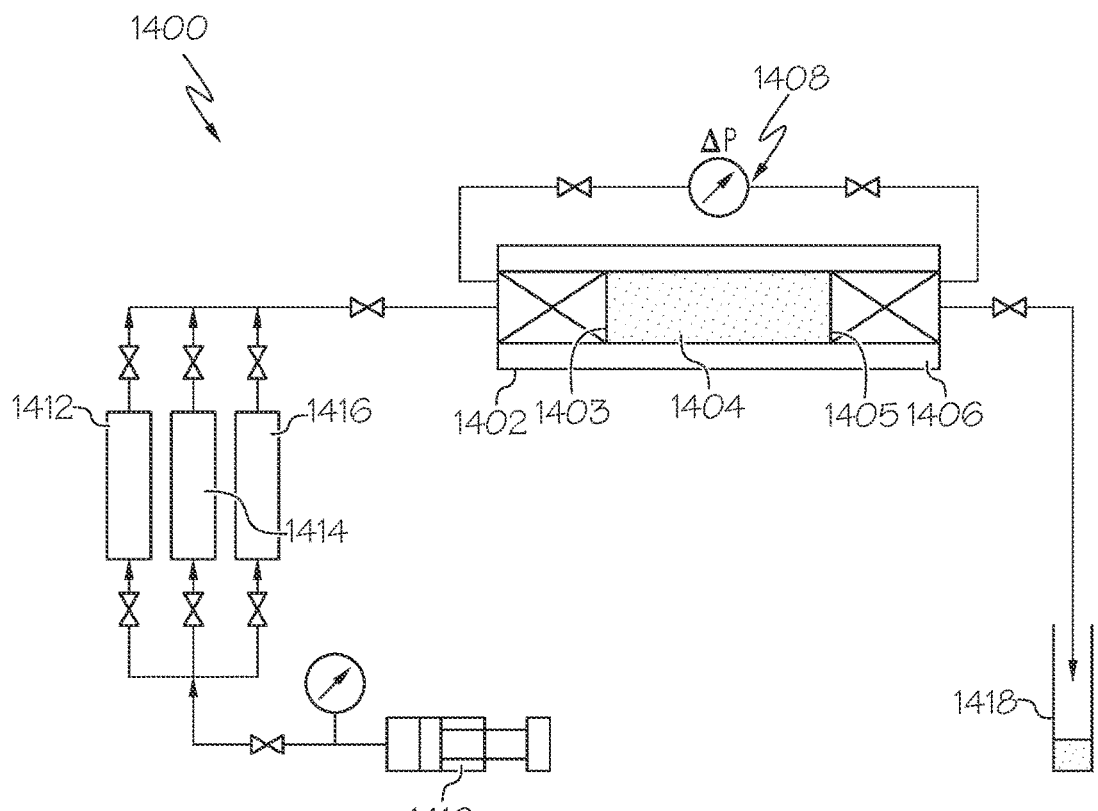
FIG. 14 schematically depicts an experimental setup for conducting coreflood experiments on core samples, according to one or more embodiments shown and described in the present disclosure.

Referring now to FIG. 14, the coreflood experimental system 1400 for conducting the coreflood experiments of Example 5 is schematically depicted. The coreflood experimental system 1400 includes a core holder 1402 operable to hold the core sample 1404 and direct a fluid longitudinally through the core sample 1404 from the upstream end 1403 to the downstream end 1405. The core holder 1402 may include a confining fluid 1406 that may be operable to maintain the core sample 1404 at a simulated downhole operating pressure and to prevent the fluids directed into the core sample 1404 from passing radially outward out of the core sample 1404. The core holder 1402 may include a

TABLE 4

Dynamic Contact Angle Measurements As a Function of Exposure Time

| Sample # | Sample Type | Saturate Type | Carbon Nanodot Cone (ppmw) | Exposure Time (hours) | Contact Angle (degrees) | Change* (%) |
|---|---|---|---|---|---|---|
| 2-16 | Comparative | Crude oil | 300 | 0 | 160.0 | — |
| 2-17 | Example | Crude oil | 300 | 0.5 | 146.8 | −8.3 |
| 2-18 | Example | Crude oil | 300 | 1 | 143.5 | −10.3 |
| 2-19 | Example | Crude oil | 300 | 3 | 140.7 | −12.1 |
| 2-20 | Example | Crude oil | 300 | 6 | 132.9 | −16.9 |
| 2-21 | Example | Crude Oil | 300 | 2424 | 125.4 | −21.6 |

Comparative Example 3: Cationic Gemini Surfactant

In Comparative Example 3, a cationic gemini surfactant was synthesized. The cationic gemini surfactant was synthesized according to the methods disclosed in Hussain, S. S., Kamal, M. S., Fogang, L. T. and Patil, S., "Effect of the number of ethylene oxide units on the properties of synthesized tailor-made cationic gemini surfactants for oilfield applications" JOURNAL OF MOLECULAR STRUCTURE, 1196, (2019) pp. 851-860, the entire contents of which are incorporated by reference in the present disclosure. The cationic gemini surfactant was used as a standard to evaluate the efficiency of carbon nanodots for use in enhanced oil recovery processes.

Comparative Example 4: Anionic Alpha Olefin Sulfonate (AOS) Surfactant

An anionic alpha olefin sulfonate (AOS) surfactant was also included in the study for comparison. The alpha olefin sulfonate (AOS) surfactant was sodium alpha-olefin (C14-16) sulfonate (CAS No.: 68439-57-6-sulfonic acids, C14-16-alkane hydroxy and C14-16-alkene, sodium salts) obtained from Al-Biariq Petrochemical.

Examples 5 and 6: Coreflood Experiments

In Examples 5 and 6, treatment fluids comprising the carbon nanodots were evaluated for use in enhanced oil recovery processes by conducting coreflood studies. The pressure regulation system 1408 operable to regulate the pressure of the core sample 1404. The coreflood experimental system 1400 may also include a high-pressure pump 1410, a brine solution accumulator 1412, a carbon nanodot solution accumulator 1414, a surfactant accumulator 1416, and a fraction collector 1418 as depicted in FIG. 14.

The brine solution (seawater having 57,500 ppm TDS), a carbon nanodot solution (200 ppmw carbon nanodots in seawater), and a surfactant solution (200 ppmw cationic gemini surfactant in seawater) were placed into each of the brine solution accumulator 1412, the carbon nanodot solution accumulator 1414, and the surfactant accumulator 1416, respectively. The oil-saturated core sample 1404 was subjected to an overburden pressure of 4,500 psi (31,026 kPa) and a pore pressure of 3,200 psi (22,063 kPa) and was heated to 100° C.

For Example 5, a brine solution flood was first applied to the saturated core sample at a rate of 0.1 cubic centimeters per minute (cc/min) and the fractions recovered from the core sample 1404 collected in the fraction collector 1418. The brine solution flood was continued for 2 to 3 times the pore volume of the core samples (2-3 PV) until the water-cut exceeded 95% or oil production is no more registrable.

For Example 5, the feed was changed over to the carbon nanodot solution in a second coreflood stage. In the second stage, the flood of carbon nanodot solution was applied to the saturated core sample at a rate of 0.1 cc/min and was continued (for 2-3 PV) until the water-cut exceeded 95% or oil production is no more registrable. In a third stage, the feed was changed over to the surfactant solution comprising the cationic gemini surfactant in seawater. In the third stage, the flood of surfactant solution was applied to the saturated core sample at a rate of 0.1 cc/min and was continued (for 2-3 PV) until the water-cut exceeded 95% or oil production is no more registrable. The petrophysical properties of the core samples and the oil recovery for Example 5 is provided in Table 5.

For Example 6, the feed was changed over to the surfactant solution in the second coreflood stage. In the second coreflood stage, the flood of surfactant solution was applied to the saturated core sample at a rate of 0.1 cc/min and was continued (for 2-3 PV) until the water-cut exceeded 95% or oil production is no more registrable. In the third stage, the feed was changed over to the carbon nanodot solution comprising the carbon nanodots in seawater. In the third stage, the flood of carbon nanodot solution was applied to the saturated core sample at a rate of 0.1 cc/min and was continued (for 2-3 PV) until the water-cut exceeded 95% or oil production is no more registrable. The petrophysical properties of the core samples and the oil recovery for Example 6 is also provided in Table 5. The effects of differences in pore volume, porosity, and permeability between the core samples of Examples 5 and 6 are negligible.

TABLE 5

| Property | Example 5 | Example 6 |
|---|---|---|
| Core Length (cm) | 8.999 | 9.404 |
| Core Diameter (cm) | 3.736 | 3.781 |
| Pore Volume (cc) | 20.557 | 21.403 |
| Porosity (%) | 18.54 | 19.14 |
| Gas Permeability (He in mD) | 106.62 | 142.44 |
| Oil Permeability (mD) | 18.22 | 22.41 |
| *OOIP(cm$^3$) | 15.33 | 13.71 |
| $S_{oi}$ (%) (initial oil saturation) | 74 | 65 |
| $S_{wi}$ (%) (initial water saturation) | 26 | 35 |
| Oil Recovery (%) Based on Original Oil In Place (OOIP) | | |
| Stage 1 Flood | Seawater | Seawater |
| Stage 1 Oil Recovery (%) | 40.57 | 35.09 |
| Stage 2 Flood | Carbon Nanodot Solution | Surfactant Solution |
| Stage 2 Oil Recovery (%) | 19.89 | 10.94 |
| Stage 3 Flood | Surfactant Solution | Carbon Nanodot Solution |
| Stage 3 Oil Recovery (%) | 9.19 | 17.54 |
| Cumulative Oil Recovery (%) | 69.65 | 63.57 |

*OOIP refers to the original oil in-place in the core sample.

As shown in Table 5, the carbon nanodot solution comprising 200 ppmw carbon nanodots in seawater provided greater oil recovery in the second stage (19.89% original oil in place (OOIP) for Example 5) compared to the oil recovery obtained by the surfactant solution (10.94% OOIP for Example 6). The carbon nanodot solution also provided greater oil recovery in the third stage compared to the oil recovery obtained by using the surfactant solution in the third stage. The cumulative oil recovery of 69.65% OOIP using the carbon nanodot solution in the second stage as in Example 5 was greater than the cumulative oil recovery of 63.57% OOIP obtained when the surfactant solution was used in the second stage as in Example 6.

Figure 15:
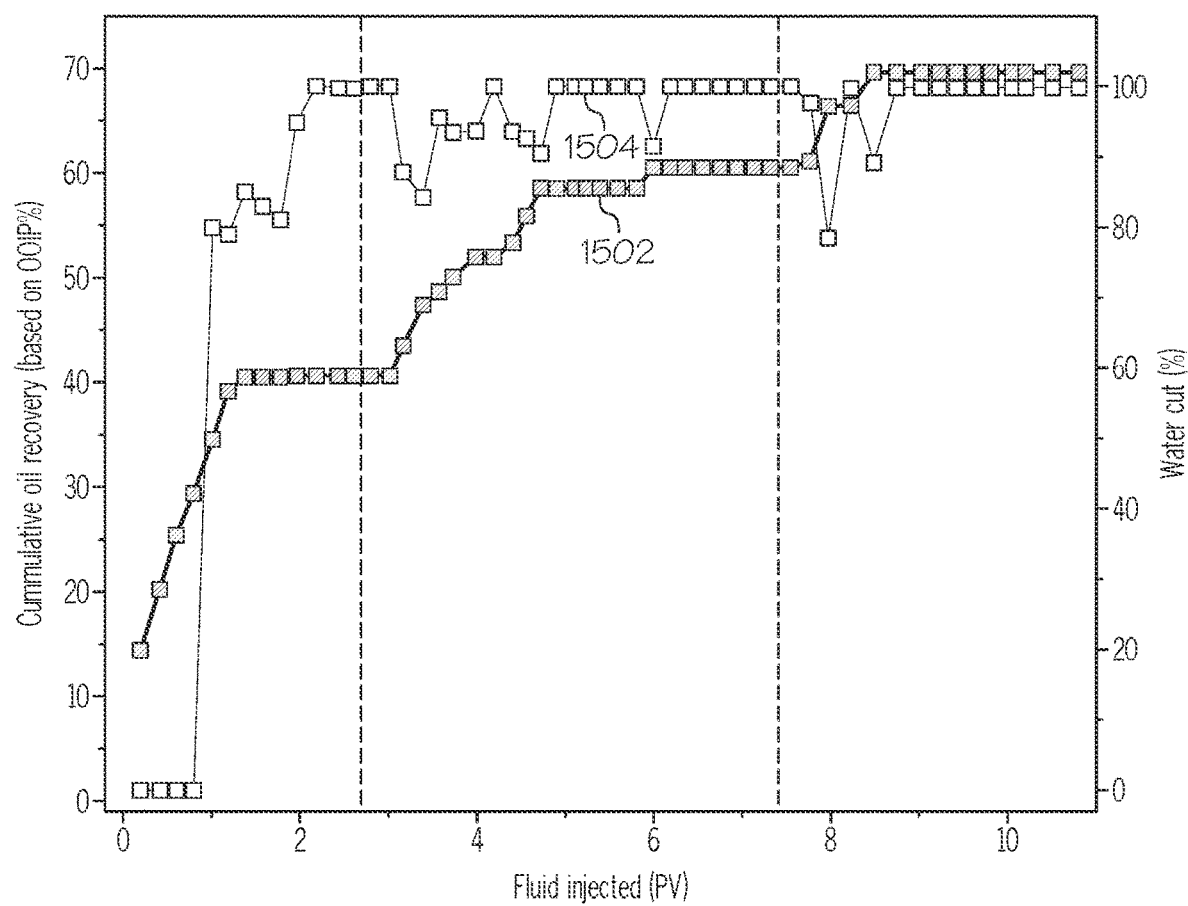
FIG. 15 graphically depicts cumulative oil recovery (y-axis left) and water cut (y-axis right) as functions of a volume of a treatment fluid (x-axis) injected in a core sample for the experiment of Example 5, according to one or more embodiments shown and described in the present disclosure.
Figure 16:
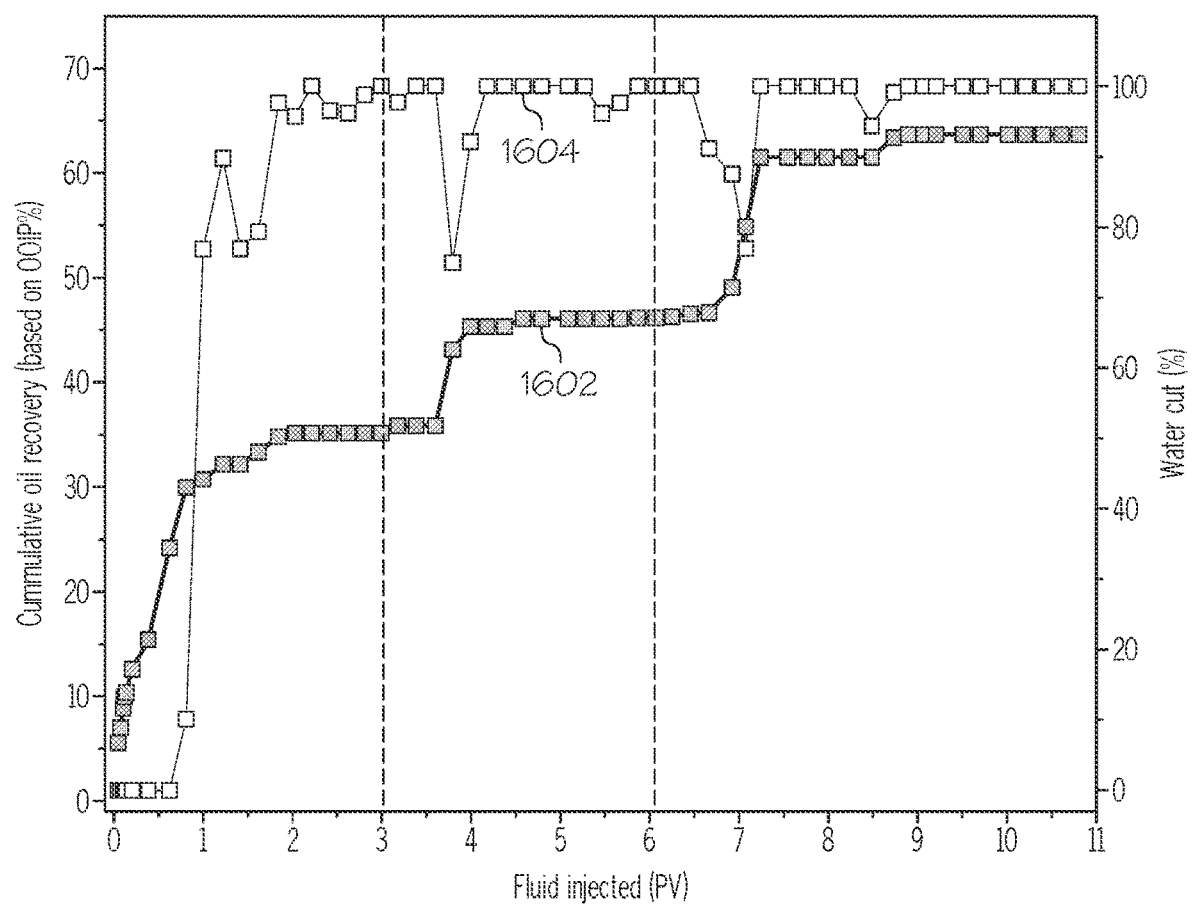
FIG. 16 graphically depicts cumulative oil recovery (y-axis left) and water cut (y-axis right) as functions of a volume of a treatment fluid (x-axis) injected in a core sample for the experiment of Example 6, according to one or more embodiments shown and described in the present disclosure.

FIGS. 15 and 16 graphically depict the additive effect of carbon nanodots and the gemini surfactant floods on oil recovery performance over seawater flooding. Referring to FIG. 15, the cumulative oil recovery (% OOIP–reference number 1502) and water cut (%–reference number 1504) are graphically depicted as functions of the volume of fluid injected through all three stages for Example 5, for which the first stage comprised seawater, the second stage comprised the carbon nanodot solution, and the third stage comprised the surfactant solution. The volume of fluid injected for each of FIGS. 15 and 16 is given in units of pore volume, where 1 pore volume is equal to the total pore volume of the rock sample from Table 5. As shown in FIG. 15, the coreflood pattern of Example 5 yielded approximately 40%-60%-70% in cumulative oil recoveries for SW-CND-Surfactant flood series.

Referring to FIG. 16, the cumulative oil recovery (% OOIP–reference number 1602) and water cut (%–reference number 1604) are graphically depicted as functions of the volume of fluid injected through all three stages for Example 6, for which the first stage comprised seawater, the second stage comprised the surfactant solution, and the third stage comprised the carbon nanodot solution. As shown in FIG. 16, the coreflood pattern of Example 6 yielded approximately 35%-45%-65% in cumulative oil recoveries for the SW-Surfactant-CND flood series. In both cases (Examples 5 and 6), the carbon nanodot solution flood generated about 20% additional oil recovery whereas the surfactant generated only about 10% additional oil recovery as a percentage of OOIP. Thus, treating subterranean formation with treatment fluids containing carbon nanodots according to the present disclosure during enhanced oil recovery processes may increase the cumulative oil recovery from the formation compared to using treatment fluids comprising surfactants only.

Examples 7-18: Imbibition Experiments

In Examples 7-18, treatment fluids comprising the carbon nanodots were evaluated for use in enhanced oil recovery processes against seawater and a surfactant solution by conducting imbibition studies to assess the ability of the carbon nanodots to release crude oil from the pores of core samples. Indiana limestone core samples (carbonate rock) having dimensions of 2 inches in length and 1.5 inches in diameter were used for the imbibition experiments.

Figure 17:
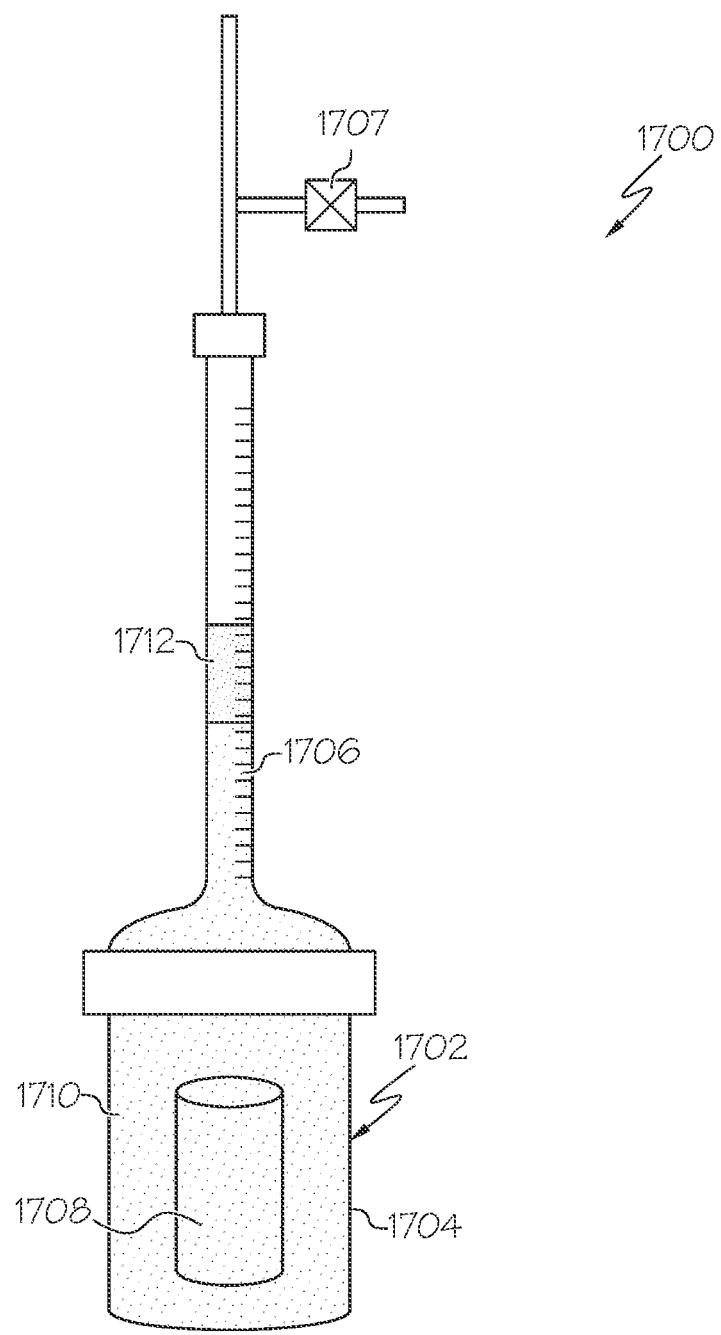
FIG. 17 schematically depicts an Amott cell experimental setup for conducting imbibition experiments on core samples, according to one or more embodiments shown and described in the present disclosure.

Referring now to FIG. 17, the imbibition experimental setup 1700 for the spontaneous imbibition experiments is schematically depicted. The imbibition experimental setup 1700 comprised a high temperature Amott cell 1702 for conducting the spontaneous imbibition experiments. The Amott cell 1702 included a vessel 1704, a graduated tube 1706 fluidly coupled to the vessel 1704, and a pressure relief valve 1707. The pressure relief valve 1707 was configured to relieve pressure from the Amott cell 1702 at a threshold pressure of 30 psi. During the experiment, a core sample 1708 is placed in the Amott cell 1702, and the imbibing solution 1710 is added to the Amott cell 1702.

All the core samples 1710 were initially saturated with formation water (220,000 ppm in TDS) under vacuum. These were then de-saturated (using either the porous plate or centrifuge methods) to measure the irreducible water saturation, and then re-saturated with Arab-D crude oil. For Examples 7-12, the crude oil saturated core samples were immediately evaluated in the imbibition experiments with no aging. For Examples 13-18 each of the crude oil saturated core samples were aged for 2 weeks at 100° C.

For the imbibition experiments, the each crude oil saturated core sample 1708 was placed into an Amott cell 1702, and the Amott cell 1702 was filled with corresponding imbibing fluids 1710 (e.g. seawater, carbon nanodots in seawater, surfactant in seawater, or combined nanodot and surfactant in seawater). The Amott cell was maintained at a temperature of 100° C. The seawater used to prepare the imbibing fluids had a TDS of 57,500 ppm. The imbibing fluids and concentrations of carbon nanodots, surfactant, or both for each of Examples 7-18 are provided in Table 6. Examples 7-9 and 13-15 are comparative examples. The crude oil 1712 released from the core sample 1708 as a result of contact with the imbibing fluid 1710 collected in the graduated tube 1706 coupled to the vessel 1702 and the volume of the crude oil 1712 was measured.

TABLE 6

Results of Imbibition Experiments

| | \multicolumn{6}{c}{Example Number} | | | | | |
|---|---|---|---|---|---|---|
| | 7 | 8 | 9 | 10 | 11 | 12 |
| | \multicolumn{6}{c}{Example Type} | | | | | |
| | Comp. Ex. | Comp. Ex. | Comp. Ex. | Example | Example | Example |
| Reference No. FIG. 18 | 1802 | 1804 | 1806 | 1808 | 1810 | 1812 |
| Aged | No | No | No | No | No | No |
| Surfactant | None | Comp. Ex. 3 | Comp. Ex. 3 | None | None | Comp. Ex. 3 |
| Surfactant Conc. (ppmw) | 0 | 200 | 500 | 0 | 0 | 200 |
| Carbon Nanodot Conc. (ppmw) | 0 | 0 | 0 | 200 | 500 | 200 |
| Core Sample Length (cm) | 5.070 | 8.083 | 5.071 | 5.097 | 5.076 | 5.070 |
| Core Sample Diameter (cm) | 3.734 | 3.758 | 3.752 | 3.721 | 3.750 | 3.832 |
| Pore Volume (cm$^3$) | 12.11 | 10.79 | 11.59 | 12.23 | 12.32 | 11.03 |
| Porosity (%) | 19.87 | 19.14 | 20.11 | 20.27 | 20.14 | 18.87 |
| Gas Permeability (He) (mD) | 333.75 | 256.28 | 345.26 | 475.91 | 369.95 | 420.32 |
| Oil Permeability (mD) | 91.11 | 88.87 | 138.56 | 167.23 | 141.11 | 153.00 |
| $S_{oi}$ (%) | 66.31 | 72.84 | 71.52 | 67.54 | 67.63 | 69.33 |
| $S_{wi}$ (%) | 33.69 | 27.16 | 28.48 | 32.46 | 32.37 | 30.67 |
| OOIP(cm$^3$) | 8.03 | 7.86 | 8.29 | 8.26 | 8.33 | 7.65 |
| Oil Recovery (cm$^3$) | 3.1 | 4.75 | 5.2 | 4.5 | 4.9 | 6.5 |
| Oil Recovery (% OOIP) | 38.60 | 60.44 | 62.73 | 54.48 | 58.81 | 84.99 |

| | \multicolumn{6}{c}{Example Number} | | | | | |
|---|---|---|---|---|---|---|
| | 13 | 14 | 15 | 16 | 17 | 18 |
| | \multicolumn{6}{c}{Example Type} | | | | | |
| | Comp. Ex. | Comp. Ex. | Comp. Ex. | Example | Example | Example |
| Reference No. FIG. 19 | 1902 | 1904 | 1906 | 1908 | 1911 | 1912 |
| Aged | 2 weeks | 2 weeks | 2 weeks | 2 weeks | 2 weeks | 2 weeks |
| Surfactant | None | Comp. Ex. 3 | Comp. Ex. 4 | None | None | None |
| Surfactant Conc. (ppmw) | 0 | 200 | 200 | 0 | 0 | 0 |
| Carbon Nanodot Conc. (ppmw) | 0 | 0 | 0 | 50 | 100 | 200 |
| Core Sample Length (cm) | 5.101 | 5.078 | 5.100 | 5.104 | 5.099 | 5.068 |
| Core Sample Diameter (cm) | 3.731 | 3.739 | 3.73 | 3.731 | 3.731 | 3.748 |
| Pore Volume (cm$^3$) | 9.8656 | 10.5 | 10.2 | 10.2 | 10.4 | 10.9 |
| Porosity (%) | 17.69 | 18.84 | 18.54 | 18.5 | 18.8 | 19.5 |
| Gas Permeability (He) (mD) | 202.43 | 307.61 | 278.52 | 303.56 | 298.81 | 312.72 |
| Oil Permeability (mD) | 26.58 | 30.18 | 26.88 | 28.58 | 29.52 | 31.55 |
| $S_{oi}$ (%) | 73.29 | 78.06 | 71.37 | 80.20 | 79.13 | 75.6 |
| $S_{wi}$ (%) | 26.72 | 21.94 | 28.63 | 19.8 | 20.87 | 24.33 |
| OOIP(cm$^3$) | 7.23 | 8.2 | 7.28 | 8.18 | 8.23 | 8.25 |
| Oil Recovery (cm$^3$) | 3 | 4.8 | 3.8 | 3.82 | 4.25 | 5.7 |
| Oil Recovery (% OOIP) | 41.49 | 58.54 | 52.20 | 46.70 | 51.64 | 69.09 |

Figure 18:
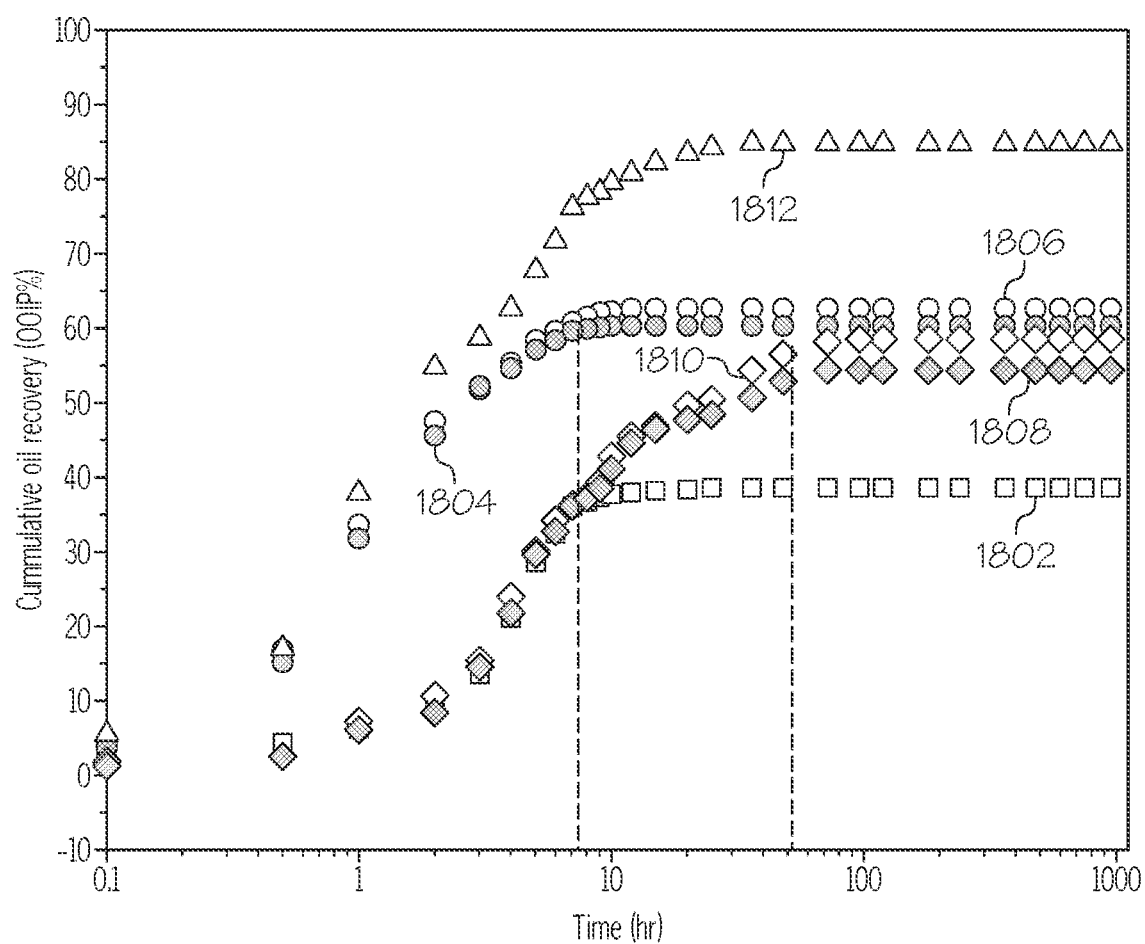
FIG. 18 graphically depicts cumulative oil recovery (y-axis) as a function of time (x-axis) for fluid imbibition experiments using non-aged core samples saturated with crude oil, according to one or more embodiments shown and described in the present disclosure.

Referring now to FIG. 18, effect of using different fluids in varying concentrations on the cumulative oil recovery in the spontaneous imbibition experiments for the non-aged core samples of Examples 7-12 are graphically depicted. In FIG. 18, the cumulative oil recovery (y-axis–% OOIP) is graphically depicted as a function of time (x-axis–hours). As shown in FIG. 18, carbon nanodot solutions of Examples 10 and 11 (ref. nos. 1808 and 1810 in FIG. 18) provided superior imbibition performance compared to treatment with seawater alone, as in Comparative Example 7 (ref. no. 1802). At ten hours, the cumulative oil recovery for Examples 10 and 11 comprising the carbon nanodots was 50% greater than the cumulative oil recovery for Comparative Example 7 (seawater only). The oil recovery performance of the carbon nanodot solutions of Examples 10 and 11 provided imbibition performance slightly less than but comparable to the surfactant solutions of Comparative Examples 8 and 9 (ref. nos. 1804 and 1806). Thus, the nanodot solutions of the present disclosure may provide imbibition performance comparable to existing surfactant-based treatment solutions, while additionally propagating further into the formation than conventional surfactant solutions.

FIG. 18 also illustrates the synergistic effects of combining both carbon nanodots and the cationic gemini surfactant in a treatment fluid. For Example 12 (ref. no. 1812 in FIG. 18), which included 200 ppm carbon nanodots of Example 1 and 200 ppm cationic gemini surfactant of Comparative Example 3, the treatment fluid comprising the carbon nanodots and gemini surfactant exhibited over 85% OOIP cumulative oil recovery during the imbibition experiment and achieved greater than 60% OOIP in less time compared to the treatment fluids of Comparative Examples 8 and 9 and Examples 10 and 11. In particular, the treatment fluid of Example 12 having 200 ppmw carbon nanodots and 200 ppmw surfactant resulted in a 35% increase in cumulative oil recovery compared to the solution of Comparative Example 9, which included 500 ppmw surfactant. This synergistic effect of combining the carbon nanodots and the cationic gemini surfactant is unexpected. This is unexpected because the surfactant solutions of Comparative Example 9 showed slightly better performance than the carbon nanodots solutions of Examples 10 and 11. Thus, one would expect reducing the surfactant amount by 300 ppmw and adding 200 ppmw carbon nanodots to result in the same or slightly reduced oil recovery based on the results for Comparative Examples 8 and 9 and Examples 10 and 11. However, this was not observed. Instead, the combination of the carbon nanodots and surfactant in Example 12 exhibited synergistic effects that greatly improved the cumulative oil recovery in the imbibition experiments, as previously discussed.

Figure 19:
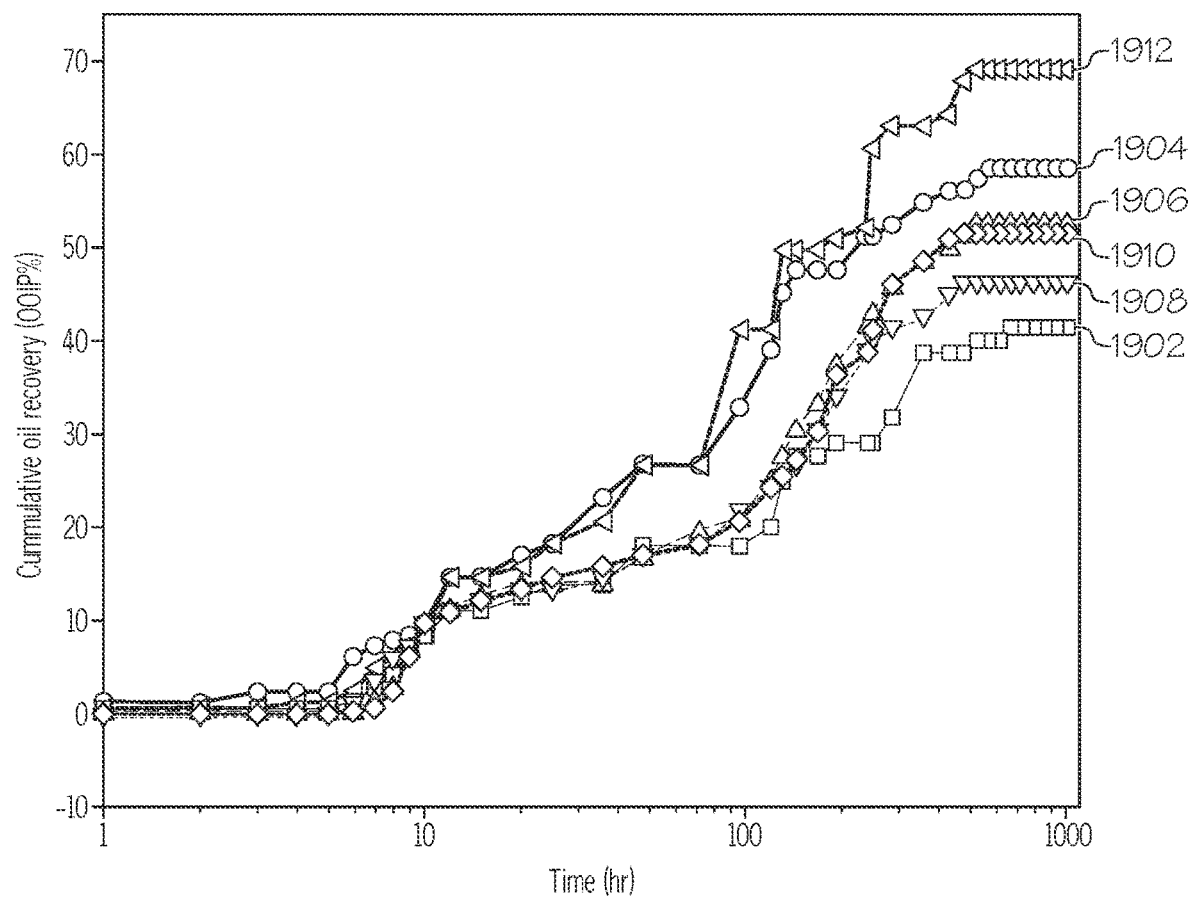
FIG. 19 graphically depicts cumulative oil recovery (y-axis) as a function of time (x-axis) for fluid imbibition experiments using core samples saturated with crude oil and aged for two weeks prior to the imbibition experiments, according to one or more embodiments shown and described in the present disclosure.

Referring now to FIG. 19, effect of using different fluids in varying concentrations on the cumulative oil recovery in the spontaneous imbibition experiments for the core samples of Examples 13-18, which were aged for 2 weeks, are graphically depicted. In FIG. 19, the cumulative oil recovery (y-axis–% OOIP) is graphically depicted as a function of time (x-axis–hours). As shown in FIG. 13, carbon nanodot solutions of Examples 16-18 (ref. nos. 1908, 1910, and 1912 in FIG. 19) provided superior imbibition performance compared to treatment with seawater alone, as in Comparative Example 13 (ref. no. 1902). Thus, the treatment solutions comprising the carbon nanodots of the present disclosure provide superior oil recovery performance compared to treatment with seawater alone.

Referring again to FIG. 19, the treatment solution of Example 17 (ref. no. 1911 in FIG. 19) having 100 ppmw carbon nanodots provided cumulative oil recovery performance in the imbibition experiments comparable to the treatment solution of Comparative Example 15 (ref. no. 1906), which included 200 ppm anionic AOS surfactant of Comparative Example 4, in seawater. Thus, a treatment fluid having a lesser concentration of carbon nanodots (as in Example 17) can provide greater oil recovery performance compared to treatment fluids having greater concentration of AOS surfactants. Additionally, the treatment solution of Example 18 having 200 ppmw carbon nanodots of the present disclosure provided better cumulative oil recovery performance in the imbibition experiments compared to the treatment solutions of both Comparative Example 14 (200 ppmw gemini surfactant in seawater) and Comparative Example 15 (200 ppmw AOS surfactant in seawater. Thus, treatment fluids with carbon nanodots provide superior cumulative oil recovery from aged core samples compared to the treatment solutions having equivalent amounts of surfactants.

Examples 19-20: Propagation of Carbon Nanodots Through Rock Samples in Response to a Salinity Gradient In Examples 19 and 20, experiments were designed and conducted to investigate the propagation of the carbon nanodots of the present disclosure through a rock sample in response to a salinity gradient and evaluate the carbon nanodots for effectiveness in treating dead pockets through diffusiophoresis. In both Examples 19 and 20, a porous rock sample was placed at the interface of two brine reservoirs of different salinity levels and ionic compositions. Carbon-nanodots of the present disclosure, such as the carbon nanodots of Example 1, are placed in the lower salinity water (seawater). The carbon nanodots of Example 1 were used as the carbon nanodots in Examples 19 and 20 were inherently functionalized with surface moieties for fluorescence, charge, colloidal stability, and surfactancy. The fluorescence of the carbon nanodots is a reflection of its concentration in the solution and was measured to determine the concentration of carbon nanodots in each of the brine reservoirs.

Figure 20A:
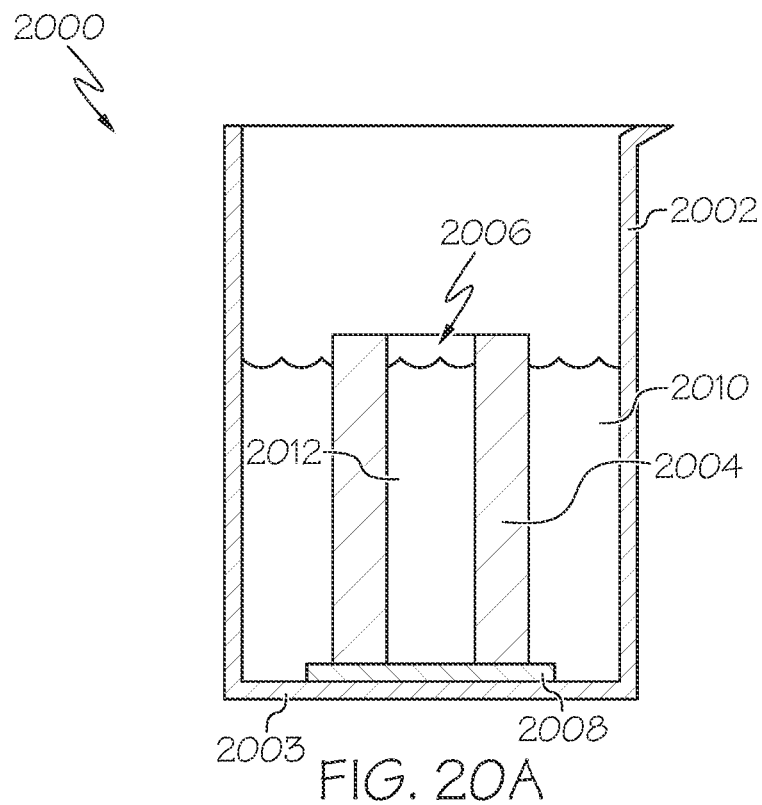
FIG. 20A schematically depicts a side cross-sectional view of a first experimental setup for investigating the behavior of the carbon nanodots in response to a salinity gradient, according to one or more embodiments shown and described in the present disclosure.
Figure 20B:
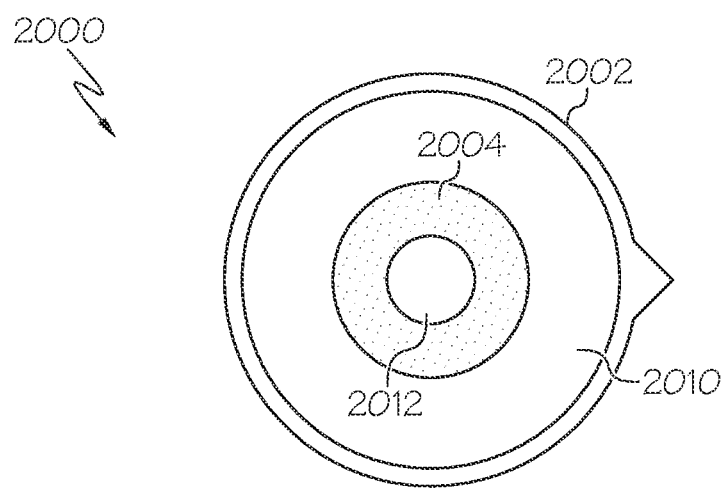
FIG. 20B schematically depicts a top view of the first experimental setup of FIG. 20A, according to one or more embodiments shown and described in the present disclosure.

Referring now to FIGS. 20A and 20B, an experimental apparatus 2000 for Example 19 is schematically depicted. FIG. 20A schematically depicts a side cross-sectional view while FIG. 20B shows a top view of the experimental apparatus 2000 for Example 19. The experimental apparatus 2000 includes a container 2002, such as a beaker, and a hollow core sample 2004 glued to the bottom 2003 of the container 2002. The hollow core sample 2004 was a carbonate rock sample having an outside diameter of 1.5 inches (3.81 centimeters (cm)) and a length of 3 inches (7.62 cm). The hollow core sample 2004 had a cylindrical bore 2006 through the center along the center line of the hollow core sample 2004. The cylindrical bore 2006 had an inner diameter of 0.75 inches. The hollow core sample 2004 was glued to the bottom 2003 of the container 2002 using an epoxy adhesive layer 2008 having a thickness of from 3 millimeters (mm) to 4 mm. The epoxy adhesive layer 2008 was applied between the hollow core sample 2004 and the bottom 2003 of the container 2002 and allowed to harden over 48 hours at room temperature to create two brine reservoirs, an outer reservoir 2010 in the annular space between the hollow core sample 2004 and the container 2002 and an inner reservoir 2012 in the cylindrical bore 2006 of the hollow core sample 2004. The hollow core sample 2004 was then saturated with connate water under vacuum.

In Example 19, the outer reservoir 2010 was filled with seawater brine containing the carbon nanodots of Example 1 at a concentration of 100 ppmw based on the total weight of the seawater brine. The ionic composition of the seawater brine is provided in Table 7. The seawater brine with the carbon nanodots was added to the outer reservoir to a level 5 mm below the top edge of the hollow core sample 2004. The inner reservoir 2012 was filled with connate water with no carbon nanodots to the same level as the outer reservoir 2010 (5 mm below the top edge of the hollow core sample 2004). The ionic composition of the connate water is provided in Table 7. Samples (3-4 cubic centimeters) from each of the outer reservoir 2010 and inner reservoir 2012 were collected periodically over a three-day period and analyzed for fluorescence. During the 3-day period, the container 2002 was kept covered and undisturbed on a solid and levelled surface between sampling.

TABLE 7

Composition of Connate Water and Seawater for Examples 19 and 20.

| Composition Salts | Concentration in Connate Water (grams/liter) | Concentration in Seawater (grams/liter) |
|---|---|---|
| NaHCO$_3$ | 0.487 | 0.165 |
| Na$_2$SO$_4$ | 0.518 | 6.339 |

TABLE 7-continued

Composition of Connate Water and Seawater for Examples 19 and 20.

| Composition Salts | Concentration in Connate Water (grams/liter) | Concentration in Seawater (grams/liter) |
|---|---|---|
| NaCl | 150.446 | 41.170 |
| $CaCl_2 \cdot 2H_2O$ | 69.841 | 2.387 |
| $MgCl_2 \cdot 6H_2O$ | 20.396 | 17.416 |
| Total | 241.688 | 67.480 |

Figure 21:
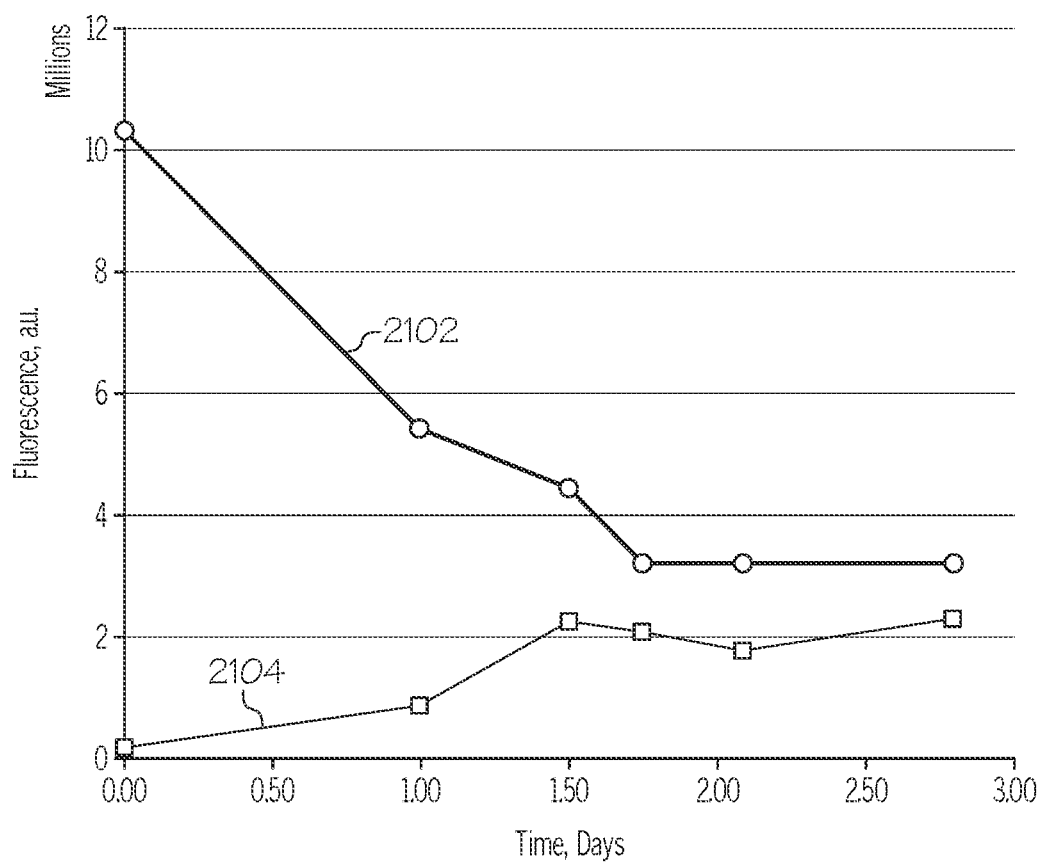
FIG. 21 graphically depicts fluorescence (y-axis) of the fluids in each reservoir of the experiments setup of FIG. 20A as a function of time (x-axis), according to one or more embodiments shown and described in the present disclosure.

Referring now to FIG. 21, the fluorescence of the seawater brine in the outer reservoir (reference no. 2102 in FIG. 21) and the fluorescence of the connate water in the inner reservoir (reference no. 2104 in FIG. 21) are graphically depicted as a function of time. As indicated previously, the fluorescence of each is directly proportional to the concentration of the carbon nanodots in each. As shown in FIG. 21, there is a clear increase in the fluorescence of the connate water in the inner reservoir and a decrease in the fluorescence of the seawater brine in the outer reservoir with increasing time. Thus, FIG. 21 shows that the concentration of carbon nanodots in the connate water in the inner reservoir increases with time while the concentration of carbon nanodots in the seawater brine in the outer reservoir decreases with time. This indicates that the carbon nanodots migrated through the rock of the hollow core sample 2004 from an area of lesser salinity (seawater brine) to the area of greater salinity (connate water). Example 19 shows that the carbon nanodots of the present disclosure can propagate through a rock formation in a direction of increasing salinity.

Figure 22:
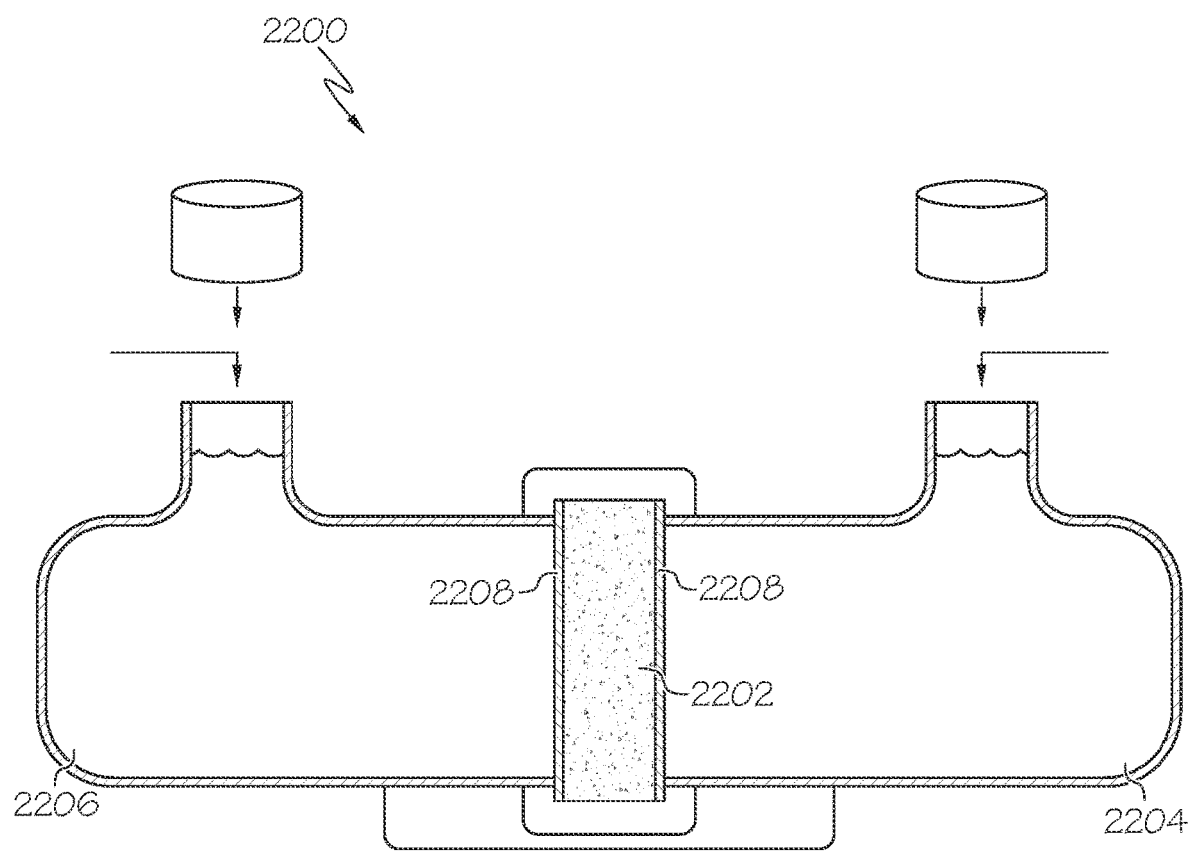
FIG. 22 graphically depicts a side view of a second experimental setup for investigating the behavior of the carbon nanodots in response to a salinity gradient, according to one or more embodiments shown and described in the present disclosure.

In Example 20, a similar experiment was performed using an H-Cell apparatus. Referring now to FIG. 22, the H-Cell apparatus 2200 for Example 20 is schematically depicted. The H-cell apparatus 220 included a disk-shaped rock sample 2202 disposed at the interface between a first reservoir 2204 and a second reservoir 2206. The disk-shaped rock sample 2202 was a carbonate rock sample having a thickness of 0.7 cm and a diameter of 3.6 cm. The disk-shaped rock sample 2202 is pre-cleaned and saturated with connate water. The edge of the disk-shaped rock sample 2202 is sealed with O-rings 2208 on both sides and the connection with the glass reservoirs 2204, 2206 is wrapped with waterproof tape to prevent direct fluid communication between the first reservoir 2204 and the second reservoir 2206 and to prevent leakage. The first reservoir 2204 was filled with seawater containing the carbon nanodots of Example 1 at a concentration of 250 ppmw. The second reservoir 2206 was filled with connate water (no carbon nanodots). Table 7 summarized the ionic composition of both the seawater and the connate water for Example 20.

Figure 23A:
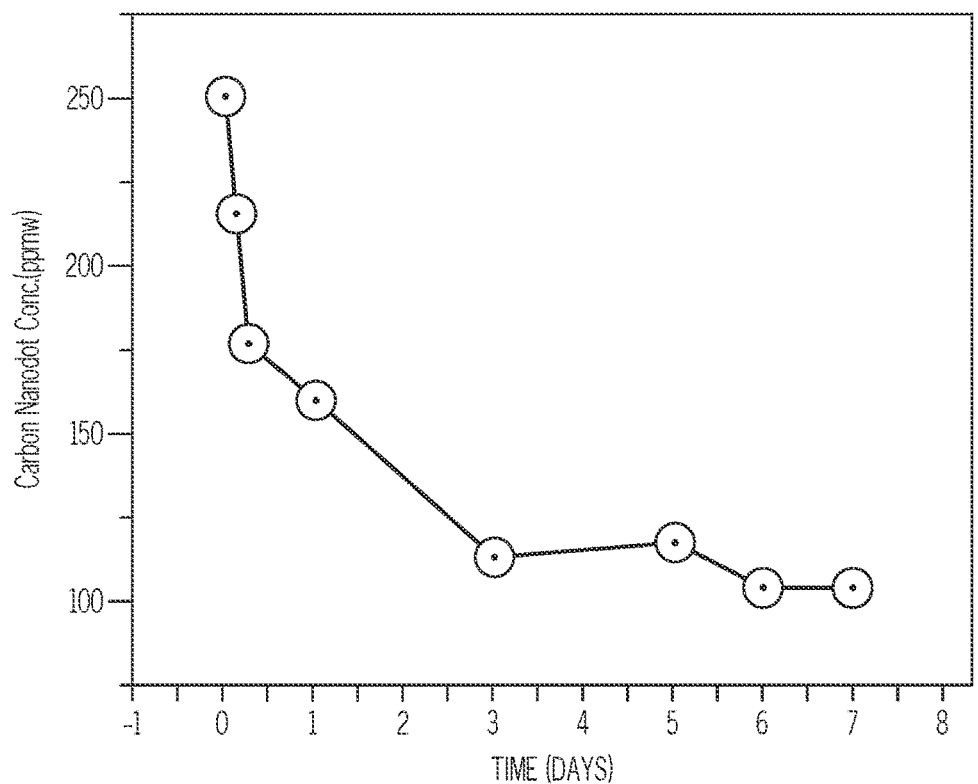
FIGS. 23A and 23B graphically depict the concentration of carbon nanodots (y-axis) as a function of time (x-axis) in each reservoir of the second experimental setup of FIG. 22, according to one or more embodiments shown and described in the present disclosure.
Figure 23B:
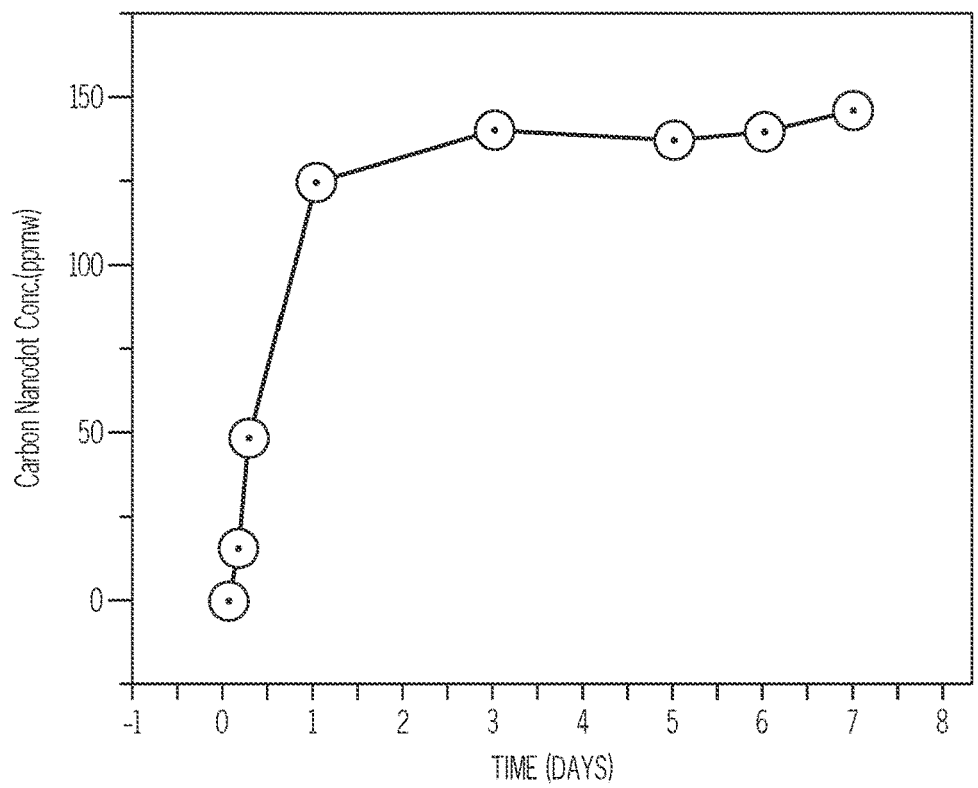

Referring now to FIGS. 23A and 23B, the concentration of carbon nanodots in each reservoir, as determined through measurement of fluorescence of the fluids in each reservoir, is graphically depicted as a function of time over a seven day period. As shown in FIG. 23A, the concentration of carbon nanodots in the first reservoir 2204 decreased significantly over the seven day period. Conversely, as shown in FIG. 23B, the concentration of carbon nanodots in the connate water of the second reservoir 2206 greatly increased over the seven day period. These results clearly show mobility of the carbon nanodots through the disk-shaped rock sample 2202 from the lesser salinity seawater in the first reservoir 2204 to the greater salinity connate water in the second reservoir 2206. Thus, the carbon nanodots are shown to be able to migrate through the pores of porous rock in the direction of increasing salinity.

Figure 24:
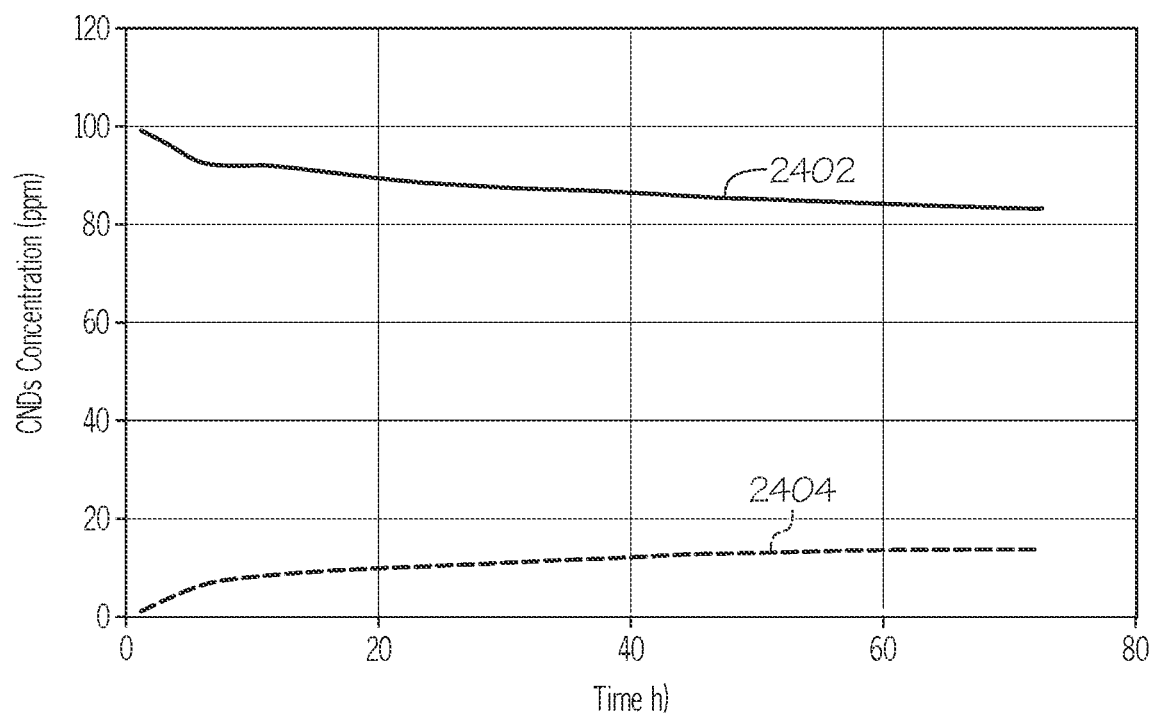
FIG. 24 graphically depicts the concentration of carbon nanodots (y-axis) as a function of time (x-axis) in each reservoir of the experimental setup of FIG. 22 for Comparative Example 21.

Comparative Example 21: Migration of Carbon Nanodots in the Absence of a Salinity Gradient In Comparative Example 21, the experiment described in Example 20 was performed with the salinity being the same in the first reservoir 2204 and the second reservoir 2206. In Comparative Example 21, the first reservoir 2204 was filled with seawater containing the carbon nanodots of Example 1 at a concentration of 100 ppmw. The second reservoir 2206 was filled with seawater having the same salinity and no carbon nanodots. In this case, the two compartments were separated by a polycarbonate membrane filter (instead of the rock disc sample). Referring now to FIG. 24, the concentration of carbon nanodots in the first reservoir and in the second reservoir are graphically depicted as a function of time. In FIG. 24, the concentration of carbon nanodots in the first reservoir is indicated with reference number 2402, and the concentration of carbon nanodots in the second reservoir is indicated with reference number 2404. As shown in FIG. 24, the change in concentration of the carbon nanodots in each compartment, as indicated by change in florescence of the fluid in each compartment, is very small even after three days. This indicates minimal movement of the carbon nanodots between the first reservoir 2204 and the second reservoir 2206 in the absence of a salinity gradient. Thus, the mobility of the carbon nanodots is highly restrained and almost negligible in the absence of a salinity gradient.

Example 22: Retention of Carbon Nanodots in Response to a Salinity Gradient

In Example 22, a suite of coreflood tests were conducted to investigate retention (delay) of the carbon nanodots in a rock formation in the presence of a salinity gradient. The coreflood experiments were conducted at room temperature using the coreflood experimental system 1400 in FIG. 14, which was previously described in Examples 5 and 6. Initially, the core sample was saturated with connate water having the ionic composition in Table 7. Following initial saturation, a 0.5 pore volume (PV) amount of an injection fluid comprising carbon nanodots in the connate water was injected into the core sample in a first treatment stage. The concentration of carbon nanodots was 100 ppmw based on the total weight of the injection fluid. Injection of the injection fluid comprising the carbon nanodots was followed by injection of 4 pore volumes of connate water to flush the injection fluid having the carbon nanodots out of the sample. The concentration of carbon nanodots in the output fluid as a function of time is shown graphically in FIG. 25 as the line indicated by reference number 2502.

In a second treatment stage, a 0.5 pore volume amount of a second treatment fluid comprising carbon nanodots in seawater was injected into the sample. The seawater used for the second treatment fluid had the ionic composition provided in Table 7, which shows a reduced salinity compared to the connate water. This second treatment stage was followed by injection of 4 pore volumes of seawater. The concentration of carbon nanodots in the output fluid as a function of time for the second treatment stage is shown graphically in FIG. 25 as the line indicated by reference number 2504. The injection rate throughout the first and second treatment stages were maintained at 0.1 cubic centimeters per minute.

Figure 25:
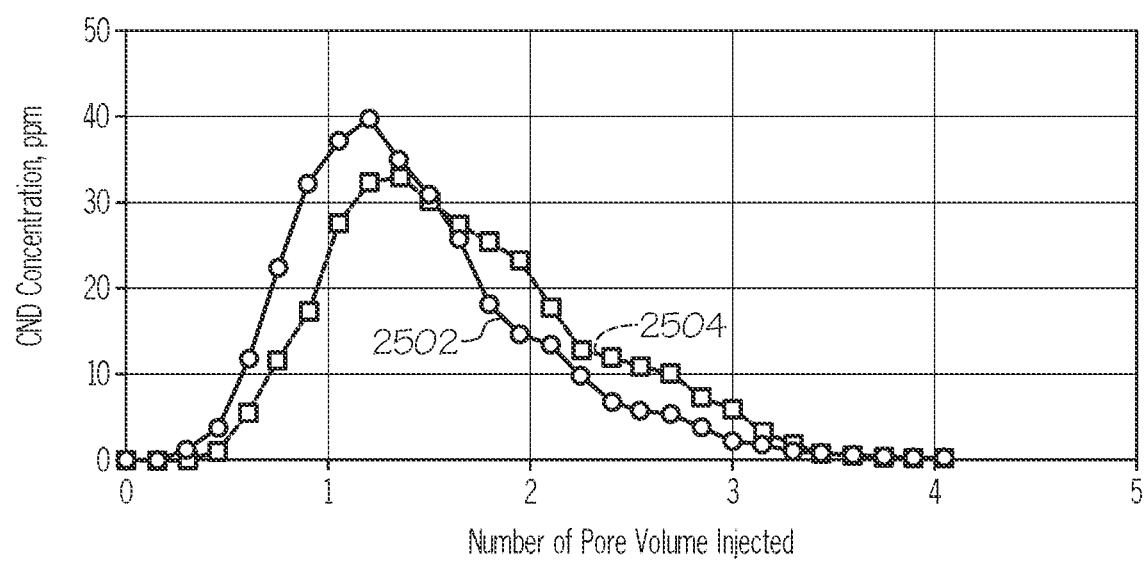
FIG. 25 graphically depicts the concentration of carbon nanodots (y-axis) as a function of volume of treatment fluid injected (x-axis) for treatment fluids comprising carbon nanodots in seawater and carbon nanodots in connate water, according to one or more embodiments shown and described in the present disclosure.

Referring again to FIG. 25, the data 2504 from the second treatment stage, during which injection of the second treatment fluid established a salinity gradient in the core sample between the connate water already present and the seawater of the second treatment fluid. As shown in FIG. 25, the salinity gradient in the system contributed to a longer retention of the carbon nanodots in the pores of the core sample as. In both cases, a near 97% recovery of the carbon nanodots was reached.

It is noted that one or more of the following claims utilize the terms "where," "wherein," or "in which" as transitional phrases. For the purposes of defining the present technology, it is noted that these terms are introduced in the claims as an open-ended transitional phrase that are used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

The invention claimed is:

1. A method for enhancing recovery of hydrocarbons from a hydrocarbon-bearing subterranean formation, the method comprising:
   withdrawing hydrocarbons from a production well extending into a first subterranean formation; and
   injecting a treatment fluid comprising carbon nanodots dispersed in a brine solution from an injection well into a second subterranean formation, where:
      the first subterranean formation is a hydrocarbon-bearing formation;
      the carbon nanodots comprise carbon, oxygen, nitrogen, and hydrogen;
      the carbon nanodots have an oxygen content of greater than 20 mole percent;
      the carbon nanodots comprise one or more functional groups selected from amine groups, amide groups, carbonyl groups, carboxylate groups, hydroxylate groups, hydroxylamine groups, or combinations of these disposed at outer surfaces of the carbon nanodots;
      a concentration of carbon nanodots in the treatment fluid is less than or equal to 500 parts per million by weight based on the total weight of the treatment fluid;
      the injected treatment fluid flows from the second subterranean formation into the first subterranean formation; and
      the injection of the treatment fluid comprising the carbon nanodots is characterized by an injection duration, an injection pressure, an injection volume, or a combination thereof, that increases cumulative oil recovery of hydrocarbons from the first subterranean formation, the second subterranean formation, or both by at least 10% compared to injecting the brine solution without the carbon nanodots.

2. The method of claim 1, where the injection well is spaced apart from the production well by a distance of greater than 100 meters.

3. The method of claim 1, where the carbon nanodots penetrate into the second subterranean formation, the first subterranean formation, or both a distance greater than 10 meters from the injection well.

4. The method of claim 1, where the first subterranean formation, the second subterranean formation, or both comprise a formation temperature of from 50° C. to 150° C. and a formation pressure of greater than or equal to 1,000 pounds per square inch.

5. The method of claim 1, where
   connate fluids in the first subterranean formation, the second subterranean formation, or both have a salinity of from 20,000 parts per million by weight to 240,000 parts per million by weight; and
   the brine solution comprises a salinity of greater than 30,000 total dissolved solids (TDS).

6. The method of claim 1, where the first subterranean formation, the second subterranean formation, or both comprise carbonate rock, sandstone rock, or both.

7. The method of claim 1, comprising:
   injecting a fixed volume of the treatment fluid from the injection well into the second subterranean formation; and
   injecting a brine solution from the injection well into the second subterranean formation after the fixed volume of the treatment fluid, where injection of the brine solution propels the treatment fluid further into the second subterranean formation, the first subterranean formation, or both;
   where the fixed volume of the treatment fluid is from 100 barrels to 500 barrels.

8. The method of claim 1, comprising injecting the treatment fluid for a duration of from 0.5 hours to 48 hours.

9. The method of claim 1, comprising injecting the treatment fluid from the injection well into the second subterranean formation, where the treatment fluid comprises a concentration of carbon nanodots of from 10 parts per million by weight to 50 parts per million by weight based on the total weight of the treatment fluid.

10. The method of claim 1, comprising:
    injecting a brine solution into the second subterranean formation in a first treatment stage;
    injecting the treatment fluid comprising the carbon nanodots into the second subterranean formation in a second treatment stage after the first treatment stage; and
    injecting a surfactant solution into the second subterranean formation in a third treatment stage after the second treatment stage.

11. The method of claim 1, comprising:
    injecting a brine solution into the second subterranean formation in a first treatment stage;
    injecting a surfactant solution into the second subterranean formation in a second treatment stage after the first treatment stage; and
    injecting the treatment fluid comprising the carbon nanodots into the second subterranean formation in a third treatment stage after the second treatment stage.

12. The method of claim 1, where the treatment fluid comprises from 10 ppmw to 1,000 ppmw surfactant based on the total weight of the treatment fluid, where the surfactant comprises a cationic gemini surfactant, an anionic alpha olefin sulphonate surfactant, or both.

13. The method of claim 1 where the carbon nanodots have a zeta potential of greater than or equal to negative 10 millivolts in a solution comprising the carbon nanodots and deionized water.

14. The method of claim 1 where at least 50% of the functional groups disposed at the outer surfaces of the carbon nanodots comprise amide groups, carboxylate groups, hydroxyl groups, or combinations of these.

15. A method for enhancing recovery of hydrocarbons from a hydrocarbon-bearing subterranean formation, the method comprising:
withdrawing hydrocarbons from a production well extending into a first subterranean formation; and
injecting a treatment fluid from an injection well into a second subterranean formation, the treatment fluid comprising carbon nanodots dispersed in a brine solution, where:
the first subterranean formation is a hydrocarbon-bearing formation having dead pockets;
the carbon nanodots comprise carbon, oxygen, nitrogen, and hydrogen;
a concentration of carbon nanodots in the treatment fluid is less than or equal to 500 parts per million by weight based on the total weight of the treatment fluid;
the carbon nanodots have an oxygen content of greater than 20 mole percent;
the treatment fluid has a salinity less than a salinity of connate fluids in the dead pockets of the first subterranean formation;
the injected treatment fluid flows from the second subterranean formation into the first subterranean formation; and
the injection of the treatment fluid comprising the carbon nanodots is characterized by an injection duration, an injection pressure, an injection volume, or a combination thereof, that increases cumulative oil recovery of hydrocarbons from dead pockets in deep regions of the first subterranean formation, the second subterranean formation, or both compared to injecting fluids without the carbon nanodots.

16. The method of claim 15, where the connate fluids in the dead pockets have a salinity of from 150,000 parts per million by weight to 240,000 parts per million by weight Total Dissolved Solids and the brine solution has a salinity of from 30,000 parts per million by weight Total Dissolved Solids to 100,000 parts per million by weight Total Dissolved Solids based on the total weight of the brine solution.

17. The method of claim 15, where the treatment fluid further comprises secondary charged reactive nanoparticles, where the secondary charged reactive nanoparticles comprise salt surfactant nanoparticles that include at least one anionic surfactant metal ion salt and at least one polymer.

18. The method of claim 15, where injecting the treatment fluid from the injection well into the second subterranean formation comprises:
injecting a slug of a first treatment fluid comprising salt surfactant nanoparticles; and
after injecting the first treatment fluid, injecting a second treatment fluid continuously into the second subterranean formation, where the second treatment fluid comprises the carbon nanodots.

19. A treatment fluid for treating a hydrocarbon-bearing subterranean formation, the treatment fluid comprising carbon nanodots comprising carbon, oxygen, nitrogen, and hydrogen as constituent elements and a brine solution, where:
the carbon nanodots are dispersed in the brine solution and the treatment fluid comprises from 10 parts per million by weight to 500 parts per million by weight carbon nanodots based on the total weight of the treatment fluid; and
the carbon nanodots have an oxygen content of greater than 20 mole percent.

20. The treatment fluid of claim 19, further comprising from 50 parts per million by weight to 50,000 parts per million by weight secondary charged reactive nanoparticles based on the total weight of the treatment fluid, where the secondary reactive nanoparticles comprise salt surfactant nanoparticles.

* * * * *